United States Patent
Gallagher

(10) Patent No.: US 7,634,269 B2
(45) Date of Patent: *Dec. 15, 2009

(54) APPARATUS AND METHOD FOR EXTENDING THE COVERAGE AREA OF A LICENSED WIRELESS COMMUNICATION SYSTEM USING AN UNLICENSED WIRELESS COMMUNICATION SYSTEM

(75) Inventor: Michael D. Gallagher, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 11/004,439

(22) Filed: Dec. 3, 2004

(65) Prior Publication Data

US 2005/0101329 A1    May 12, 2005

Related U.S. Application Data

(63) Continuation-in-part of application No. 10/688,470, filed on Oct. 17, 2003.

(60) Provisional application No. 60/419,785, filed on Oct. 18, 2002.

(51) Int. Cl.
*H04L 12/66* (2006.01)
(52) U.S. Cl. .............. 455/436; 455/448; 455/41.2; 370/331; 370/338
(58) Field of Classification Search ............. 455/421, 455/462, 465, 432.1, 436, 445, 435.1, 432.2, 455/422.1, 437, 438, 442, 443, 448, 41.2, 455/439; 370/331, 338, 328, 330, 333–334
See application file for complete search history.

(56) References Cited

U.S. PATENT DOCUMENTS 5,101,501 A    3/1992    Gilhousen et al.

(Continued)

FOREIGN PATENT DOCUMENTS

EP    0936777 A1    8/1999

(Continued)

OTHER PUBLICATIONS

Notification Of Transmittal Of The International Search Report And The Written Opinion Of The International Searching Authority, Or The Declaration for PCT/US2004/040858 mailed Apr. 26, 2005, 9 pages.

(Continued)

*Primary Examiner*—George Eng
*Assistant Examiner*—Brandon J Miller
(74) *Attorney, Agent, or Firm*—Adeli & Tollen LLP

(57) ABSTRACT

Extending the coverage area of a licensed wireless communication system using an unlicensed communication system is described. In one embodiment, the system comprises a mobile station operable to communicate with a telecommunications network using a licensed wireless communication channel serviced by the telecommunications network in a first mode and an unlicensed wireless communication channel in a second mode, a base station communicably coupled to the mobile station via the unlicensed wireless communication channel, and a network controller communicably coupled to the base station and adapted to communicate with the telecommunications network, wherein the mobile station includes call control to control a communication session with the telecommunications network through the network controller using the unlicensed wireless communication channel by exchanging call control information with the network controller via one or more messages having the A1 protocol message format.

20 Claims, 49 Drawing Sheets

U.S. PATENT DOCUMENTS

| | | | |
|---|---|---|---|
| 5,109,528 A | 4/1992 | Uddenfeldt | |
| 5,226,045 A | 7/1993 | Chuang | |
| 5,235,632 A | 8/1993 | Raith | |
| 5,260,944 A | 11/1993 | Tomabechi | |
| 5,260,988 A | 11/1993 | Schellinger et al. | |
| 5,267,261 A | 11/1993 | Blakeney, II et al. | |
| 5,367,558 A | 11/1994 | Gillis et al. | |
| 5,390,233 A | 2/1995 | Jensen et al. | |
| 5,392,331 A | 2/1995 | Patsiokas et al. | |
| 5,406,615 A * | 4/1995 | Miller et al. | 455/552.1 |
| 5,428,601 A | 6/1995 | Owen | |
| 5,442,680 A | 8/1995 | Schellinger et al. | |
| 5,448,619 A | 9/1995 | Evans et al. | |
| 5,507,035 A | 4/1996 | Bantz et al. | |
| 5,533,027 A | 7/1996 | Akerberg et al. | |
| 5,594,782 A | 1/1997 | Zicker et al. | |
| 5,610,969 A | 3/1997 | McHenry | |
| 5,634,193 A | 5/1997 | Ghisler | |
| 5,640,414 A | 6/1997 | Blakeney, II et al. | |
| 5,659,598 A | 8/1997 | Byrne et al. | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith | |
| 5,818,820 A | 10/1998 | Anderson et al. | |
| 5,822,681 A | 10/1998 | Chang et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A * | 9/1999 | Bhalla et al. | 370/331 |
| 5,960,341 A | 9/1999 | LeBlanc et al. | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A * | 4/2000 | Schellinger et al. | 455/445 |
| 6,101,176 A | 8/2000 | Honkasalo | |
| 6,112,080 A | 8/2000 | Anderson et al. | |
| 6,112,088 A | 8/2000 | Haartsen | |
| 6,115,608 A | 9/2000 | Duran et al. | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,226,515 B1 | 5/2001 | Pauli | |
| 6,229,792 B1 | 5/2001 | Anderson et al. | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 * | 12/2001 | Ostling | 455/437 |
| 6,359,872 B1 | 3/2002 | Mahany et al. | |
| 6,359,880 B1 | 3/2002 | Curry et al. | |
| 6,374,102 B1 | 4/2002 | Brachman et al. | |
| 6,381,457 B1 * | 4/2002 | Carlsson et al. | 455/435.2 |
| 6,389,059 B1 | 5/2002 | Smith et al. | |
| 6,415,158 B1 | 7/2002 | King et al. | |
| 6,430,395 B2 | 8/2002 | Arazi et al. | |
| 6,438,117 B1 | 8/2002 | Grilli et al. | |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,553,232 B1 | 4/2003 | Shaffer et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,600,925 B1 | 7/2003 | Rams | |
| 6,603,965 B1 | 8/2003 | Dinkin | |
| 6,611,533 B1 | 8/2003 | Liao et al. | |
| 6,633,761 B1 | 10/2003 | Singhal | |
| 6,643,512 B1 | 11/2003 | Ramaswamy | |
| 6,647,426 B2 * | 11/2003 | Mohammed | 709/238 |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,687,243 B1 | 2/2004 | Sayers et al. | |
| 6,711,400 B1 | 3/2004 | Aura | |
| 6,766,160 B1 | 7/2004 | Lemilainen et al. | |
| 6,788,656 B1 | 9/2004 | Smolentzov et al. | |
| 6,801,519 B1 * | 10/2004 | Mangal | 370/349 |
| 6,801,772 B1 | 10/2004 | Townend et al. | |
| 6,801,777 B2 * | 10/2004 | Rusch | 455/452.2 |
| 6,804,532 B1 | 10/2004 | Moon et al. | |
| 6,807,417 B2 | 10/2004 | Sallinen | |
| 6,807,431 B2 | 10/2004 | Sayers et al. | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,829,486 B2 | 12/2004 | McKenna et al. | |
| 6,834,192 B1 | 12/2004 | Watanabe et al. | |
| 6,842,462 B1 | 1/2005 | Ramjee et al. | |
| 6,850,503 B2 | 2/2005 | Dorenbosch et al. | |
| 6,853,851 B1 | 2/2005 | Rautiola et al. | |
| 6,879,600 B1 * | 4/2005 | Jones et al. | 370/466 |
| 6,895,255 B1 * | 5/2005 | Bridgelall | 455/552.1 |
| 6,909,705 B1 | 6/2005 | Lee et al. | |
| 6,922,559 B2 | 7/2005 | Mohammed | |
| 6,925,074 B1 * | 8/2005 | Vikberg et al. | 370/338 |
| 6,937,862 B2 | 8/2005 | Back et al. | |
| 6,961,573 B1 | 11/2005 | Moon et al. | |
| 6,970,719 B1 | 11/2005 | McConnell et al. | |
| 6,993,359 B1 * | 1/2006 | Nelakanti et al. | 455/554.1 |
| 6,999,767 B1 | 2/2006 | Jeong | |
| 7,006,433 B1 | 2/2006 | Dantu et al. | |
| 7,009,952 B1 | 3/2006 | Razavilar et al. | |
| 7,035,932 B1 | 4/2006 | Dowling | |
| 7,039,027 B2 | 5/2006 | Bridgelall | |
| 7,043,235 B2 | 5/2006 | Meyer et al. | |
| 7,054,290 B1 | 5/2006 | Djuphammar | |
| 7,065,353 B1 | 6/2006 | Bolinth et al. | |
| 7,127,250 B2 * | 10/2006 | Gallagher et al. | 455/436 |
| 7,139,287 B1 | 11/2006 | Costa et al. | |
| 7,149,521 B2 * | 12/2006 | Sundar et al. | 455/435.1 |
| 7,242,932 B2 | 7/2007 | Wheeler et al. | |
| 7,251,227 B2 | 7/2007 | de Jong et al. | |
| 7,283,823 B2 | 10/2007 | Pearce et al. | |
| 7,308,263 B2 | 12/2007 | Gallagher et al. | |
| 7,440,472 B2 * | 10/2008 | Delaney et al. | 370/466 |
| 2001/0029186 A1 | 10/2001 | Canyon et al. | |
| 2001/0031645 A1 | 10/2001 | Jarrett | |
| 2001/0046214 A1 | 11/2001 | Kang | |

| | | |
|---|---|---|
| 2001/0046860 A1 | 11/2001 | Lee |
| 2001/0049790 A1 | 12/2001 | Faccin et al. |
| 2002/0003789 A1 | 1/2002 | Kim et al. |
| 2002/0036983 A1 | 3/2002 | Widegren et al. |
| 2002/0045459 A1 | 4/2002 | Morikawa |
| 2002/0065099 A1 | 5/2002 | Bjorndahl |
| 2002/0066036 A1 | 5/2002 | Makineni |
| 2002/0075844 A1 | 6/2002 | Hagen |
| 2002/0082015 A1 | 6/2002 | Wu |
| 2002/0085516 A1 | 7/2002 | Bridgelall |
| 2002/0102974 A1 | 8/2002 | Raith |
| 2002/0118674 A1 | 8/2002 | Faccin et al. |
| 2002/0131387 A1* | 9/2002 | Pitcher et al. ............... 370/338 |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0168959 A1 | 11/2002 | Noguchi et al. |
| 2002/0186684 A1* | 12/2002 | Shaughnessy et al. ....... 370/352 |
| 2002/0191556 A1 | 12/2002 | Krishnarajah et al. |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0026269 A1* | 2/2003 | Paryani ..................... 370/401 |
| 2003/0031151 A1 | 2/2003 | Sharma et al. |
| 2003/0035464 A1 | 2/2003 | Dehner et al. |
| 2003/0043773 A1 | 3/2003 | Chang |
| 2003/0087653 A1 | 5/2003 | Leung |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1* | 6/2003 | Mohammed ............... 455/552 |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0165124 A1 | 9/2003 | Alperovich et al. |
| 2003/0176186 A1 | 9/2003 | Mohammed |
| 2003/0177088 A1 | 9/2003 | Nilsson et al. |
| 2003/0193952 A1 | 10/2003 | O'Neill |
| 2003/0210199 A1 | 11/2003 | Sward et al. |
| 2003/0219024 A1* | 11/2003 | Purnadi et al. .............. 370/401 |
| 2003/0223395 A1 | 12/2003 | Chitrapu et al. |
| 2004/0008649 A1 | 1/2004 | Wybenga |
| 2004/0009749 A1 | 1/2004 | Arazi et al. |
| 2004/0013099 A1 | 1/2004 | O'Neill |
| 2004/0037312 A1 | 2/2004 | Spear |
| 2004/0053623 A1 | 3/2004 | Hoff et al. |
| 2004/0068571 A1 | 4/2004 | Ahmavaara |
| 2004/0072593 A1* | 4/2004 | Robbins et al. ............. 455/560 |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0105434 A1 | 6/2004 | Baw |
| 2004/0116120 A1 | 6/2004 | Mohammed et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203788 A1 | 10/2004 | Fors et al. |
| 2004/0203800 A1 | 10/2004 | Myhre et al. |
| 2004/0203815 A1 | 10/2004 | Shoemake et al. |
| 2004/0218563 A1 | 11/2004 | Porter et al. |
| 2005/0064896 A1 | 3/2005 | Rautiola et al. |
| 2005/0070288 A1 | 3/2005 | Belkin et al. |
| 2005/0101245 A1 | 5/2005 | Ahmavaara |
| 2005/0101329 A1 | 5/2005 | Gallagher |
| 2005/0157673 A1 | 7/2005 | Verma et al. |
| 2005/0181805 A1 | 8/2005 | Gallagher |
| 2005/0186948 A1 | 8/2005 | Gallagher |
| 2005/0198199 A1 | 9/2005 | Dowling |
| 2005/0207395 A1 | 9/2005 | Mohammed |
| 2005/0239441 A1* | 10/2005 | Eronen ....................... 455/411 |
| 2005/0239453 A1 | 10/2005 | Vikberg et al. |
| 2005/0239468 A1 | 10/2005 | Segal |
| 2005/0254469 A1 | 11/2005 | Verma et al. |
| 2005/0255879 A1 | 11/2005 | Shi |
| 2005/0265279 A1* | 12/2005 | Markovic et al. ........... 370/328 |
| 2005/0266853 A1 | 12/2005 | Gallagher |
| 2005/0271008 A1 | 12/2005 | Gallagher |
| 2005/0272424 A1 | 12/2005 | Gallagher |
| 2005/0272449 A1 | 12/2005 | Gallagher |
| 2006/0009201 A1* | 1/2006 | Gallagher et al. ......... 455/414.1 |
| 2006/0009202 A1 | 1/2006 | Gallagher |
| 2006/0019656 A1 | 1/2006 | Gallagher |
| 2006/0019657 A1 | 1/2006 | Gallagher |
| 2006/0019658 A1 | 1/2006 | Gallagher |
| 2006/0019667 A1* | 1/2006 | Hicks, III .................... 455/445 |
| 2006/0025143 A1 | 2/2006 | Gallagher |
| 2006/0025144 A1 | 2/2006 | Gallagher |
| 2006/0025145 A1 | 2/2006 | Gallagher et al. |
| 2006/0025146 A1 | 2/2006 | Gallagher |
| 2006/0025147 A1 | 2/2006 | Gallagher |
| 2006/0079258 A1 | 4/2006 | Gallagher |
| 2006/0079259 A1* | 4/2006 | Gallagher et al. ........... 455/517 |
| 2006/0079273 A1 | 4/2006 | Gallagher |
| 2006/0079274 A1* | 4/2006 | Gallagher et al. ......... 455/552.1 |
| 2006/0094431 A1* | 5/2006 | Saifullah et al. ............. 455/436 |
| 2006/0098598 A1 | 5/2006 | Gallagher |
| 2006/0099935 A1 | 5/2006 | Gallagher et al. |
| 2006/0146803 A1 | 7/2006 | Bae et al. |
| 2006/0148511 A1 | 7/2006 | Bender et al. |
| 2006/0153110 A1 | 7/2006 | Morgan et al. |
| 2006/0189319 A1* | 8/2006 | Houldsworth et al. ....... 455/445 |
| 2006/0223532 A1 | 10/2006 | Liu et al. |
| 2006/0239277 A1 | 10/2006 | Gallagher |
| 2006/0268845 A1 | 11/2006 | He et al. |
| 2007/0232312 A1 | 10/2007 | Gallagher et al. |
| 2007/0268855 A1 | 11/2007 | Grayson et al. |
| 2007/0287459 A1 | 12/2007 | Diachina et al. |
| 2007/0293222 A1 | 12/2007 | Vikberg et al. |
| 2008/0119187 A1 | 5/2008 | Gallagher et al. |
| 2008/0123596 A1 | 5/2008 | Gallagher et al. |
| 2008/0132239 A1 | 6/2008 | Khetawat et al. |

FOREIGN PATENT DOCUMENTS

| | | |
|---|---|---|
| EP | 1207708 B1 | 10/2004 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03/085992 | 10/2003 |
| WO | WO 03092312 A1 | 11/2003 |
| WO | WO 2004002051 A2 | 12/2003 |
| WO | WO 2004034219 A2 | 4/2004 |
| WO | WO 2004039111 A1 | 5/2004 |
| WO | WO 2005006597 A1 | 1/2005 |
| WO | WO 2005107169 A1 | 11/2005 |
| WO | WO 2005107297 A1 | 11/2005 |
| WO | WO 2005/120017 | 12/2005 |
| WO | PCT/US2005/040689 | 3/2006 |
| WO | WO 2005114918 A3 | 3/2006 |

| WO | WO 2006/053102 | 5/2006 |
| WO | WO 2008/009016 | 1/2008 |

OTHER PUBLICATIONS

*Ericsson Press Release*: "Ericsson presents the Mobile@Hometm concept," Mar. 21, 2001, http://www.ericsson.com/press/archive/2001Q1/20010321-0048.html, printed Jan. 6, 2004, pp. 1-2.

Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.

Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

U.S. Appl. No. 11/225,872, filed Sep. 12, 2005, Gallagher, Michael, Non-Final Office Action of related case mailed: May 8, 2006.

U.S. Appl. No. 11/227,840, filed Sep. 14, 2005, Gallagher, Michael, Non-Final Office Action of related case mailed: Apr. 21, 2006.

U.S. Appl. No. 11/227,842, filed Sep. 14, 2005, Gallagher, Michael, Non-Final Office Action of related case mailed: Jun. 5, 2006.

U.S. Appl. No. 11/228,853, filed Sep. 15, 2005, Gallagher, Michael, Non-Final Office Action of related case mailed: Jun. 6, 2006.

U.S. Appl. No. 11/229,470, filed Sep. 15, 2005, Gallagher, Michael, Non-Final Office Action of related case mailed: Jun. 5, 2006.

U.S. Appl. No. 11/097,866, filed Mar. 31, 2005, Michael D. Gallagher et al., Non-published patent application (specification, drawings, claims, abstract) of a related pending U.S. Patent Application.

U.S. Appl. No. 11/110,222, filed Apr. 20, 2005, Michael D. Gallagher et al., Non-published patent application (specification, drawings, claims, abstract) and Preliminary Amendment of a related pending U.S.. Patent Application.

Non-Final Office Action of U.S. Appl. No. 10/116,311, Sep. 7, 2006 (mailing date), Mohammed, Jahangir.

Non-Final Office Action of U.S. Appl. No. 10/116,311, Mar. 6, 2007 (mailing date), Mohammed, Jahangir.

Final Office Action of U.S. Appl. No. 10/116,311, Aug. 24, 2007 (mailing date), Mohammed, Jahangir.

Non-Final Office Action of U.S. Appl. No. 10/116,311, May 12, 2008 (mailing date), Mohammed, Jahangir.

Non-Final Office Action of U.S. Appl. No. 10/116,186, Oct. 2, 2006 (mailing date), Mohammed, Jahangir.

Non-Final Office Action of U.S. Appl. No. 10/116,186, Aug. 10, 2007 (mailing date), Mohammed, Jahangir.

Non-Final Office Action of U.S. Appl. No. 10/116,186, Apr. 4, 2008 (mailing date), Mohammed, Jahangir.

Final Office Action of U.S. Appl. No. 10/115,767, Jul. 27, 2006 (mailing date), Mohammed, Jahangir.

Non-Final Office Action of U.S. Appl. No. 10/115,767, Jun. 14, 2007 (mailing date), Mohammed, Jahangir.

Non-Final Office Action of U.S. Appl. No. 11/933,386, Aug. 11, 2008 (mailing date), Gallagher, Michael, et al.

Non-Final Office Action of U.S. Appl. No. 11/029,947, Mar. 6, 2008 (mailing date), Gallagher, Michael.

International Search Report for PCT/US2003/004485, May 20, 2003 (mailing date), Kineto Wireless, Inc.

Non-Final Office Action of U.S. Appl. No. 11/029,947, Oct. 3, 2008 (mailing date), Gallagher, Michael.

International Search Report and Written Opiniom for PCT/US2004/015940, Mar. 4, 2005 (mailing date), Kineto Wireless, Inc.

International Preliminary Report on Patentability and Written Opinion for PCT/US2004/015940, Nov. 30, 2006 (mailing date), Kineto Wireless, Inc.

International Preliminary Report on Patentability and Written Opinion for PCT/US2005/040689, May 24, 2007 (mailing date), Kineto Wireless, Inc.

ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.

*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.

*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.

*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.

*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.

"Unlicensed Mobile Access (UMA); User Perspective (Stage 1);" UMA User Perspective (Stage 1) R1.0.0 (Sep. 1, 2004) Technical Specification, Sep. 1, 2004, 29 pages.

"Unlicensed Mobile Access (UMA); Architecture (Stage 2);" UMA Architecture (Stage 2) R1.0.0 (Sep. 1, 2004) Technical Specification, Sep. 1, 2004, 78 pages.

"Unlicensed Mobile Access (UMA); Protocols (Stage 3);" UMA Protocols (Stage 3) R1.0.0 (Sep. 1, 2004) Technical Specification, Sep. 1, 2004, 142 pages.

"Unlicensed Mobile Access (UMA); Architecture (Stage 2);" UMA Architecture (Stage 2) R1.0.1 (Oct. 8, 2004) Technical Specification, Oct. 8, 2004, 80 pages.

"Unlicensed Mobile Access (UMA); Protocols (Stage 3);" UMA Protocols (Stage 3) R1.0.1 (Oct. 8, 2004) Technical Specification, Oct. 8, 2004, 142 pages.

"Unlicensed Mobile Access (UMA); Architecture (Stage 2);" UMA Architecture (Stage 2) R1.0.2 (Nov. 3, 2004) Technical Specification, Nov. 3, 2004, 79 pages.

"Unlicensed Mobile Access (UMA); Protocols (Stage 3);" UMA Protocols (Stage 3) R1.0.2 (Nov. 5, 2004) Technical Specification, Nov. 5, 2004, 142 pages.

U.S. Appl. No. 11/080,714, Mar. 14, 2005 (filing date), Satish Agrawal et al.

Restriction Requirement of U.S. Appl. No. 10/116,311, Dec. 24, 2008 (mailing date), Mohammed, Jahangir.

Final Office Action of U.S. Appl. No. 10/116,311, Apr. 13, 2009 (mailing date), Mohammed, Jahangir.

Non-Final Office Action of U.S. Appl. No. 10/251,901, Aug. 9, 2006 (mailing date), Mohammed, Jahangir.

Notice of Allowance of U.S. Appl. No. 10/251,901, Sep. 10, 2007 (mailing date), Mohammed, Jahangir.

Final Office Action of U.S. Appl. No. 11/029,947, Apr. 15, 2009 (mailing date), Michael D. Gallagher et al.

Non-Final Office Action of U.S. Appl. No. 11/059,772, Nov. 27, 2007 (mailing date), Mohammed, Jahangir.

Non-Final Office Action of U.S. Appl. No. 11/059,772, Jun. 24, 2008 (mailing date), Mohammed, Jahangir.

Final Office Action of U.S. Appl. No. 11/059,772, Jan. 8, 2009 (mailing date), Mohammed, Jahangir.

Advisory Action of U.S. Appl. No. 11/059,772, Mar. 25, 2009 (mailing date), Mohammed, Jahangir.

Non-Final Office Action of U.S. Appl. No. 11/080,714, Nov. 29, 2007 (mailing date), Mohammed, Jahangir.

Final Office Action of U.S. Appl. No. 11/080,714, Jul. 9, 2008 (mailing date), Mohammed, Jahangir.

Non-Final Office Action of U.S. Appl. No. 11/080,714, Apr. 1, 2009 (mailing date), Mohammed, Jahangir.

Non-Final Office Action of U.S. Appl. No. 11/129,424, May 1, 2008 (mailing date), Michael D. Gallagher et al.

Notice of Allowance of U.S. Appl. No. 11/129,424, Feb. 6, 2009 (mailing date), Michael D. Gallagher et al.

Non-Final Office Action of U.S. Appl. No. 11/688,256, Jan. 2, 2009 (mailing date), Michael D. Gallagher et al.

Non-Final Office Action of U.S. Appl. No. 11/927,670, Aug. 25, 2008 (mailing date), Michael D. Gallagher et al.

Final Office Action of U.S. Appl. No. 11/927,670, Feb. 24, 2009 (mailing date), Michael D. Gallagher et al.

Notice of Allowance of U.S. Appl. No. 11/933,386, mailed Mar. 23, 2009, Michael D. Gallagher et al.

Notice of Allowance of U.S. Appl. No. 11/933,386, mailed Apr. 17, 2009, Michael D. Gallagher et al.

International Search Report and Written Opinion of PCT/US2004/040858, Apr. 26, 2005 (mailing date), Kineto Wireless, Inc.

International Preliminary Report on Patentability and Written Opinion for PCT/US2004/040858, Jun. 7, 2006 (mailing date), Kineto Wireless, Inc.

International Search Report and Written Opinion of PCT/US2007/073557, Jul. 16, 2008 (mailing date), Kineto Wireless, Inc.

International Preliminary Report on Patentability and Written Opinion for PCT/US2007/073557, Jan. 14, 2009 (mailing date), Kineto Wireless, Inc.

U.S. Appl. No. 10/115,767, filed Apr. 2, 2002, Mohammed, Non-Final Office Action of related case.

U.S. Appl. No. 10/115,835, filed Apr. 2, 2002, Mohammed, Non-Final Office Action of related case.

U.S. Appl. No. 10/116,023, filed Apr. 2, 2002, Mohammed, Non-Final Office Action of related case.

U.S. Appl. No. 10/116,186, filed Apr. 2, 2002, Mohammed, Final Office Action of related case.

U.S. Appl. No. 10/116,186, filed Apr. 2, 2002, Mohammed, Non-Final Office Action of related case.

U.S. Appl. No. 10/116,311, filed Apr. 2, 2002, Mohammed, Non-Final Office Action of related case.

U.S. Appl. No. 10/251,901, filed Sep. 20, 2002, Gallagher, Non-Final Office Action of related case.

U.S. Appl. No. 10/688,470, filed Oct. 17, 2003, Gallagher, Non-Final Office Action of related case.

U.S. Appl. No. 11/225,398, filed Sep. 12, 2005, Gallagher, Non-Final Office Action of related case.

U.S. Appl. No. 11/225,871, filed Sep. 12, 2005, Gallagher, Non-Final Office Action of related case.

U.S. Appl. No. 11/226,610, filed Sep. 13, 2005, Gallagher, Non-Final Office Action of related case.

U.S. Appl. No. 11/226,617, filed Sep. 13, 2005, Gallagher, Non-Final Office Action of related case.

U.S. Appl. No. 11/227,573, filed Sep. 14, 2005, Gallagher, Non-Final Office Action of related case.

U.S. Appl. No. 11/227,784, filed Sep. 14, 2005, Gallagher, Non-Final Office Action of related case.

* cited by examiner

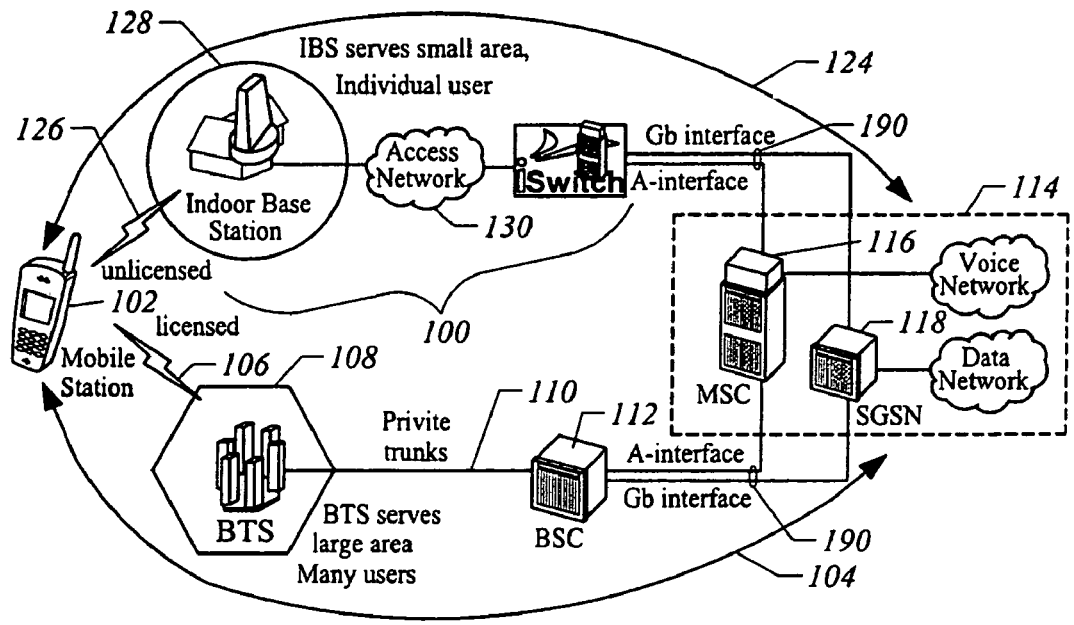
FIG. 1A
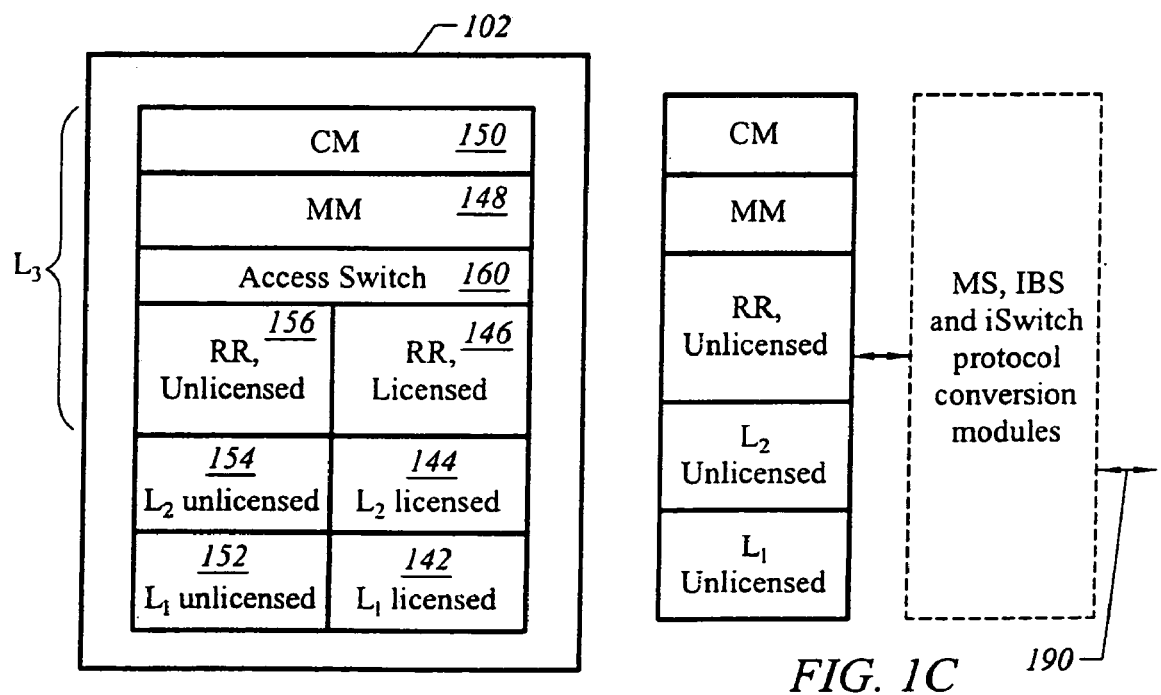
FIG. 1B
FIG. 1C

APPARATUS AND METHOD FOR EXTENDING THE COVERAGE AREA OF A LICENSED WIRELESS COMMUNICATION SYSTEM USING AN UNLICENSED WIRELESS COMMUNICATION SYSTEM

CROSS REFERENCE TO RELATED APPLICATIONS

This application is a continuation-in-part of U.S. Nonprovisional Application Ser. No. 10/688,470, entitled "Apparatus and Method for Extending the Coverage Area," filed Oct. 17, 2003, which claims the benefit of U.S. Provisional Application Ser. No. 60/419,785 filed Oct. 18, 2002, assigned to the corporate assignee of the present invention, the contents of which are hereby incorporated by reference in their entirety.

This application claims the benefit of U.S. Provisional Application Ser. No. 60/527,499, entitled "CDMA/IAN Hybrid Handset System," filed Dec. 5, 2003, the contents of which are hereby incorporated by reference in their entirety.

This application is also related to commonly owned U.S. applications Ser. No. 10/115,833, entitled "Unlicensed Wireless Communications Base Station to Facilitate Unlicensed and Licensed Wireless Communications with a Subscriber Device, and Method of Operation," filed Apr. 2, 2002; application Ser. No. 10/251,901, entitled "Apparatus for Supporting the Handover of a Telecommunication Session between a Licensed Wireless System and an Unlicensed Wireless System," filed Sep. 20, 2002; Provisional Application Ser. No. 60/447,575, entitled "Mobile Station Functionality in Support of a System for Extending the Coverage Area of a Licensed Wireless Communication System using an Unlicensed Wireless Communication," filed Feb. 14, 2003; and Provisional Application Ser. No. 60/468,336, entitled "Method for Installation of Broadband Customer Premise Equipment without User/Operator Configuration," filed May 5, 2003, the contents of each of which are hereby incorporated by reference.

FIELD OF THE INVENTION

This invention relates generally to telecommunications. More particularly, this invention relates to a technique for seamlessly integrating voice and data telecommunication services across a licensed wireless system and an unlicensed wireless system.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station equipment is used to support communications on licensed frequencies. Base stations are typically installed approximately a mile apart from one another. As a result, the quality of service (voice quality and speed of data transfer) in wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

Currently, unlicensed wireless communication systems are deployed to increase the mobility of an individual using a landline. The mobility range associated with such systems is typically on the order of 100 meters or less. A common unlicensed wireless communication system includes a base station with a physical connection to a landline. The base station has a RF transceiver to facilitate communication with a wireless handset that is operative within a modest distance of the base station. Thus, this option provides higher quality services at a lower cost, but the services only extend a modest distance from the base station.

Thus, there are significant shortcomings associated with current landline systems and licensed wireless systems. For this reason, individuals commonly have one telephone number for landline communications and one telephone number for licensed wireless communications. This leads to additional expense and inconvenience for an individual. It would be highly desirable if an individual could utilize a single telephone number for both landline communications and licensed wireless communications. Ideally, such a system would allow an individual, through seamless handoffs between the two systems, to exploit the benefits of each system.

SUMMARY OF THE INVENTION

Extending the coverage area of a licensed wireless communication system using an unlicensed communication system is described. In one embodiment, the system comprises a mobile station operable to communicate with a telecommunications network using a licensed wireless communication channel serviced by the telecommunications network in a first mode and an unlicensed wireless communication channel in a second mode, a base station communicably coupled to the mobile station via the unlicensed wireless communication channel, and a network controller communicably coupled to the base station and adapted to communicate with the telecommunications network, wherein the mobile station includes call control to control a communication session with the telecommunications network through the network controller using the unlicensed wireless communication channel by exchanging call control information with the network controller via one or more messages having the A1 protocol message format.

BRIEF DESCRIPTION OF THE FIGURES

The invention is more fully appreciated in connection with the following detailed description taken in conjunction with the accompanying drawings, in which:

FIG. 1A provides an overview of the indoor access network (IAN) mobile service solution in accordance with one embodiment of the present invention;

FIG. 1B illustrates protocol layers of a mobile set in accordance with one embodiment of the present invention;

FIG. 1C illustrates a method of protocol conversion in accordance with one embodiment of the present invention;

DETAILED DESCRIPTION OF THE INVENTION

Figure 2:
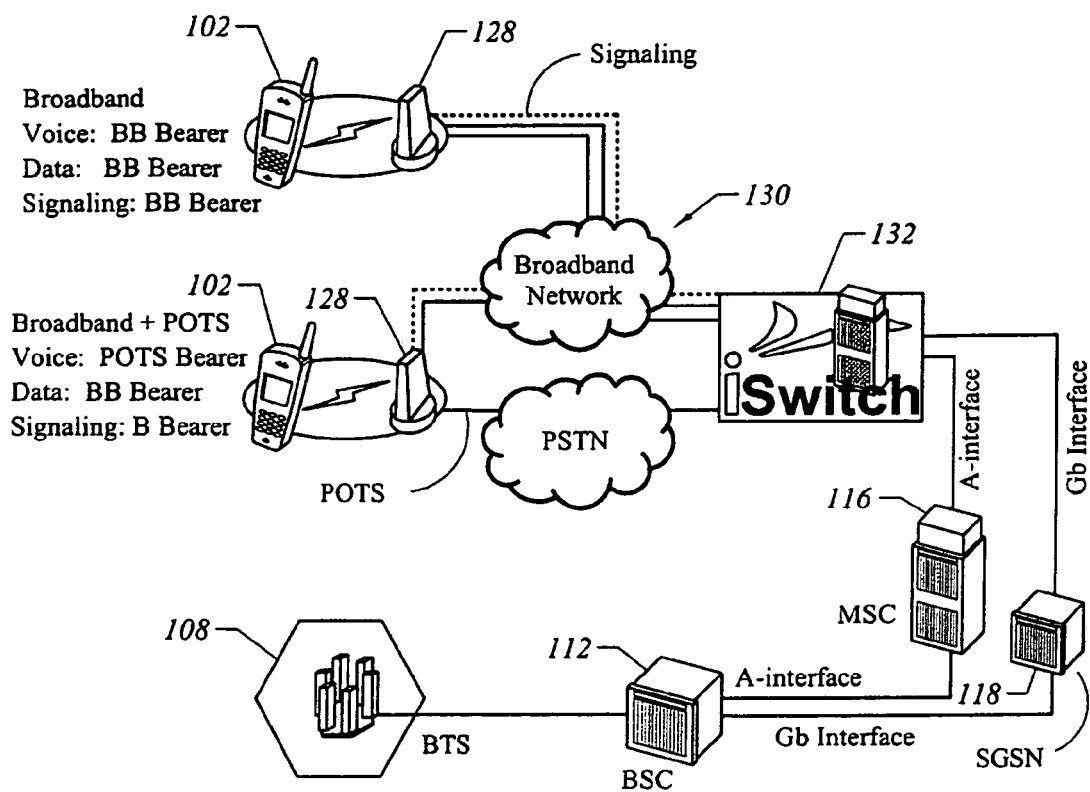
FIG. 2 illustrates two indoor access network (IAN) options in accordance with one embodiment of the present invention.

An apparatus and method for extending the coverage area of a licensed wireless communication system using an unlicensed wireless communication system using A1 signaling is described. More specifically, in one embodiment, the mobile station and a network controller (e.g., an indoor access network controller) use the A1 protocol message format (normally used between BSC & MSC) as the format for their signaling message. One such message is a ADDS message, but there are many more. However, ideally we don't want to limit the invention to requiring this specific message format. In one more specific embodiment, the system comprises a mobile station operable to communicate with a telecommunications network using a licensed wireless communication channel serviced by the telecommunications network in a first mode and an unlicensed wireless communication channel in a second mode, a base station communicably coupled to the mobile station via the unlicensed wireless communication channel, and a network controller communicably coupled to the base station and adapted to communicate with the telecommunications network, wherein the mobile station includes call control to control a communication session with the telecommunications network through the network controller using the unlicensed wireless communication channel by exchanging call control information with the network controller via one or more messages having the A1 protocol message format.

The unlicensed wireless system is a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Representative of this type of device is the Phonecell line of products from Telular Corporation of Chicago, Ill. Application of the present invention to this type of device enables the wireless service provider to offer so-called landline replacement service to users, even for user locations not sufficiently covered by the licensed wireless system. Throughout the following description, acronyms commonly used in the telecommunications industry for wireless services are utilized along with acronyms specific to the present invention. A table of acronyms specific to this application is included in Appendix I.

FIG. 1A illustrates an Indoor Access Network (IAN) system 100 in accordance with one embodiment of the present invention. As indicated by first arrow 104, a licensed wireless communication session is conducted with a mobile station (MS) 102 to a voice or data telecommunications network 114 (e.g., including a mobile switching center (MSC) 116 for voice data or a serving GPRS support node (SGSN) 118 for a data network). The first path 104 includes a wireless channel 106 of a licensed wireless system, a base transceiver station (BTS) 108, private trunks 110, and a base station controller (BSC) 112. The base station controller 112 communicates with telecommunications network 114 through a standard base station controller interface 190. For example, the base station controller 112 may communicate with the MSC via the GSM A-interface for circuit switched voice services and with the SGSN via the GSM Gb interface for packet data services (GPRS). Conventional licensed voice and data networks 114 include protocols to permit seamless handoffs from one recognized base station controller 112 to another base station controller 112 (not shown).

However, if the mobile station is within range of an indoor base station (IBS) 128, a wireless session is conducted using an unlicensed channel of an unlicensed wireless system. In one embodiment, the service area of indoor base station 128 is an indoor portion of a building, although it will be understood that the service region of indoor base station 128 may include an outdoor portion of a building or campus. As indicated by second arrow 124, the mobile station 102 may be connected to the telecommunications network 114 via a second data path 124 including an unlicensed wireless channel 126, an unlicensed wireless service indoor base station (IBS) 128, an access network 130, and an indoor network controller (INC) 132 (also described by the inventors of the present application as an "Iswitch") to voice/data network 114. The indoor network controller 132 also communicates with network 114 using a base station controller interface 190. As described below in more detail, indoor base station 128 and indoor network controller 132 may include software entities stored in memory and executing on one or more microprocessors (not shown in FIG. 1A) adapted to perform protocol conversion.

The unlicensed wireless channel 126 may be an unlicensed, free spectrum (e.g., spectrum around 2.4 GHz or 5 GHz). The unlicensed wireless service may have an associated communication protocol. As examples, the unlicensed wireless service may be a Bluetooth compatible wireless service, or a wireless local area network (LAN) service (e.g., the 802.11 IEEE wireless standard). This provides the user with potentially improved quality of service in the service regions of the unlicensed wireless service. Thus, when a subscriber is within range of the unlicensed base station, the subscriber may enjoy low cost, high speed, and high quality voice and data services. In addition, the subscriber enjoys extended service range since the handset can receive services deep within a building. This type of service range is not reliably provided by a licensed wireless system. However, the subscriber can roam outside the range of the unlicensed base station without dropping communications. Instead, roaming outside the range of the unlicensed base station results in a seamless handoff (also referred to as a hand over) wherein communication services are automatically provided by the licensed wireless system, as described in more detail in U.S. patent application Ser. No. 10/115,833, the contents of which are hereby incorporated by reference.

Mobile station 102 has a microprocessor and memory (not shown) that includes computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR-sublayer is concerned with the management of an RR-session, which is the time that a mobile station is in a "dedicated mode" (i.e., has an active voice call or signaling session), as well as the configuration of radio channel, power controller, discontinuing transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

In one embodiment of the present invention, the mobile station also includes an unlicensed wireless service physical layer 152 (i.e., a physical layer for unlicensed wireless service such as Bluetooth, Wireless local area network, or other unlicensed wireless channel). The mobile station also includes an unlicensed wireless service level 2 link layer 154. The mobile station also includes an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed wireless service indoor base station 128

The unlicensed radio resource sublayer 156 and unlicensed link layer 154 may include protocols specific to the unlicensed wireless service utilized in addition to protocols selected to facilitate seamless handoff between licensed and unlicensed wireless systems, as described below in more detail. Consequently, the unlicensed radio resource sublayer 156 and unlicensed link layer 154 need to be converted into a format compatible with a conventional base station controller interface protocol 190 recognized by a MSC, SGSN, or other voice or data network.

Referring to FIG. 1C, in one embodiment of the present invention, the mobile station 102, indoor base station 128 and indoor network controller 132 provide an interface conversion function to convert the level 1, level 2, and level 3 layers of the unlicensed service into a conventional base station subsystem (BSS) interface 190 (e.g., an A-interface or a Gb-interface). As a result of the protocol conversion, a communication session may be established that is transparent to the voice network/data network 114, i.e., the voice/data network 114 uses its standard interface and protocols for the communication session as it would with a conventional communication session handled by a conventional base transceiver station. For example, in some embodiments the mobile station 102 and indoor network controller 132 are configured to initiate location update and service requests that ordinarily originate from a base station controller. As a result, protocols for a seamless handoff of services that is transparent to voice/data network 114 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 190 for a voice/data network 114. In one embodiment, the licensed wireless service is a GSM/GPRS radio access network, although it will be understood that embodiments of the present invention include other licensed wireless services. For this embodiment, the indoor network controller 132 interconnects to the GSM core network via the same base station controller interfaces 190 used by a standard GSM BSS network element. For example, in a GSM application, these interfaces are the GSM A-interface for circuit switched voice services and the GSM Gb interface for packet data services (GPRS). In a UMTS application of the invention, the indoor network controller 132 interconnects to the UMTS network using a UMTS Iu-cs interface for circuit switched voice services and the UMTS Iu-ps interface for packet data services. In a CDMA application of the invention, the indoor network controller 132 interconnects with the CDMA network using the CDMA A1 and A2 interfaces for circuit switched voice services and the CDMA A10 and A11 interfaces for packet data services.

In a GSM/GPRS embodiment, indoor network controller 132 appears to the GSM/GPRS core network as a GSM BSS network element and is managed and operated as such. In this architecture the principle elements of transaction control (e.g., call processing) are provided by higher network elements; namely the MSC 116 visitor location registry (VLR) and the SGSN. Authorized mobile stations are allowed access to the GSM/GPRS core network either directly through the GSM radio access network if they are outside of the service area of an indoor base station or via the indoor access network system 100 if they are within the service area of an indoor base station 128.

Since a communication session to the IAN system 100 is transparent to a voice or data network 114, the unlicensed wireless service may support all user services that are typically offered by the wireless service provider. In the GSM case, this preferably includes the following basic services: Telephony; Emergency call (e.g., E911 calling in North America); Short message, mobile-terminated point-to-point (MT/PP); Short message, mobile-originated point-to-point (MO/PP); GPRS bearer services; Handover (outdoor-to-indoor, indoor-to-outdoor, voice, data, SMS, SS). Additionally for GSM, this preferably includes the following supplementary services: Call Deflection; Calling Line Identification Presentation; Calling Line Identification Restriction; Connected Line Identification Presentation; Connected Line Identification Restriction; Call Forwarding Unconditional; Call Forwarding on Mobile Subscriber Busy; Call Forwarding on No Reply; Call Forwarding on Mobile Subscriber Not Reachable; Calling Name Presentation; Call Waiting; Call Hold; Multi Party Service; Closed User Group; Advice of Charge (Information); Advice of Charge (Charging); User-to-user signaling; Barring of All Outgoing Calls; Barring of Outgoing International Calls; Barring of Outgoing International Calls except those directed to the Home PLMN Country; Barring of All Incoming Calls; Barring of Incoming Calls when Roaming Outside the Home PLMN Country; Explicit Call Transfer; Support of Private Numbering Plan; Completion of calls to busy subscribers; Unstructured Supplementary Services Data; SIM Toolkit. Moreover, it preferably includes Regulatory and Other Services such as: lawfully authorized electronic surveillance (also known as "wiretap"); TTY (also known as Telecommunications Device for the Deaf); and Location services.

FIG. 2 illustrates embodiments of the access network 130 configuration for coupling the indoor base station 128 to the indoor network controller 132. In one embodiment, the access network is broadband only. In this architecture, all traffic between the indoor network controller 132 and the customer premise equipment (i.e., indoor base station and mobile station), including all voice service, data service and signaling traffic, is conveyed using a broadband access network. In a hybrid version, both Broadband and POTS are used. In this architecture, all data service and signaling traffic between the indoor network controller 132 and the customer premise equipment is conveyed using a broadband access network; however, voice traffic is conveyed using common PSTN bearer channels (e.g., POTS or Plain Old Telephone Service). We refer to this as the "hybrid architecture" in this application.

Figure 3:
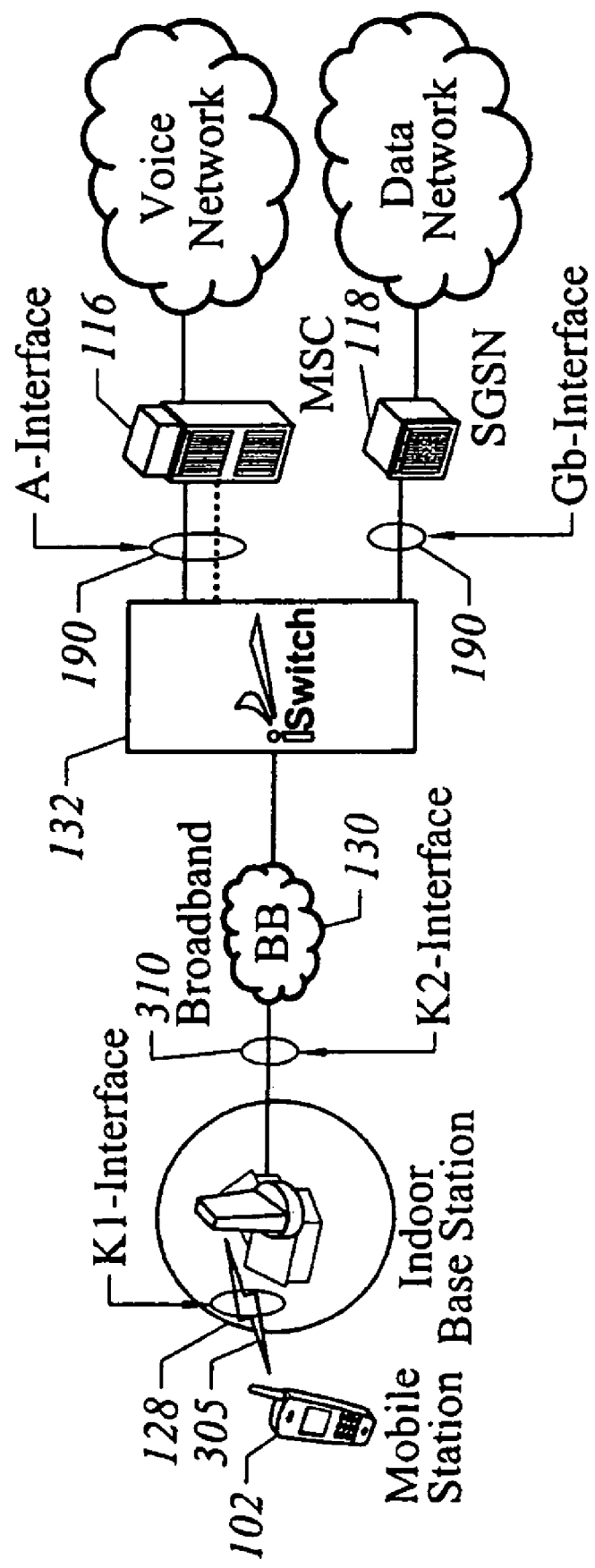
FIG. 3 illustrates an indoor access network (IAN) Broadband architecture in accordance with one embodiment of the present invention.

FIG. 3 illustrates one embodiment of an IAN broadband architecture. A K1 interface 305 between the mobile station 102 and the indoor base station 128 is illustrated along with a K2 interface 310 between the indoor base station 128 and indoor network controller 132.

Figure 4:
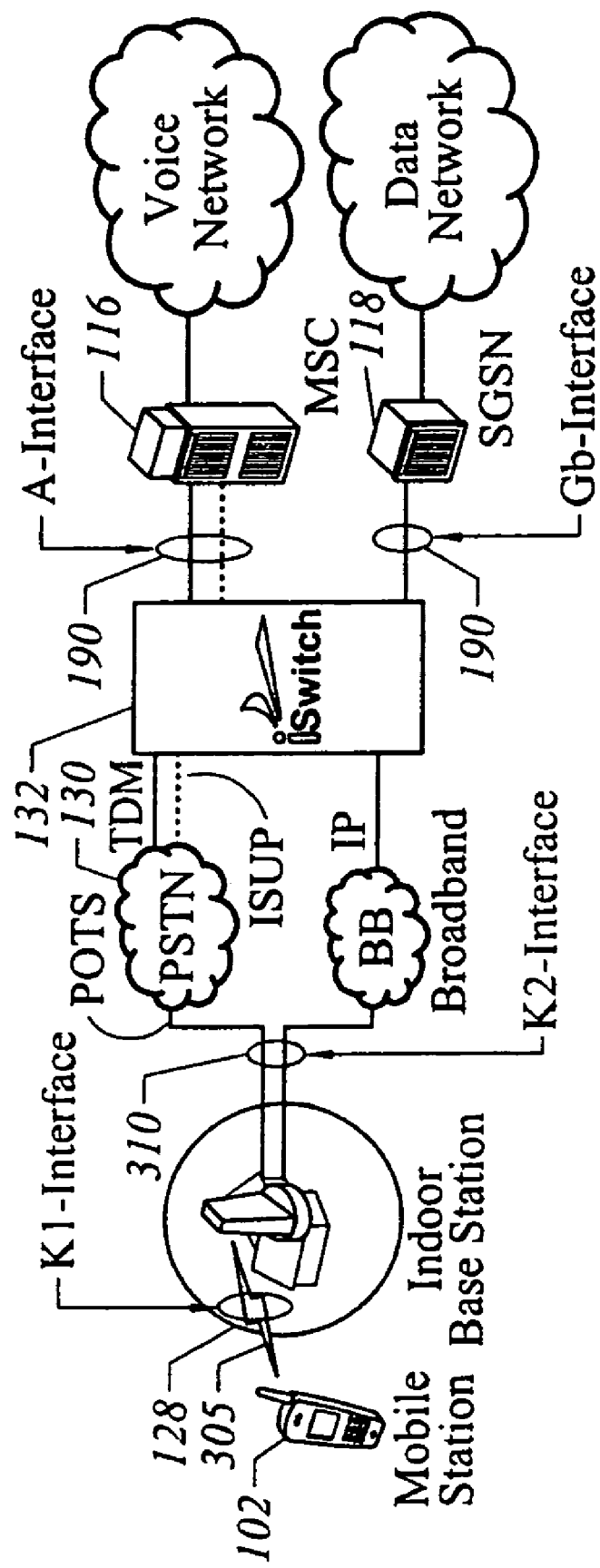
FIG. 4 illustrates an IAN Hybrid architecture in accordance with one embodiment of the present invention.

FIG. 4 illustrates an embodiment of a hybrid IAN architecture for GSM. The K1 interface 305 between the mobile station 102 and the indoor base station 128 and the K2 interface 310 between the indoor base station 128 and the indoor network controller 132 is illustrated. These interfaces and techniques for protocol conversion will be described below in more detail.

Figure 5:
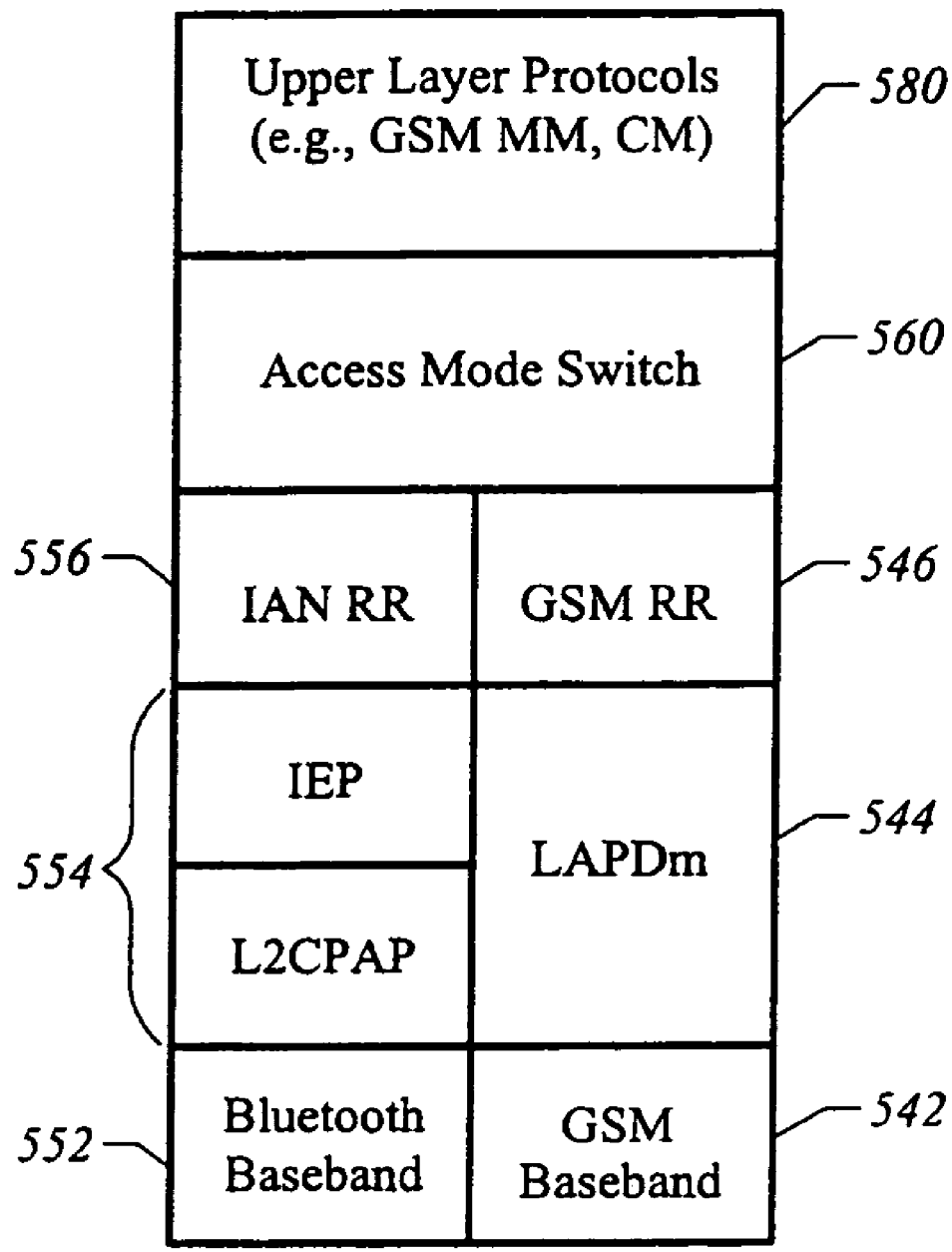
FIG. 5 illustrates components of a GSM mobile set for providing level 1, level 2, and level 3 layers for a licensed wireless service and an unlicensed wireless service in accordance with one embodiment of the present invention.

FIG. 5 provides an overview of a level 1, level 2, and level 3 GSM-related protocol architecture for one embodiment of mobile station 102. As illustrated, there are two logical radio resource (RR) management entities: the GSM RR entity 546 and the IAN RR entity 556. The protocol architecture includes a GSM baseband level 1 layer 542, GSM level 2 link layer 544, Bluetooth baseband level 1 layer 552, Bluetooth level 2 layers 554, access mode switch 560, and upper layer protocols 580. When the MS (mobile station) is operating in an IAN mode, the IAN RR entity 556 is the current "serving" RR entity providing service to the mobility management (MM) sublayer via the designated service access point (SAP) (RR-SAP) (shown in FIG. 6). The GSM RR entity is detached from the MM sublayer in this mode. The IAN RR entity 556 is a new set of functions. IAN-RR entity 556 is responsible for several tasks. First the IAN-RR entity 556 is responsible for discovery of IAN coverage and IAN registration. Second, the IAN-RR entity 556 is responsible for emulation of the GSM RR layer to provide the expected services to the MM layer; i.e., create, maintain and tear down RR connections. In one embodiment, all existing GSM 04.07 primitives defined for the RR-SAP apply. The plug-in of the IAN RR entity 556 is made transparent to the upper layer protocols in this way. Third, the IAN-RR entity 556 module is responsible for coordination with the GSM RR entity to manage access mode switching and handover.

Figure 6:
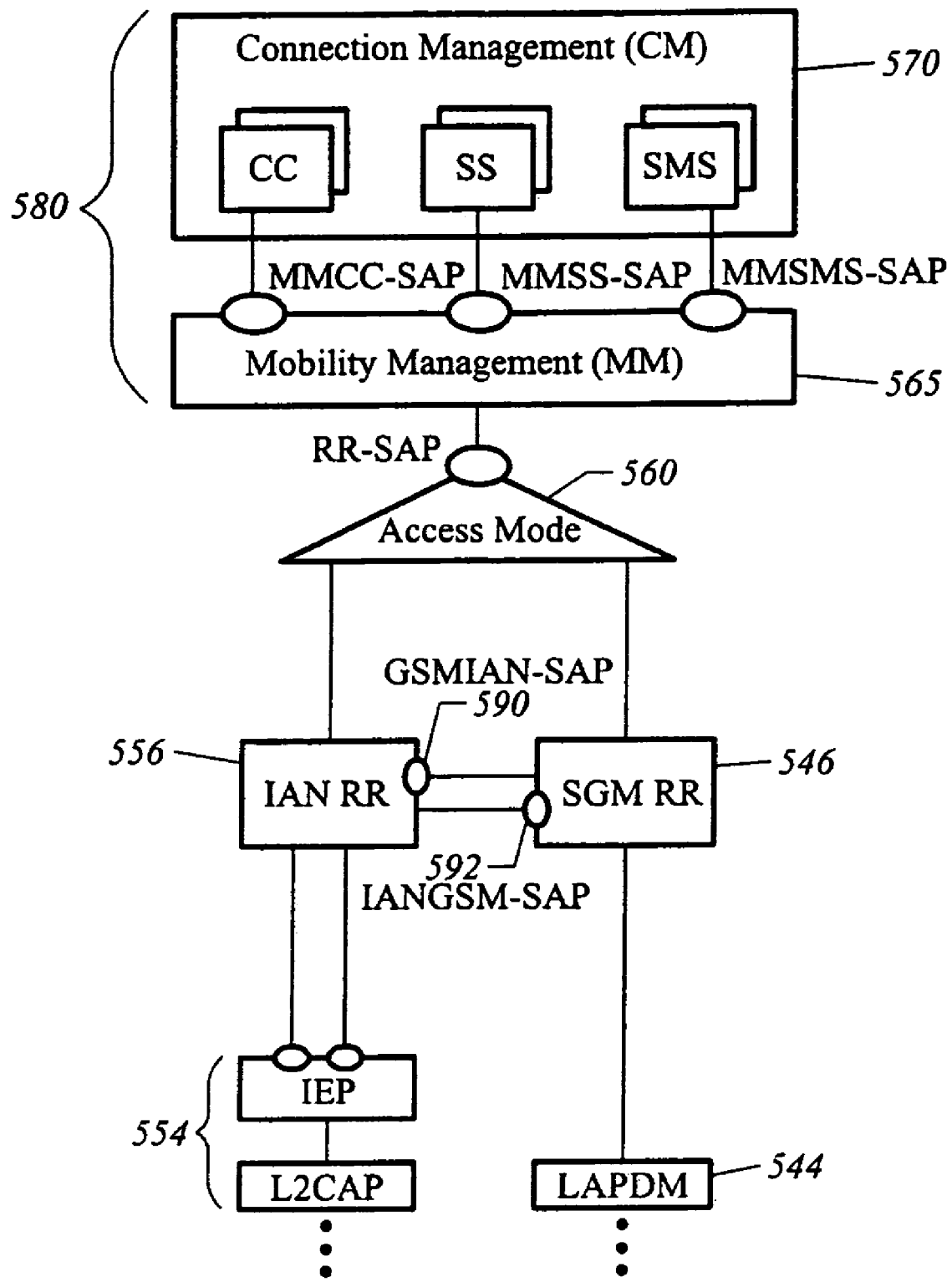
FIG. 6 illustrates components of mobile set for providing level 1, level 2, and level 3 layers for a GSM licensed wireless service and an unlicensed wireless service in accordance with one embodiment of the present invention.

FIG. 6 illustrates an embodiment of the mobile station 102 showing portions of the level 2 and level 3 layers. In this embodiment, there is provided IANGSM-SAP 592, GSMIAN-SAP 590 interface handlers for access mode switching and handover. The IAN RR entity 556 provides coordination with the GSM RR entity 546 through the IANGSM-SAP 592, specifically for access mode switching and "handout" (i.e., from indoor to outdoor) procedures. The GSM RR entity 546 provides coordination with the IAN RR entity 556 through the GSMIAN-SAP 590, specifically for access mode switching and "handing over" (i.e., from outdoor to indoor) procedures. The function of mobility management layer 565 and connection management layer 570 will be described below in more detail.

Figure 7A:
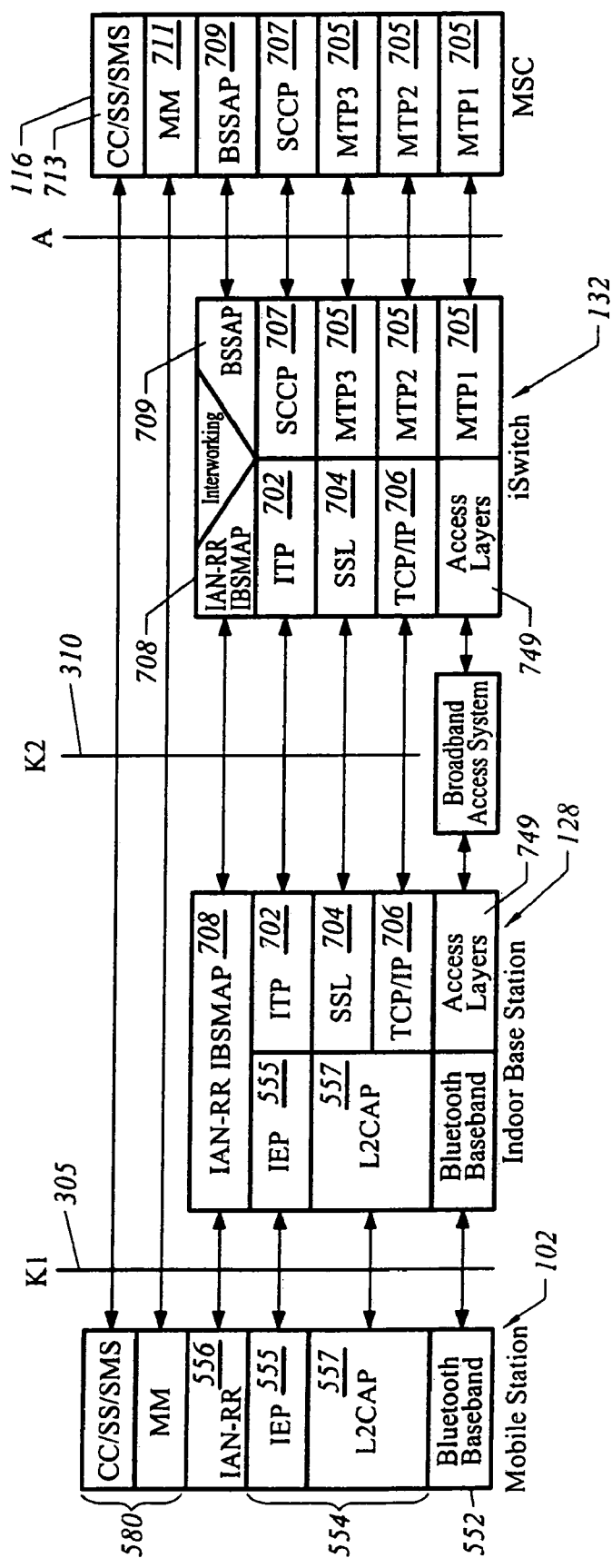
FIG. 7A illustrates an IAN protocol architecture in support of GSM mobility management (MM) and connection management (CM) signaling, as well as IAN-specific signaling in accordance with one embodiment of the present invention.

FIG. 7A illustrates an embodiment in which an IAN protocol architecture supports GSM MM and CM signaling, as well as IAN-specific signaling for the unlicensed wireless service. The MSC sublayers are conventional, well known features known in the art in regards to the message transfer part ((MTP) interfaces 705, signaling connection control part, (SCCP) 707, base station system application part (BSSAP) 709, mobility management interface 711, and connection management interface 713.

The IAN-RR protocol supports the IAN "layer 3" signaling functions. This includes the end-to-end GSM signaling between the indoor network controller 132 and mobile station 102, via IAN-RR message relay functions in the indoor base station 128. The indoor network controller 132 is responsible for the interworking between these messages and the analogous A-interface messages. The IAN-RR protocol also supports IAN-specific signaling between the mobile station 102, indoor base station 128 and indoor network controller 132; e.g., for mobile station-to-indoor base station bearer path control.

The radio resource layers in the mobile station include an IAN-RR sub-layer 556 and an IEP sublayer 557. The IAN-radio resource (RR) protocol is conveyed in an IAN Encapsulation Protocol (IEP) over the K1 interface 305, with the IEP being administered by the IEP sublayer 555. The IEP packets are transferred over the K1 interface 305 using the services of an unlicensed wireless service layer 2 connection access procedure (L2CAP) link layer.

The IAN-RR protocol is conveyed in an IAN Transfer Protocol (ITP) over the K2 interface 310 using an ITP module 702. The ITP messages are transferred using an IAN Secure Tunnel (IST) connection between the indoor base station 128 and the indoor network controller 132. The IST may be provided using standard security protocols. The use of the standard Secure Socket Layer (SSL) protocol 704 running over TCP/IP 706 is shown in FIG. 7A. Another option is to use EPSec. An intervening broadband access system 719 supports lower level IP connectivity.

The ITP module also supports non IAN-RR signaling between the indoor base station 128 and the indoor network controller 132. This includes the IBS-to-INC bearer path control signaling. This signaling may trigger, or be triggered by, IAN-RR signaling. We refer to this signaling as the indoor base station Management Application Protocol (IBSMAP) 708.

Figure 7B:
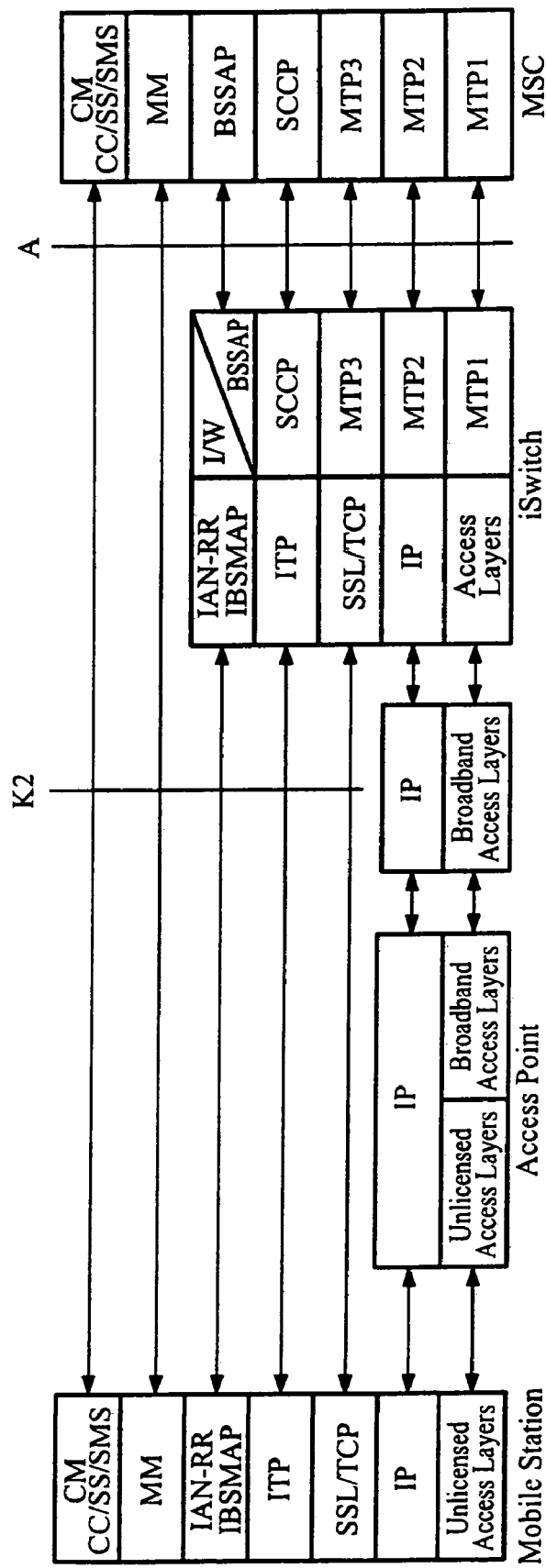
FIG. 7B illustrates an IAN protocol architecture in support of GSM mobility management (MM) and connection management (CM) signaling, as well as IAN-specific signaling in accordance with one embodiment of the present invention.

FIG. 7B illustrates an alternate embodiment in which the IAN-specific protocol functions of indoor base station 128 are moved to mobile station 102, allowing the use of unlicensed access points that do not support IAN-specific functionality but do support generic IP connectivity; for example, standard Bluetooth or IEEE 802.11b access points. As illustrated, in this embodiment, the SSL-based IAN Secure Tunnel and all upper layer protocols terminate on the mobile station. From the perspective of indoor network controller 132, there is no difference between the embodiment illustrated in FIG. 7A and that illustrated in FIG. 7B.

Figure 8:
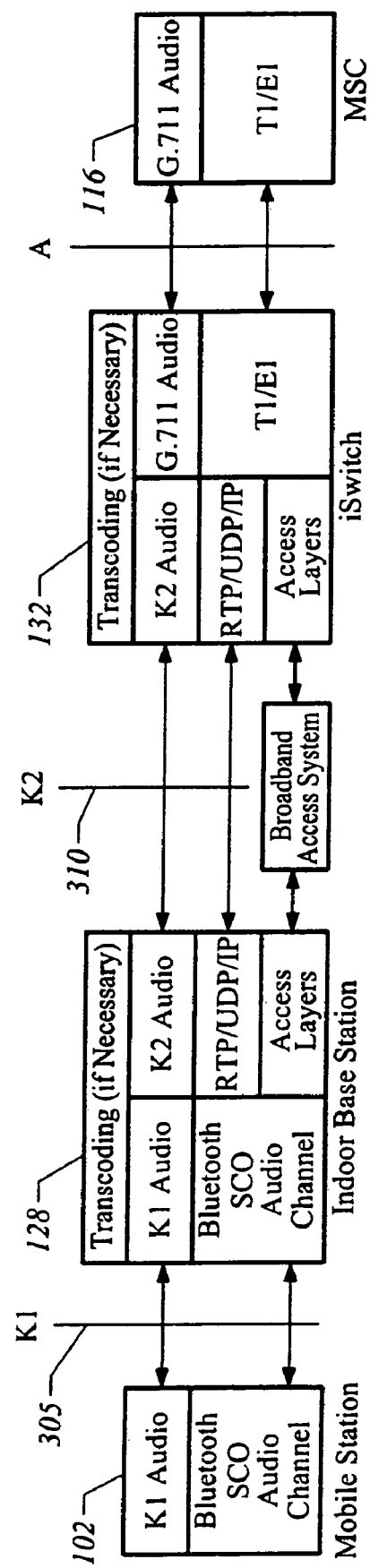
FIG. 8 illustrates an IAN protocol architecture in support of GSM voice transmission in accordance with one embodiment of the present invention.

FIG. 8 illustrates one embodiment of an IAN protocol architecture in support of GSM voice transmission. Audio flows over the K1 interface in a format illustrated as the "K1 Audio Format." For example, the K1 audio format may be the 64 kbps continuous variable slope delta modulation (CVSD) format running over Synchronous Connection Oriented (SCO) channels, as specified in the Bluetooth V1.1 standards. It is also possible to use standard voice over IP techniques using Bluetooth, 802.11 or other unlicensed technology over the K1 interface. Audio flows over the K2 interface in a format illustrated as the "K2 Audio Format." For example, a number of RTP-based audio formats may be used; e.g., G.711 (A-law or mu-law) and G.729A. Audio flows over the indoor network controller 132 to MSC interface, A, in 64 kbps pulse code modulation (PCM) format (G.711 A-law or mu-law). If the K2 audio format is something other than G.711, then transcoding is required in the indoor network controller 132; likewise, if the K1 and K2 audio formats are not the same, then transcoding is required in the indoor base station 128.

Figure 9:
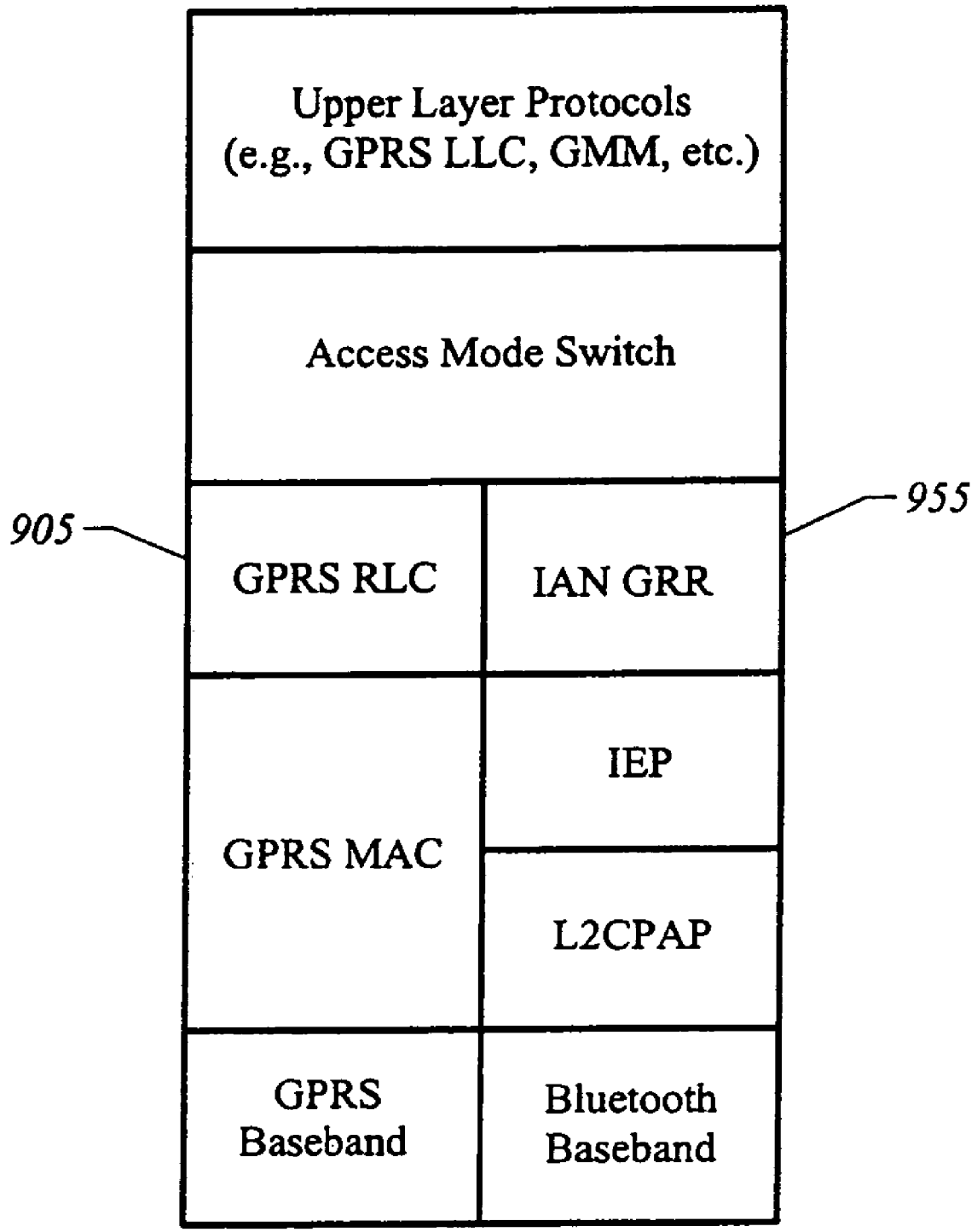
FIG. 9 illustrates components for level 1, level 2, and level 3 layers in a GPRS mobile set in accordance with one embodiment of the present invention.
Figure 10:
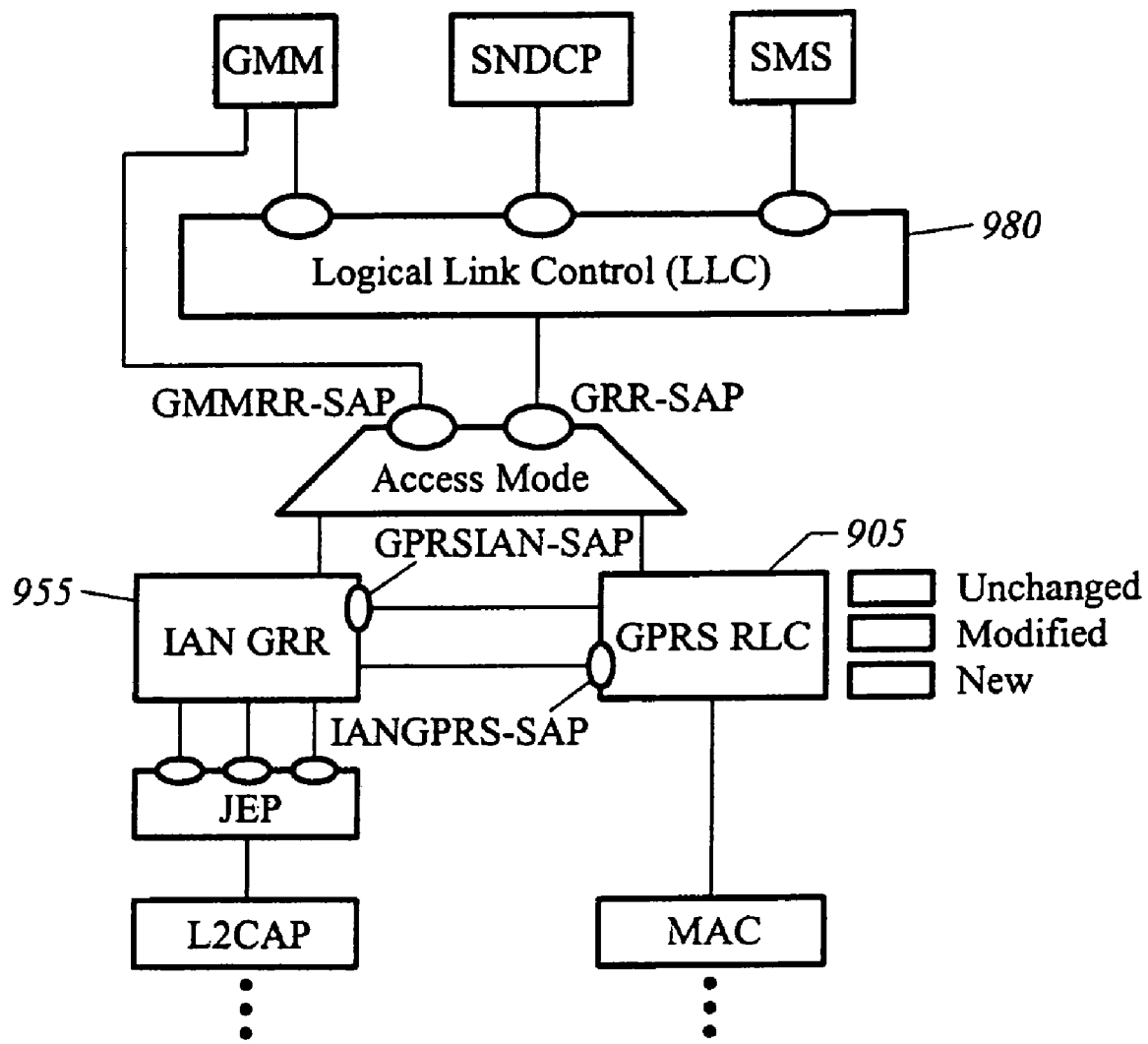
FIG. 10 illustrates components for level 1, level 2, and level 3 layers in a GPRS mobile set in accordance with one embodiment of the present invention.
Figure 11A:
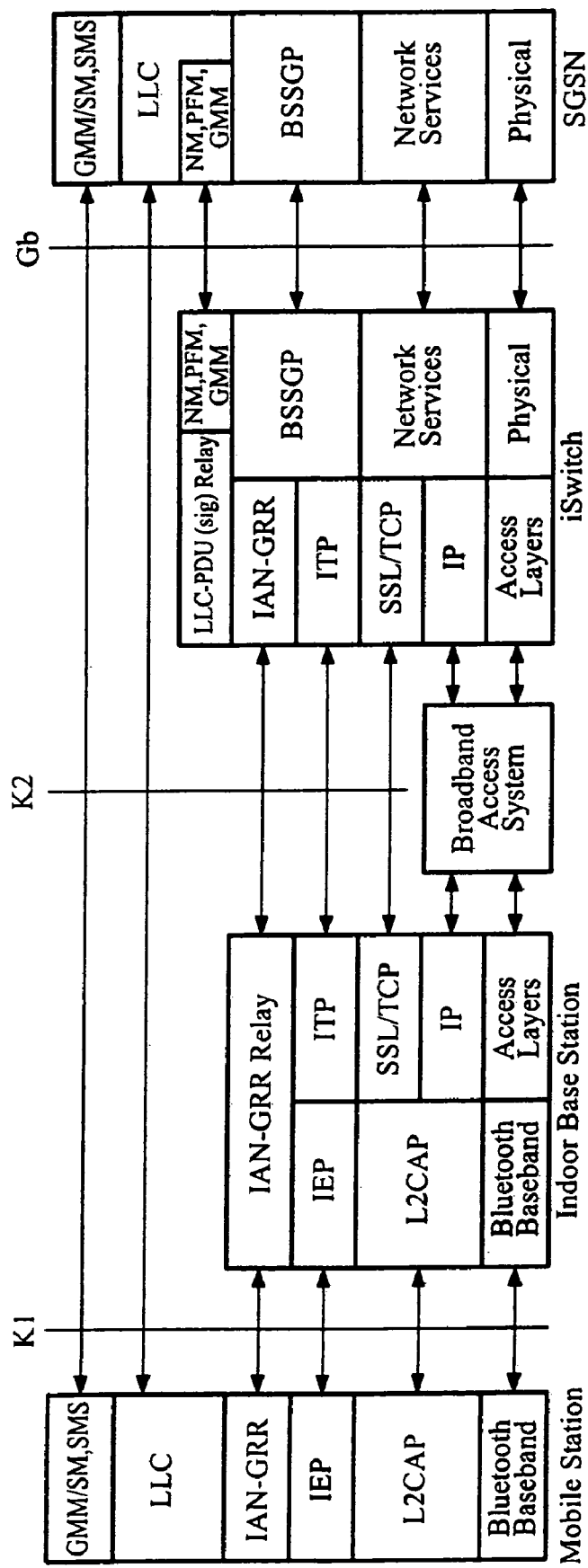
FIG. 11A illustrates an IAN protocol architecture in support of GPRS data transmission in accordance with one embodiment of the present invention.
Figure 11B:
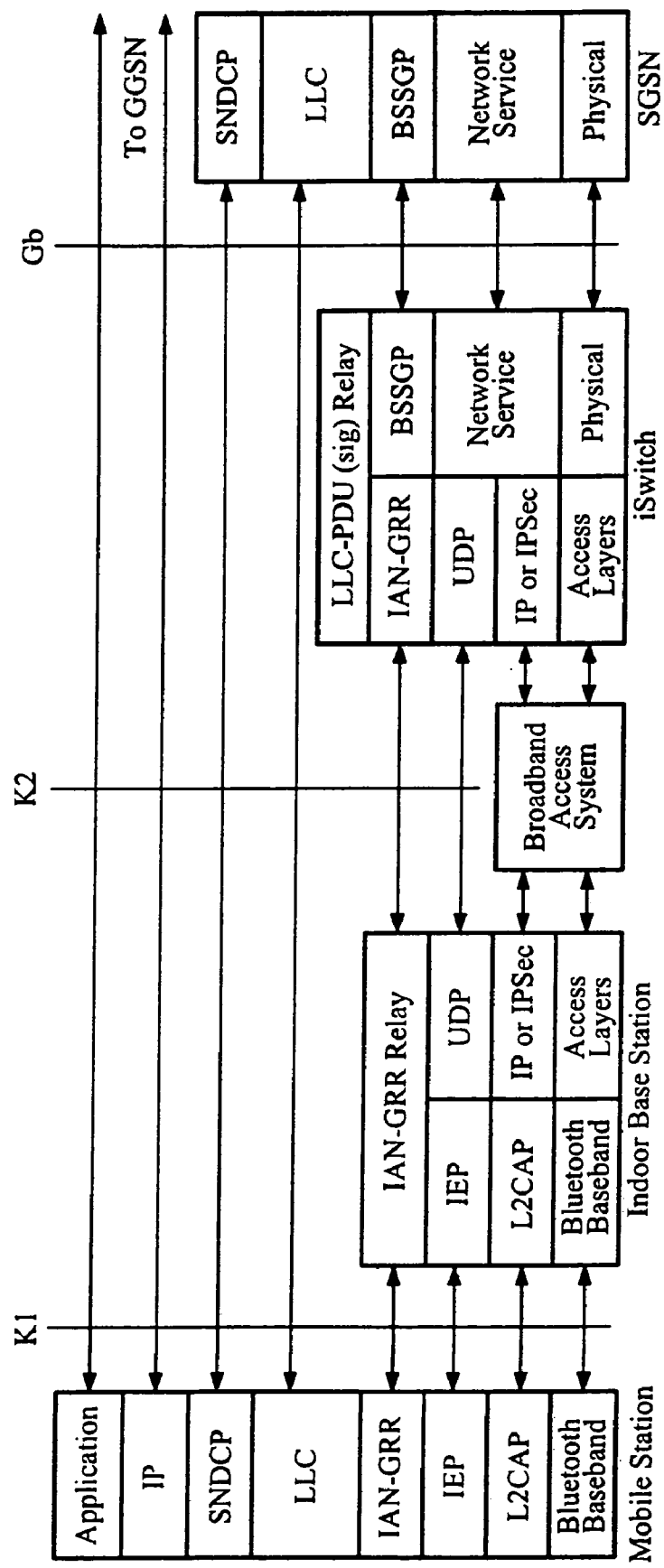
FIG. 11B illustrates an IAN protocol architecture in support of GPRS data transmission in accordance with one embodiment of the present invention.

FIGS. 9-11 illustrate a corresponding GPRS implementation. FIG. 9 provides an overview of the GPRS-related protocol architecture for the IAN mobile station. FIG. 10 shows details of one embodiment of an internal IAN/GPRS protocol architecture of the mobile station. FIG. 11A shows the corresponding GPRS signaling mode when the mobile station is operating using the unlicensed wireless service. FIG. 11B shows the corresponding GPRS data transmission mode when the mobile station is operating using the unlicensed wireless service. The IAN GPRS protocol architecture effectively enables the tunneling of GPRS signaling and data packets through the IAN utilizing the unlicensed spectrum; the IAN-GRR protocol serves the same tunneling function as the IAN-RR protocol, but for packet-switched traffic between the mobile station 102 and SGSN 118.

Referring to FIG. 10, the IAN/GPRS architecture includes two logical GPRS radio resource (RR) entities: the GPRS RLC 905 entity and the IAN GRR entity 955. In IAN mode, the IAN GRR entity is the current "serving" RR entity providing service to the logical link control 980 (LLC) layer via the designated service access point (GRR-SAP). The GPRS RLC entity is detached from the LLC layer in this mode.

The IAN-GRR RLC entity 955 is responsible for the following tasks. First, it emulates the GPRS RLC layer 905 to provide the expected services to the upper layer protocols. Second, it coordinates with the GPRS RLC 905 entity to manage access mode switching. In one embodiment, the IAN GRR layer includes IANGPRS-SAP and GPRSIAN-SAP interface handlers for access mode switching and modified PLMN/cell reselection behavior in IAN mode.

The IAN GRR entity 955 provides coordination with the GPRS RLC entity 905 through an IAN GPRS-SAP, specifically for access mode switching procedures. The GPRS RLC entity 905 provides coordination with the IAN GRR entity through the GPRSIAN-SAP, specifically for access mode switching procedures.

FIG. 11A illustrates an embodiment in which an IAN protocol architecture supports GPRS signaling. The SGSN layers are conventional, well known features known in the art in regards to the GPRS network management (NM), packet flow management (PFM), base station system GPRS protocol (BSSGP), network service (NS), GPRS mobility management (GMM), logical link control (LLC), session management (SM) and short message service (SMS) interfaces. The IAN-GRR protocol supports message encapsulation or tunneling functions. The indoor network controller 132 is responsible for terminating the NM, PFM, GMM, BSSGP, and NS layers and for relaying LLC protocol data units (PDUs) conveying GPRS signaling between the IAN-GRR encapsulated form present on the K2 interface and the analogous Gb-interface messages. The indoor base station provides simple IAN-GRR message relay functions between the K1 and K2 interfaces. The IAN protocol architecture in support of GPRS signaling makes use of the ITP, SSL, TCP/IP, and IEP layers described in reference to FIG. 7A. GPRS data transmission may also be supported via the architecture of FIG. 11A, whereby LLC PDUs conveying GPRS data packets are relayed by the INC and IBS between the SGSN and MS. FIG. 11B illustrates an alternate embodiment in which the transport protocol on the K2 interface is not the connection-oriented TCP protocol, but is instead the connectionless UDP protocol. This approach has the advantage of improved support for application protocols that are best matched with connectionless transports (e.g., voice over IP). Data transfer security over the K2 provided by SSL in FIG. 11A can be provided by EPSec as shown in FIG. 11B.

The basic operation of embodiments of the mobile station, base station, and indoor network controller 132 having been described above in regards to the operation of level 1, level 2, and level 3 layers and voice bearer operation, registration, mobility management, and call management procedures will now be discussed for several embodiments.

Conventional licensed wireless systems include procedures for handing off a communication session to different components of the licensed wireless system. These include, for example, handing off a session to different cells under control of the same base station controller, switching cells under control of different base station controllers but belonging to one MSC, and switching cells under control of different MSCs. In embodiments of the present invention, these protocols have been further adapted to initiate a handoff of a communication session to the unlicensed wireless system when the mobile station is within range of at least one indoor base station controller.

Figure 12:
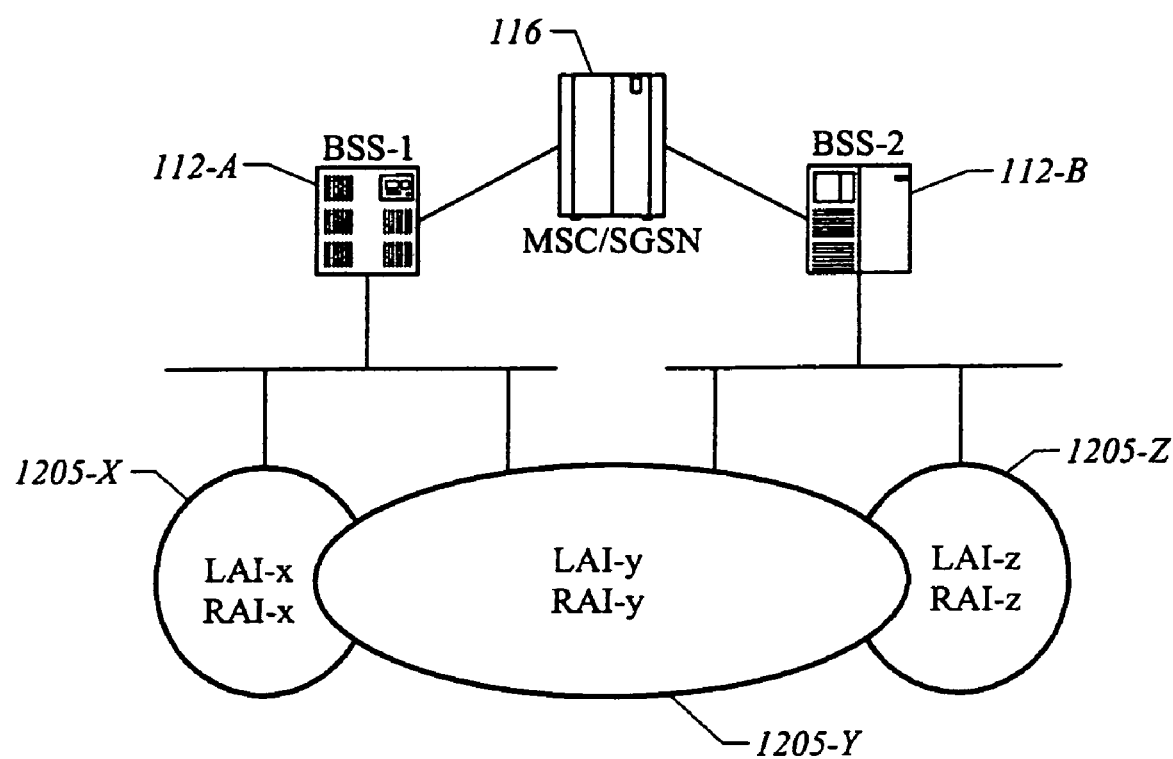
FIG. 12 illustrates a conventional GSM/GPRS registration area concept in accordance with one embodiment of the present invention.

FIG. 12 illustrates the concept of registration used for mobility management in GSM/GPRS. A MSC 116 may have more than one BSC 112 and associated base station subsystems (BSSs) linked to it, such as BSS 112-A and BSS 112-B. The coverage area is split into a plurality of logical registration areas 1205, such as 1205-x, 1205-y, and 1205-z called Location Areas (LA) (for GSM) and Routing Areas (RA) (for GPRS).

A mobile station 102 is required to register with the base subsystem (BSS) of the network each time the serving location area (or routing area) changes. This provides the network with information regarding the location of the mobile station that may, for example, be used to determine which BTS 108 and BSC 112 will service the communication session. One or more location areas identifiers (LAIs) may be associated with each visitor location register (VLR) in a carrier's network. Likewise, one or more routing area identifiers (RAIs) may be controlled by a single SGSN. In actual implementations, the number of different registration areas controlled by each VLR/SGSN is decided based upon a tradeoff between minimizing network paging and location updating load. The fewer registration areas, the less location updates on the system but the higher the paging load. The higher the number of registration areas, the lower the system paging load but the higher the number of user registrations. A single location area/routing area 1205-y may be associated with multiple base station subsystems (BSS). If this is the case, a mobile-terminated call to a subscriber that is registered in a particular location area will result in paging requests to each BSS associated with that location area. Note that there is not necessarily a one-to-one relationship between LAI and RAI; there may be multiple GPRS routing areas within a single location area.

Figure 13:
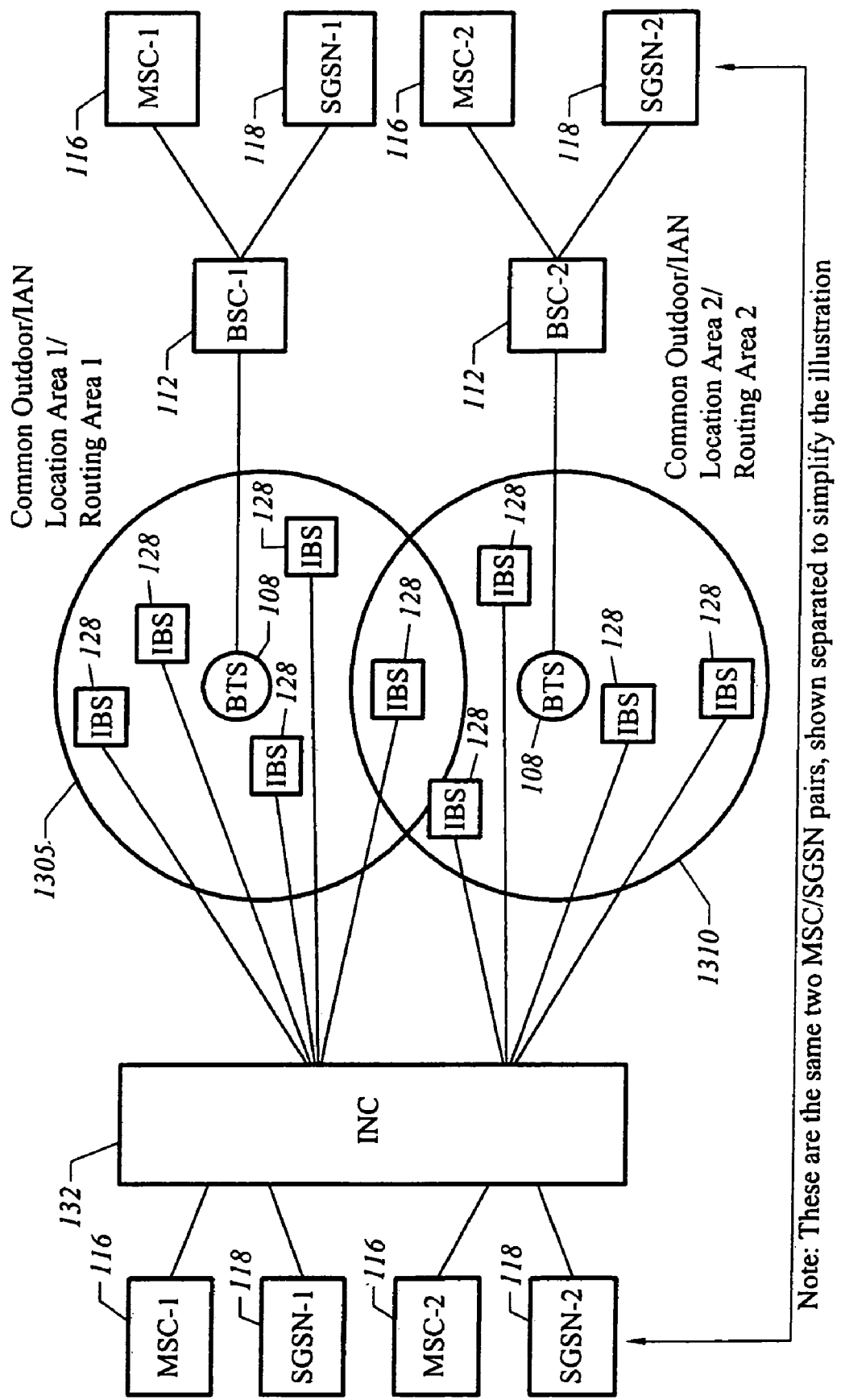
FIG. 13 illustrates registration areas for a licensed wireless network and an unlicensed wireless network in accordance with one embodiment of the present invention.
Figure 14:
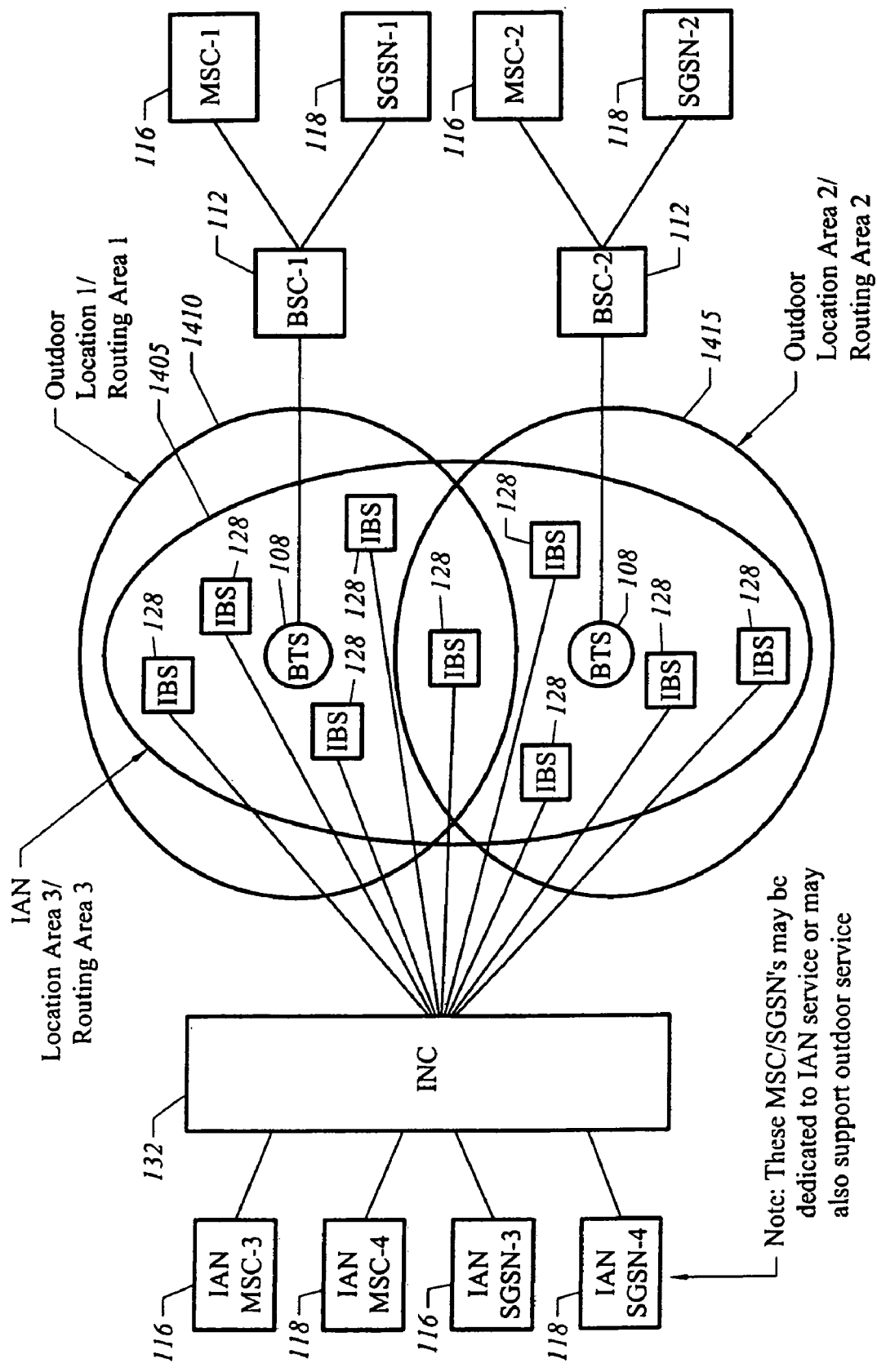
FIG. 14 illustrates registration areas for a licensed wireless network and an unlicensed wireless network in accordance with one embodiment of the present invention.

Referring to FIGS. 13 and 14, in embodiments of the present invention, the registration concept is adapted to describe services by one or more indoor base stations 128 to facilitate roaming and handoff between the licensed wireless system and the unlicensed wireless system, as described below in more detail. In the present invention, a set of IAN LAI/RAI pairs defines a set of at least one indoor base stations 128 under the control of one indoor network controller 132. Thus, referring to FIG. 13, a single indoor network controller 132 may have one or more indoor base stations defining location area/routing areas 1305 and 1310 serviced by the unlicensed wireless system. One or more licensed wireless service area local area/routing areas may overlap with the IAN LAI/RAI. In a first IAN configuration illustrated in FIG. 13, Location Area and Routing Area identity or identities are shared between the IAN system and the umbrella GSM network.

As illustrated in FIG. 13, the indoor network controller 132 may be connected to a different MSC/SGSN than those that provide the umbrella GSM/GPRS coverage. For this reason, the mobile set 102 is preferably provided with the IAN LAI/RAI pair that is associated with the serving indoor base station 128 by the indoor network controller 132 as part of the "IAN Registration" procedure. This information is used in the mobile set to determine Mobility Management actions while the mobile set is "switched-on" in the GSM/IAN domain; e.g., if a location update is required upon leaving the indoor coverage area.

In a second umbrella IAN configuration illustrated in Figure, 14, Location Area and Routing Area identity or identities are not shared between the IAN system and the umbrella GSM network. Consequently, the indoor LAI and RAI 1405 may be substantially different than the outdoor LAI and RAI zones 1410 and 1415. The IAN system is identified by one or a set of registration identifiers (LAI and RAI). The IAN mobile station arbitrates between the two networks and avoids presenting the GSM network with an overload of registration requests during transient conditions; i.e., temporary movement into and out of the IAN network.

In one embodiment, an IAN registration is performed by the mobile station 102 to manage signal load on the public land mobile network (PLMN) infrastructure. An IAN registration is preferably automatically performed by the mobile set on initial detection of IAN coverage or following a temporary interruption of IAN coverage under certain specific conditions. As described below in more detail, this proactive registration process facilitates seamless handoff for a variety of environments and situations that may be encountered. In one embodiment, an IAN registration does not involve any signaling to the PLMN infrastructure and is wholly contained within the IAN system (i.e., the mobile station, indoor base station and indoor network controller). The IAN registration message delivered to the indoor network controller 132 preferably includes (among other parameters): IMSI; GSM update status, and associated parameters (e.g., LAI and TMSI, if available); GPRS update status, and associated parameters (e.g., RAI and P-TMSI, if available).

In one embodiment, the IAN registration procedure is also used by the indoor network controller 132 to provide the mobile station 102 with the operating parameters associated with the IAN service on the indoor base station 128. This is analogous to the use of the GSM broadcast control channel (BCCH) to transmit system parameters to mobile stations in GSM cells. In this embodiment, the information that is transmitted includes (among other parameters): IAN-LAI (Location Area Identification); IAN-RAI (Routing Area Identification); IAN-CI (Cell Identification); IAN-ARFCN value (for handover purposes); IAN-BSIC value (for handover purposes); Attach/Detach Allowed (ATT) flag setting; GPRS network operating mode; CELL_RESELECT_OFFSET, used to "bias" GSM cell selection in favor of cells with the same registration area as the IAN system; BA (BCCH Allocation) List: and Timer values. These parameters are packaged in an IAN-System-Information wrapper. This package is included in the IAN registration response to the mobile station. The package may also be included in other messages to the mobile station in the event that a system parameter update is required.

Figure 15:
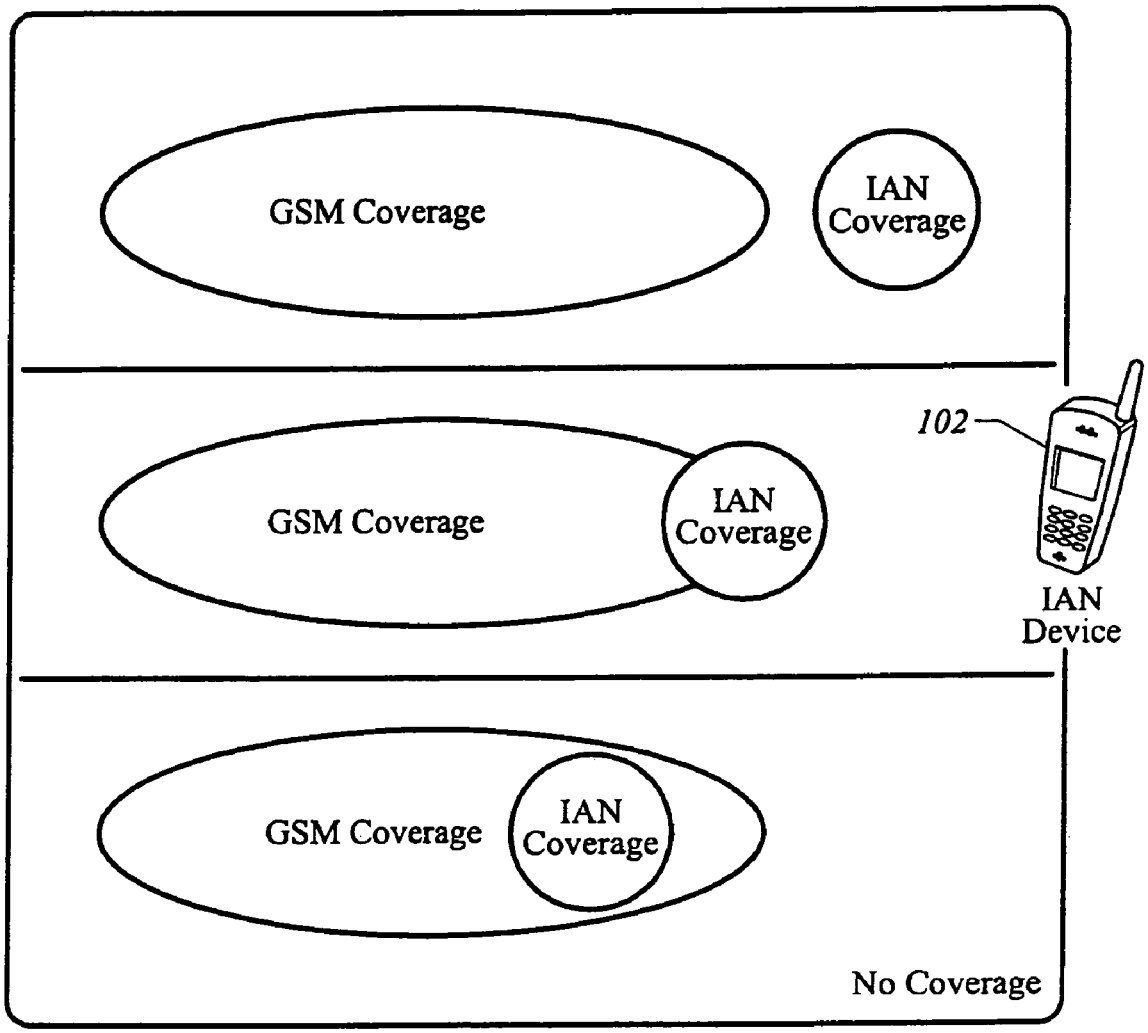
FIG. 15 illustrates several possible GSM and IAN coverage scenarios in accordance with one embodiment of the present invention.

FIG. 15 illustrates several different radio environments that may be encountered by an IAN mobile station 102. In the first environment, the GSM and IAN coverage are completely separate and non-overlapping. The second possibility shows partially overlapping GSM and IAN coverage. In the final scenario, and perhaps the most common, the IAN coverage is completely encapsulated within the GSM coverage. An IAN device may power on in any of these environments and may transition between coverage areas in a number of attached states.

In one embodiment the mobile station 102 scans for both GSM and IAN radio coverage at power on or anytime when the mobile station 102 is idle and there is no coverage of any type. If only GSM coverage is detected, then the normal GSM mobility management procedure is initiated. If only IAN coverage is detected, then the mobile station 102 establishes a link to the indoor base station 128 and waits for a IAN-LINK-ATTACH message from the indoor base station 128. On receipt of the IAN-LINK-ATTACH message (indicating that the received signal level at the indoor base station 128 has passed a predefined threshold), the mobile station 102 performs the IAN registration procedure. Based upon the information returned, the mobile station 102 then determines if a full network registration is required and if so what type (e.g., GSM or GPRS). If both GSM and IAN coverage are detected, then the mobile station 102 performs the normal GSM mobility management procedure, then performs the IAN registration procedure.

There is also the possibility that a mobile user may initially be outside of the IAN coverage zone but eventually move into the IAN coverage zone. Consequently, in one embodiment, at anytime when the mobile station 102 is idle, in GSM coverage and there is no IAN coverage, the mobile station 102 periodically scans for IAN coverage. If IAN coverage is detected, the mobile station 102 initiates the IAN registration procedure described above.

In some environments, such as inside a building, there may be IAN coverage but no GSM coverage. For this case, it is desirable that GSM scanning and other procedures be performed to enable the mobile station 102 to handoff to GSM upon exiting the IAN coverage zone. In one embodiment, at anytime when the mobile station 102 is idle, in IAN coverage and there is no GSM coverage, the mobile station 102 continues to perform normal GSM PLMN search procedures. If GSM coverage is detected, the mobile station 102 records the identification of the preferred GSM cell for handover or loss of IAN coverage situations. At anytime when the mobile station is idle, in IAN coverage and there is GSM coverage, the mobile station 102 continues to perform normal GSM cell reselection procedures.

In one embodiment, the mobile station 102 records the identification of the preferred GSM cell for handover or loss of IAN coverage situations. At power off with IAN coverage, a detach indication (if required by the PLMN network or normally sent by the mobile station at power off) is sent by the mobile station 102 to the PLMN via the IAN. This indication is encoded per the current GSM mode of operation (e.g., GSM or GPRS). At anytime when the mobile station 102 is operating in IAN mode (i.e., after successful IAN registration on the IAN), the mobile station 102 takes the CELL_RESELECT_OFFSET value into account in it GSM PLMN search and cell reselection procedures; i.e., the offset value "encourages" the mobile station 102 to show preference for a GSM cell in the same registration area as the indoor base station 128.

An Exemplary IAN/CDMA Architecture Overview

In one embodiment, the system comprises a CDMA/AAN hybrid handset system in the Indoor Access Network (IAN). In one embodiment, the CDMA/IAN hybrid handset is capable of performing all standard CDMA functions on both the existing CDMA infrastructure and IAN Bluetooth or 802.11, the unlicensed-band, infrastructure equipment. In one embodiment, in addition to fully operating on only the indoor unlicensed-band network or only the CDMA network, the hybrid handset is capable of seamlessly moving from one network to the other.

Note that the higher layer operation of the phone (e.g., UI, SMS, etc.) is not detailed because of abstraction layer the call manager provides to the lower handset layers.

Figure 16:
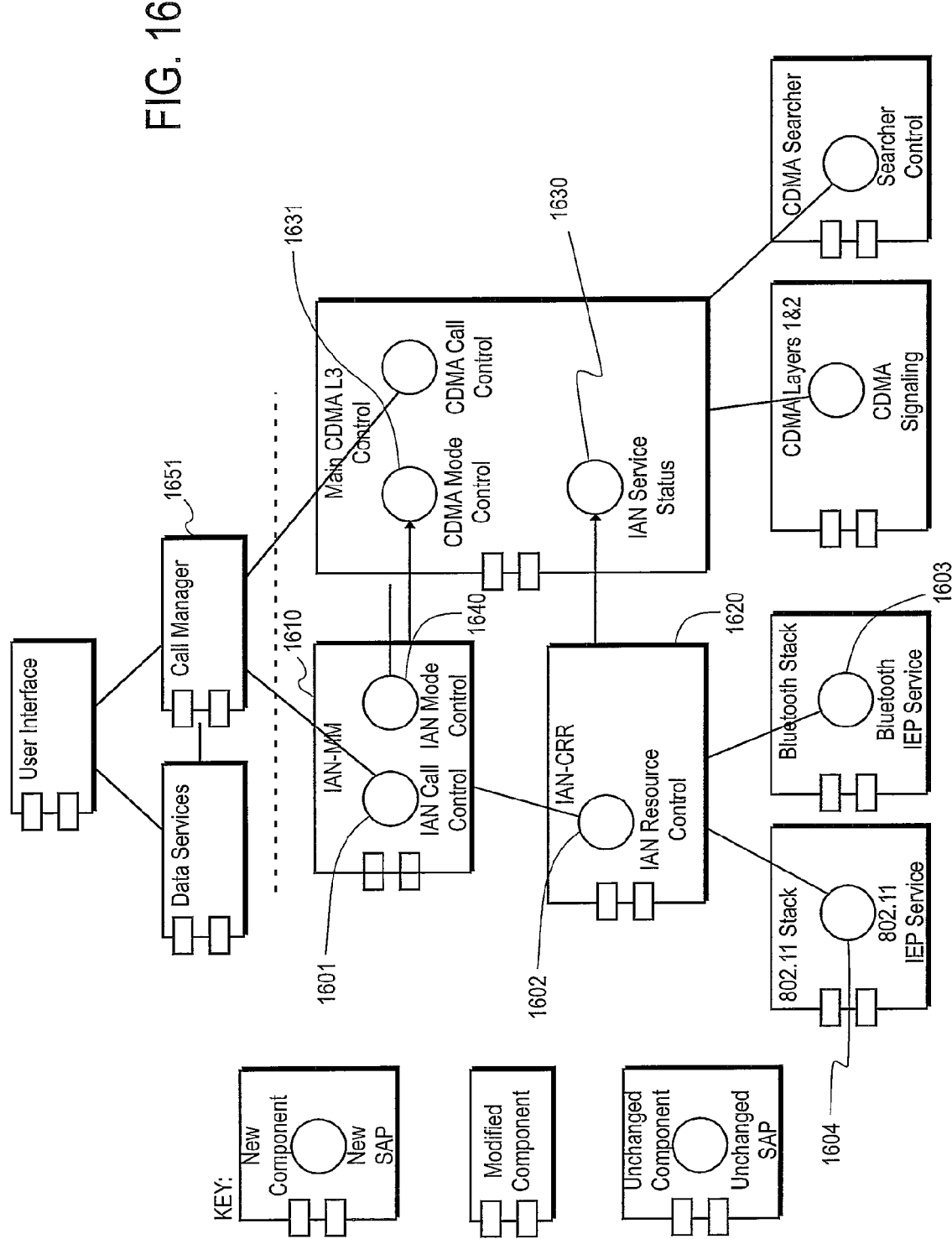
FIG. 16 illustrates one embodiment of a CDMA phone architecture with Service Access Points (SAP) used for intercommunications among the entities.

At a conceptual level of the architecture, the CDMA-only handset includes the following IAN capabilities: (i) an IAN-CDMA Radio Resource (RR) management entity, (ii) an IAN Mobility Management (MM) entity, and (iii) an unlicensed band air interface control entity (e.g., Bluetooth, 802.11, etc.). FIG. 16 illustrates how these new components integrate into an existing CDMA phone architecture, and the Service Access Points (SAP) used for intercommunications among the entities.

In one embodiment, two types of SAPs are included between the various layers of the IAN-mode protocol stack. A first set are those SAPs between IAN protocol entities:

IAN Call Control SAP 1601 in IAN-MM 2002 1610 provides the Call Manager an entry point into the IAN signaling stack to setup/modify/tear-down calls.

IAN Resource Control SAP 1602 provides the IAN Mobility Manager 1610 an inter-face to control the unlicensed-band radio resources and the handset bearer resources.

Bluetooth IEP Service SAP 1603 provides IAN Radio Resource manager 1620 with a control and transport interface for IEP messaging and voice bearer control over Bluetooth.

802.11 IEP Service SAP 1604 provides IAN Radio Resource manager 1620 with a control and transport interface for IEP messaging and voice bearer control over 802.11.

A second set of SAPs are those between the IAN and CDMA control entities. These SAPs control the mode switching of the handset between IAN and CDMA modes of operation:

IAN Service Status SAP 1630 is an interface that provides the indications to the Main Control task of the availability of IAN service. These signals provide the main handset state machine with the information necessary to determine when IAN/CDMA mode switching should occur.

IAN Mode Control SAP 1640 is used by the Main Control task of the handset to attach IAN MM 1610 to Call Manager 1651 interface and place the handset in and out of IAN mode of operation. Mode changes can occur as both idle mode system switching and active mode hand-offs.

CDMA Mode Control SAP 1631 is used by IAN MM 1610 to relinquish control of handset operations and allow the normal handset System Determination procedure to occur.

The combination of the IAN-MM and IAN-CRR functions are referred to here as the "IAN" Layer 3" or IAN-L3 functions.

Figure 17:
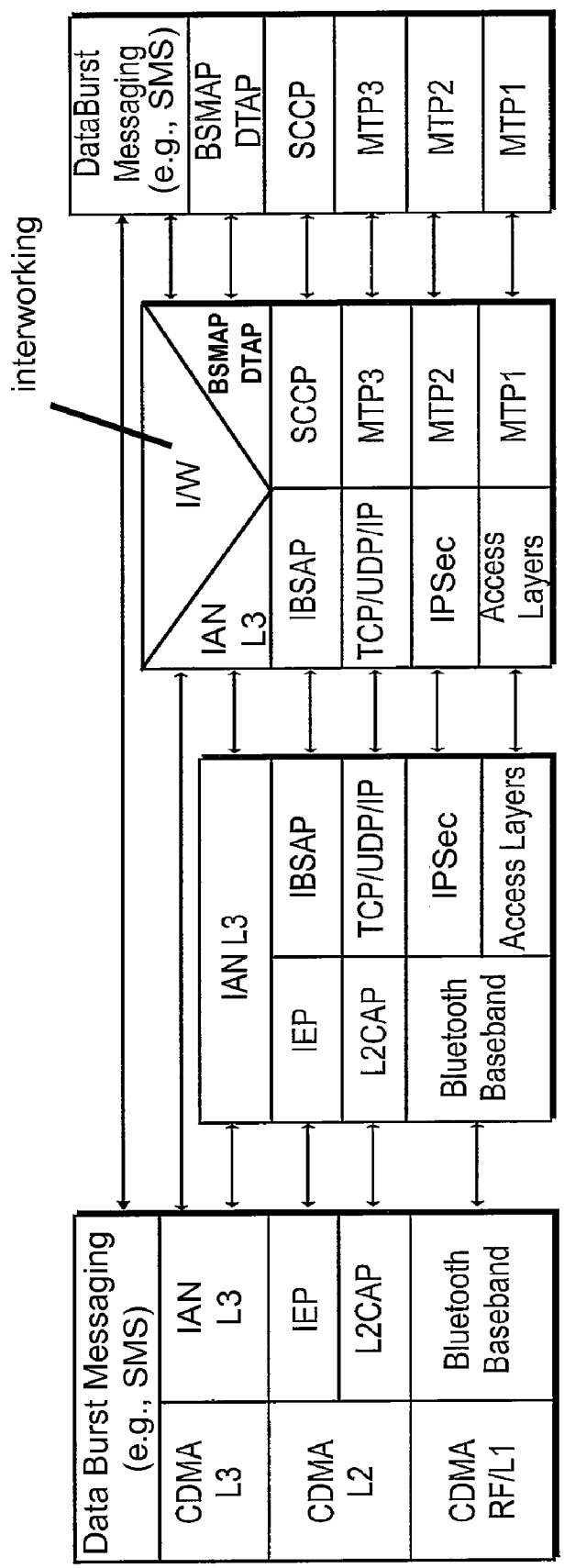
FIG. 17 illustrates one embodiment of signaling plane communications of the handset in IAN mode.

FIG. 17 illustrates one embodiment of signaling plane communications of the Handset in IAN mode. In one embodiment, the handset physically communicates only with the IBS via the unlicensed-band in use (Bluetooth is illustrated in the diagram). The IEP protocol provides for a logical interface for IAN-CRR 2003 messaging that occurs between the handset and the iSwitch. IAN-CRR 2003 protocol provides a transport mechanism for the A1 signaling (e.g., one or more messages having the A1 protocol message format, such as, for example, an A1 ADD message) between the handset and iSwitch. The use of the A1 Application Data Delivery Service (ADDS) messages allows logical transport of data burst messages directly between the handset and MSC (e.g., for SMS purposes).

FIG. 17 is analogous to FIG. 7*a*, where "IBSAP" is used in FIG. 17, while "ITP" is used in FIG. 7*a*. These both represent the same functionality. The use of SSL for security is shown in FIG. 7*a*, although the description specifies the use of IPSec as an alternate security mechanism. FIG. 17 shows the use of IPSec. Also note that, just as in FIG. 7*b* and the associated text describes the alternate embodiment in which the mobile station takes an additional protocol functions and the IBS is reduced to a standard WLAN access point, this alternate embodiment also applies to the CDMA system.

Referring to FIG. 17, in one embodiment, note that the "Data Burst Messaging" layer is not needed for all signaling (it is only used to convey application data like SMS messages between the MS and MSC).

Figure 18:
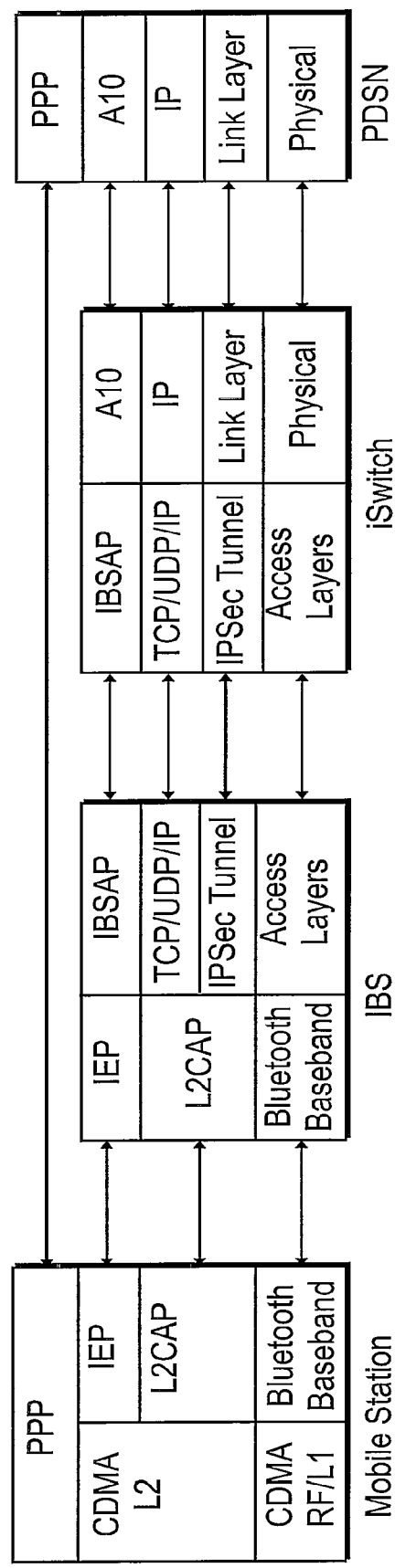
FIG. 18 illustrates one embodiment of a protocol architecture used to transport the user data while the handset is in IAN mode and a packet data session is in progress.

FIG. 18 illustrates one embodiment of a protocol architecture used to transport the user data while the handset is in IAN mode and a packet data session is in progress.

In one embodiment, all user data is encapsulated by the PPP protocol. The IEP layer provides a L2 transport function to the PPP data over the unlicensed-band radio interface to the IBS. The IAN infrastructure equipment then provides routing of the PPP data stream and delivery to the appropriate Packet Data Serving Node (PDSN) via the A10 protocol.

Module Decomposition

In one embodiment, CDMA/IAN hybrid handset operates in two major operating modes (i) CDMA and (ii) IAN. In one embodiment, the lower layer active task architecture of the handset varies between these two modes of operation. In both FIGS. 19 and 20, the dashed oval represents all handset components that operate within the Main Control (MCC) task. These components are described individually herein to illustrate the reuse of mobility management components that can be achieved while the handset is in IAN mode of operation.

CDMA Mode

Figure 19:
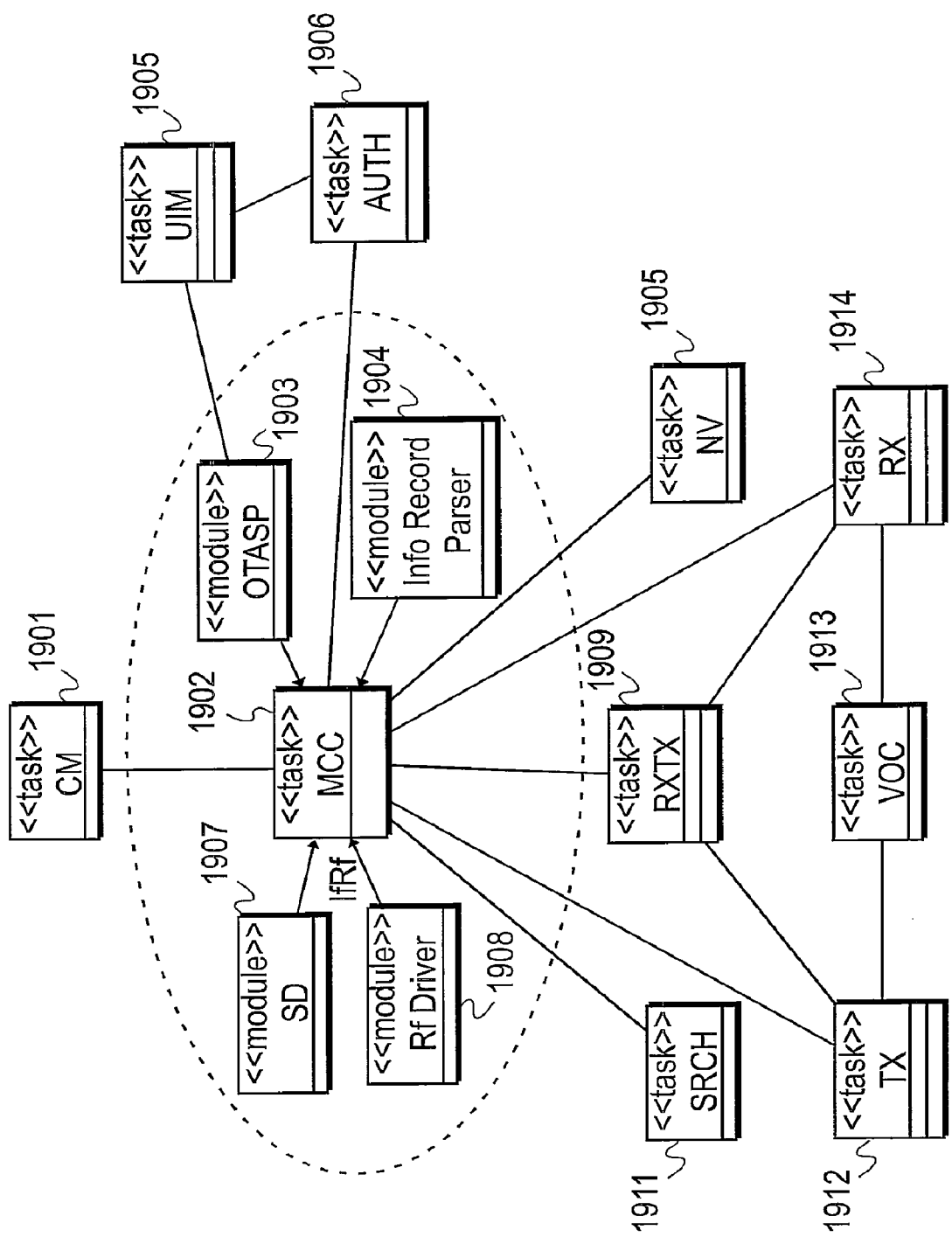
FIG. 19 is a block diagram of one embodiment of a CDMA mode task architecture having lower layer handset tasks and interfaces for use while in CDMA mode of operation.

FIG. 19 is a block diagram of one embodiment of a CDMA mode task architecture having lower layer handset tasks and interfaces for use while in CDMA mode of operation. Each of these tasks may be implemented in hardware (e.g., circuitry, dedicated logic, etc.), software (such as is run on a general purpose computer system or a dedicated machine), or a combination of both. The major software tasks in operation during the CDMA mode are: Call Manager 1901, Main Control task 1902, User Identity Module 1905, Authentication task 1906, CDMA Layer 2 task 1909, Searcher task 1911, CDMA Transmit task 1912, CDMA Receive task 1914 and Vocoder task 1913.

Call Manager 1901 provides primitives for all mobile originated call control functions such as originations, alerting, answering, DTMF Dialing, hook flashes, etc. Main Control (MCC) task 1902 controls the overall mode of operation for the handset as well as CDMA Layer 3 call processing when the phone is in the CDMA mode of operation. User Identity Module (UIM) task 1905 is a driver to the UIM hardware for read accesses to information stored on the device. Authentication (AUTH) task 1906 provides background processing of authentication algorithms. CDMA Layer 2 (RXTX) task 1909 provides CDMA Layer 2 ARQ support for the forward and reverse dedicated signaling channels. Searcher (SRCH) task 1911 interfaces with the CDMA demodulator hardware to perform system measurement scanning, pilot acquisition, paging channel camping and pilot strength measurements of CDMA systems. CDMA Transmit (TX) task 1912 interfaces with the CDMA encoder hardware to provide Layer 1 transport of signaling and bearer traffic. CDMA Receive (RX) task 1914 interfaces with the CDMA decoder hardware to provide reception of Layer 1 signaling and bearer traffic. Vocoder (VOC) task 1913 interfaces with the vocoder hardware and provides bidirectional transport of voice frames with the RX and TX tasks.

IAN Mode

Figure 20:
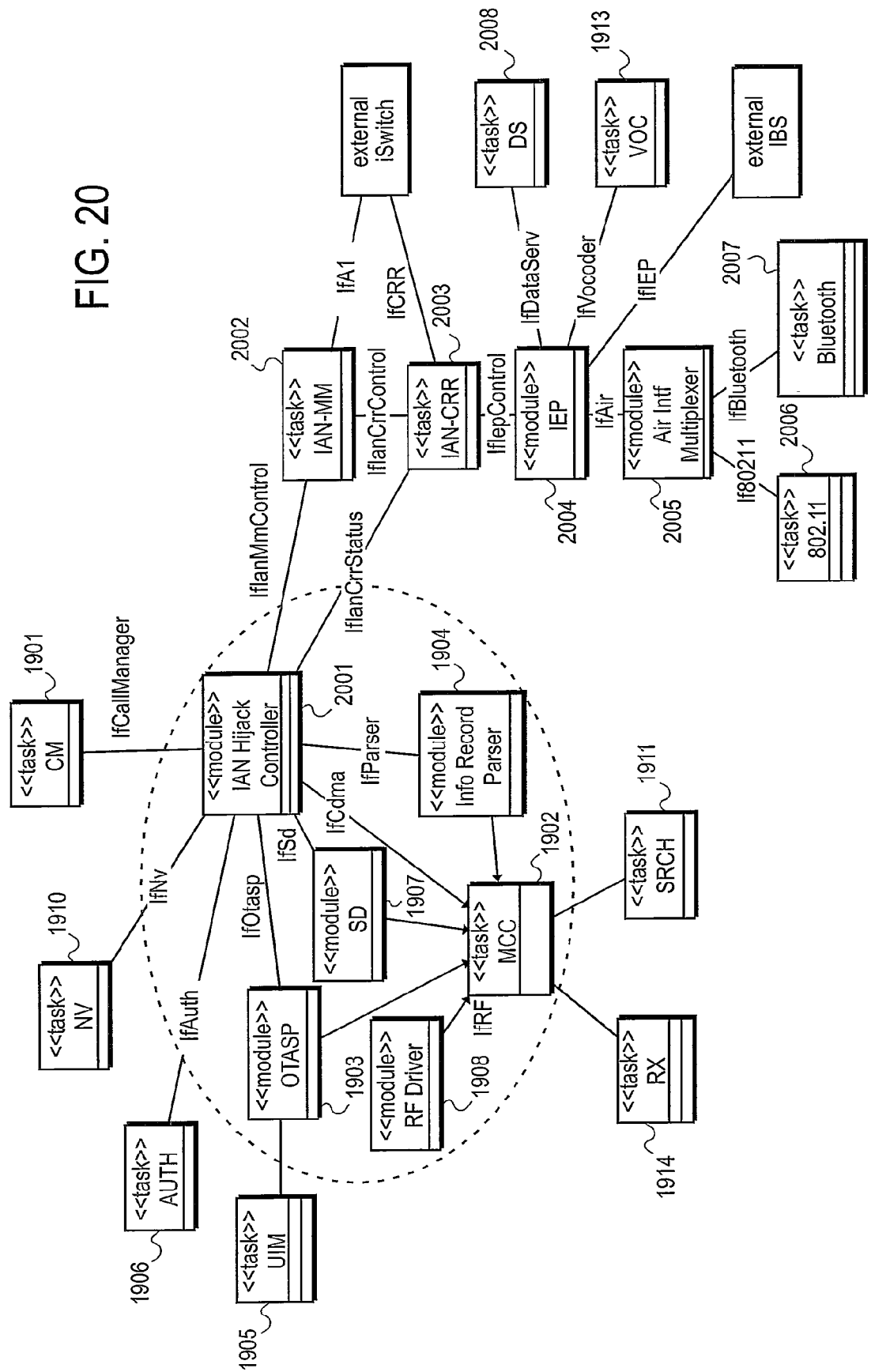
FIG. 20 is a block diagram of one embodiment of an IAN node task architecture having lower layer handset tasks and interfaces for use while in IAN mode of operation.

FIG. 20 is a block diagram of one embodiment of an IAN mode task architecture having lower layer handset tasks and interfaces for use while in IAN mode of operation. Referring to FIG. 20, Main Control task 1902, also known as MCC task 1902, provides the main control state machine for the handset. In one embodiment, all power-up, power-down and mode selection processing is performed by MCC task 1902. Additionally, MCC task 1902 performs the CDMA-L3 processing for the phone. With the addition of an IAN mode of operation to the handset, MCC task 1902 take on several functions. For example, MCC task 1902 performs system determination that includes IAN systems as well as CDMA, as well as service quality monitoring of CDMA and IAN systems. MCC task 1902 performs active hand-off determination between IAN and CDMA systems, and also performs state transfer of Mobility Management information between the CDMA and IAN services during active hand-off.

Figure 21:
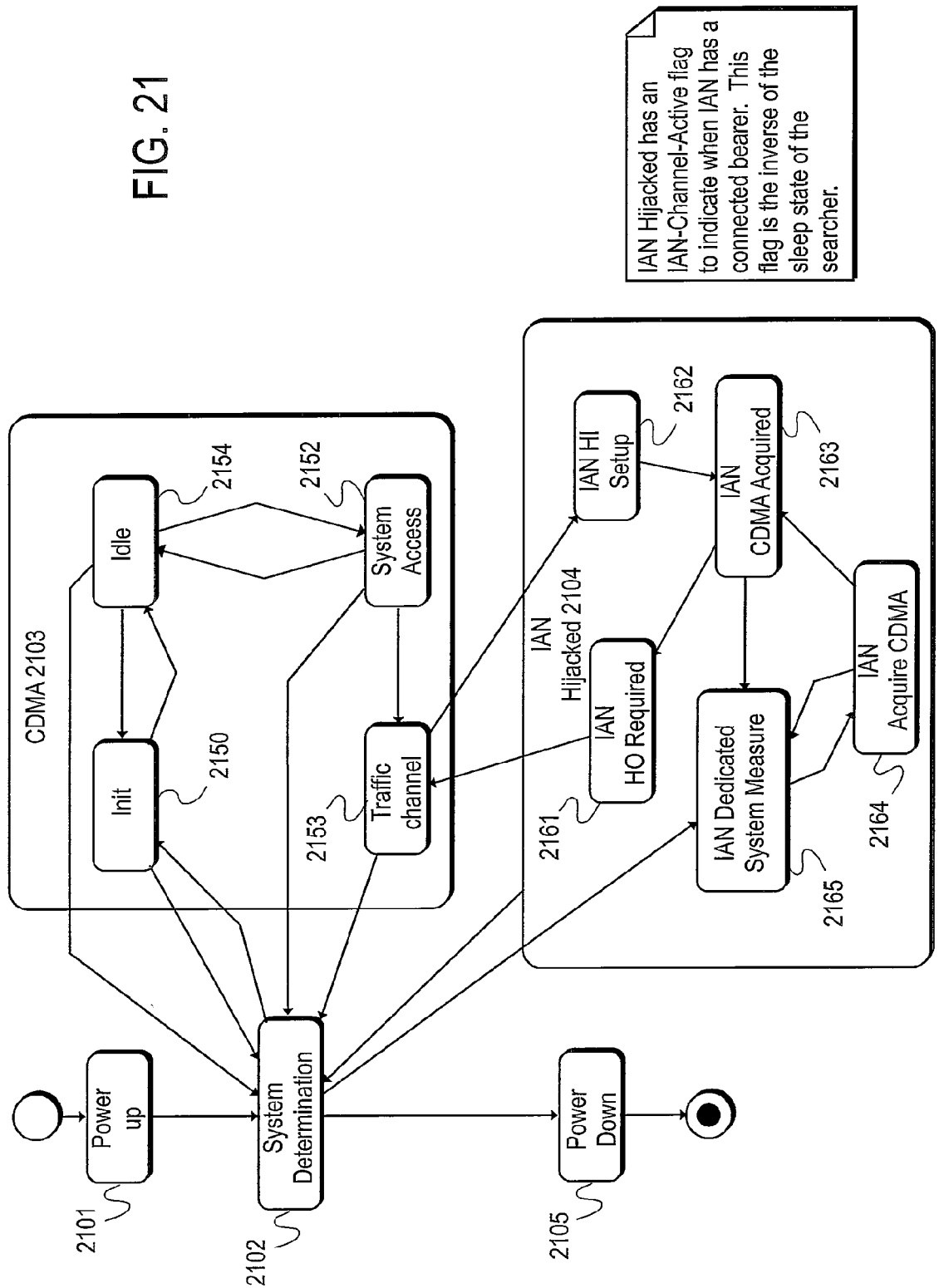
FIG. 21 is a state diagram of one embodiment of the CDMA/IAN operation.

FIG. 21 is a state diagram of one embodiment of the CDMA/IAN operation. Referring to FIG. 21, this is the first state in which the handset starts. From power up state 2101, the handset performs all module initialization and queries the system determination module on what to do next. During system determination state 2101, the handset consults the Priority Roaming List (PRL) to determine the order in which to scan bands and channels for the most preferred system. During system determination state 2102, the handset consults both the CDMA and IAN radio resources to determine if systems are present. When the System determination module has determined that a CDMA system is the most preferred system, the state transitions from the system determination state 602 to the CDMA state 2103 in which control of the handset is granted to the CDMA state machine.

Once in the CDMA state machine, in the unit substate 2150, all CDMA tasks are initialized and pilot acquisition is begun. Once pilot acquisition and overhead messages have been received and Paging Channel camping is to begin, the CDMA state machine enters the Idle mode sub state 2151. Whenever a CDMA system access is to be performed, the CDMA state machine enters system access sub state 2152. If the access does not require a traffic channel to be established, then all Orders/Replies shall be processed in state 2152 before returning to Idle state 2151. When a system access requires a dedicated bearer resource to be established, the CDMA state machine enters traffic channel sub state 2153. Whether a call is for either voice or data, traffic channel sub state 2152 is entered when a CDMA fundamental channel is assigned.

When the System Determination module selects IAN mode of operation MCC task 1902 of the handset is placed into IAN mode state 2104. In state 2104, all signals received by MCC task 1902 are evaluated and forwarded by the IAN mode controller.

While in IAN mode state 2104, it is the responsibility of the IAN subsystem to continually attempt to stay on the mode paging channel of the most preferred CDMA system available. To this end, an IAN mode state machine within the IAN mode state has sub-states of the IAN Mode state that are dedicated to this goal. This searching and camping process allows the handset to be capable of a IAN-CDMA active hand-off. It should be noted in one embodiment that the IAN mode controller does not attempt to duplicate the Init and Idle CDMA states, but rather uses the existing handset design in a controlled manner to find and camp on the most preferred CDMA system.

While in dedicated system measure sub-state 2165, a preferred CDMA system has not been found. The IAN mode controller queries the System Determination module for possible band/channel combinations in which to search for CDMA systems. The band/channel tuples are handed to the Searcher task 1911 and the task waits for a reply. During the CDMA Acquire sub-state 2164, the IAN mode controller is passing signals received from the RX task 1914 and SRCH task 1911 to the CDMA state machine. This allows the CDMA state machine to properly process the pilot, sync and paging channels of the CDMA system. Once the paging channel of the CDMA system has been completely acquired, the IAN mode state enters CDMA acquired sub-state 2163. During state 2163 the dedicated mode of IAN-CRR 2003 is monitored and SRCH task 1911 is allowed to enter sleep mode when the IAN protocol stack is not in the dedicated mode of operation. However, while in the dedicated mode, SRCH task 1911 is fully active and monitoring the paging channel, i.e., its ready for a Hand-Out to the CDMA system at any moment. When a deregistration indication is received from IAN-CRR 2003 task and IAN-CRR 2003 is in the dedicated mode of operation, the IAN mode state machine enters hand-out (HO) required sub-state 2161 to prepare the CDMA state machine (state 2103) for a handout from IAN to CDMA mode of operation. Sub-state 2162 is a preparatory state used while the handset is transitioning from CDMA to IAN mode of operation with an active bearer.

Power Down state 2105 is entered when the handset is ordered to power down or detects a low battery condition. In one embodiment, all tasks are gracefully shutdown, and information that must be saved is stored in non-volatile memory.

Sub-Component Descriptions

System determination module provides system selection control for the handset. The system determination module directs IAN-MM 2002 module when the IAN system should be the serving system. In one embodiment, IAN-MM 2002 module only provides call control services when the system determination module indicates that the IAN system is the current serving system. In one embodiment, the system determination module is enhanced from the current CDMA only design to include IAN mode determination.

The IAN mode controller module provides routing of asynchronous, externally generated signals to IAN-MM 2002 module. When in IAN-Active mode of operation, the IAN mode controller forwards MCC received signals to IAN-MM 2002 module. In the opposite direction, the IAN mode controller provides conversion from IAN-MM 2002 signals to the appropriate MCC signals. While in the IAN-Active state of operation, this module processes signals received on command and report queues of MCC task 1902.

IAN-MM

IAN-MM 2002 module is the main control task for the handset in IAN mode of operation. This task contains one embodiment of a Layer-3 Call Management state machine for the handset in this mode. In one embodiment, the only IAN mode features that IAN-MM 2002 modules is not directly involved with are the unlicensed-band IBS communications and bearer traffic. IAN-MM 2002 module has many roles as the IAN air interface control, including communication peer to the iSwitch, call control server to the Call Manager module, client to the auxiliary modules AUTH, OTASP, and MCC, client to the IAN Radio Resource manager. IAN-MM 2002 module also provides the setup and tear-down of these features but is not involved with the actual functioning of either feature.

Figure 22:
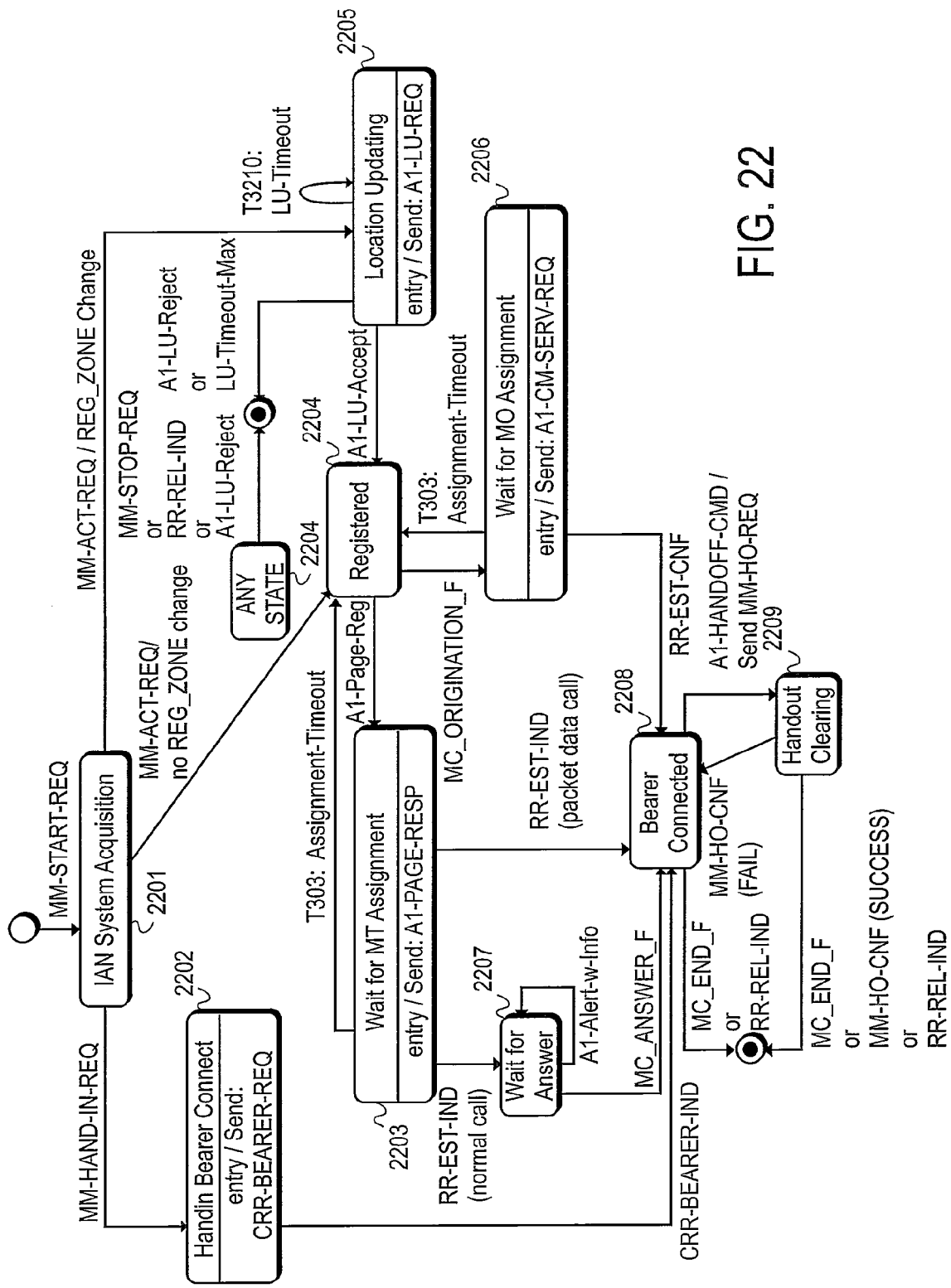
FIG. 22 is one embodiment of a state machine having LIM-MM 2002 main states.

FIG. 22 is one embodiment of a state machine having IAM-MM 2002 main states. Referring to FIG. 22, while in system acquisition state 2201, IAN-MM 2002 is not an active Mobility Manager (MM) of the handset. IAN-MM 2002 is awaiting either an MM-ACT-REQ or a MM-HAND-IN-REQ signal to begin acting as the controlling Mobility Manager of the handset. Registered state 2204 indicates that the Location Updating procedure has occurred on with the currently active registration zone (REG ZONE). Registered state 2204 is the 'Idle' state of IAN-MM 2002. While in Location Updating state 2205, IAN-MM 2002 attempts to register with the MSC by sending A1-Location-Updating-Req messages. Hand-In Bearer Connect state 2202 is a transitional state for setting up the necessary resources while pre-forming an active hand-off from CDMA to IAN mode of operation. When an A1-Page-Resp message is sent out by IAN-MM 2002, IAN-MM 2002 enters Wait for MT Assignment state 2203 while waiting for an indication from IAN-CRR 2003 that a radio resource has been allocated. When an A1-CM-Serv-Req message is sent out by IAN-MM 2002, IAN-MM 2002 enters Wait for MO Assignment state 2206 while waiting for an indication from IAN-CRR 2003 that a radio resource has been allocated. After IAN-CRR establishment has occurred, IAN-MM 2002 informs the Call Manager of an incoming call and transitions to Wait for Answer state 2207 to wait for a user answering of the call. Bearer Connected state 2208 is entered by IAN-MM 2002 whenever a bearer connection has been established. The bearer connection can be either voice or packet data, and Bearer Connected state 2208 indicates that IAN-CRR 2003 is in the Dedicated state (i.e., in an active session) of operation. Hand-Out Clearing state 2209 is used by IAN-MM 2002 when a A1-Handoff-Command is received while a bearer service is connected. Hand-Out Clearing state 2209 is held while MCC task 1902 prepares the CDMA state machine for the bearer transition.

Figure 23:
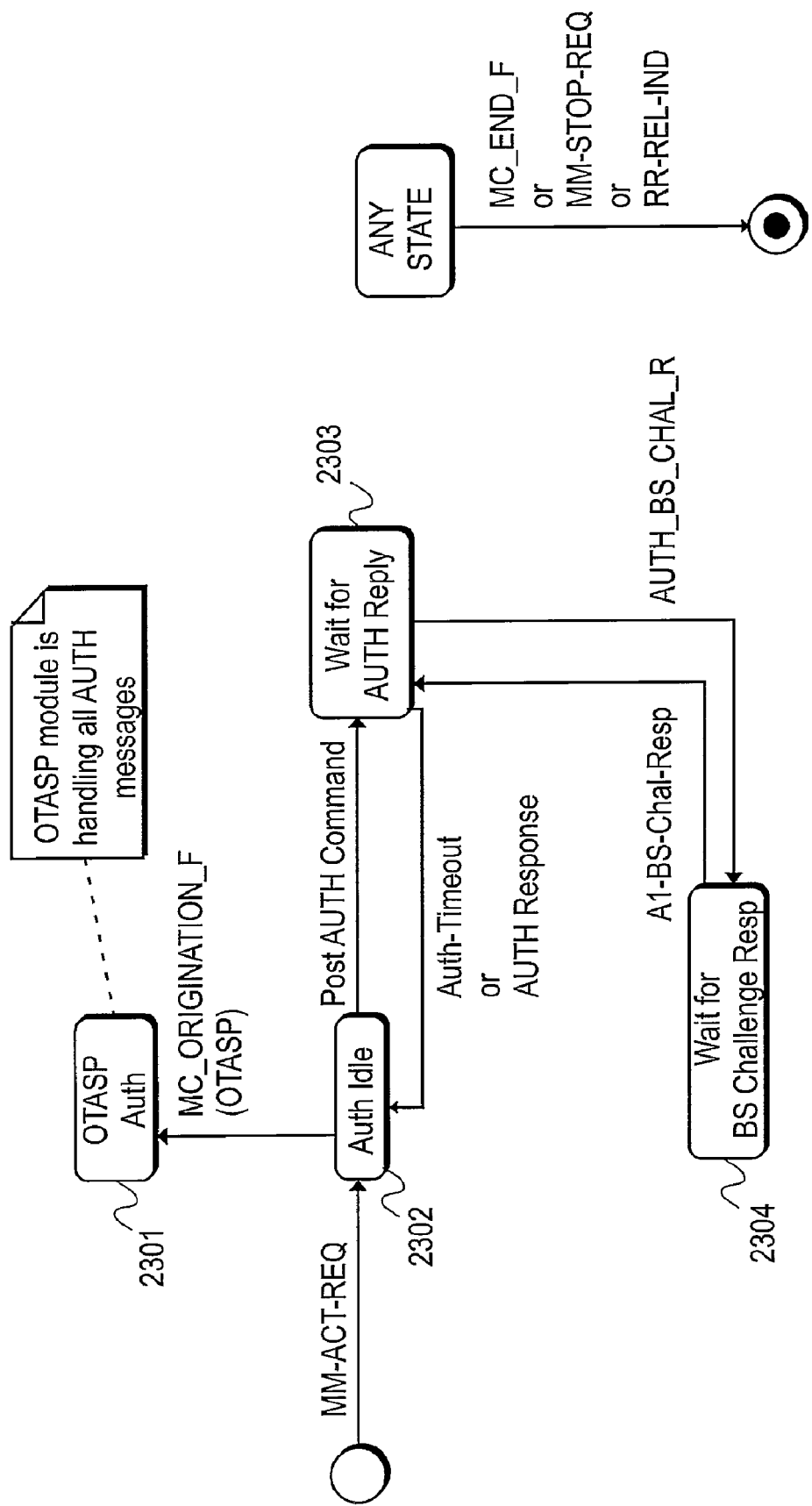
FIG. 23 illustrates one embodiment of the authentication state machine.
Figure 24:
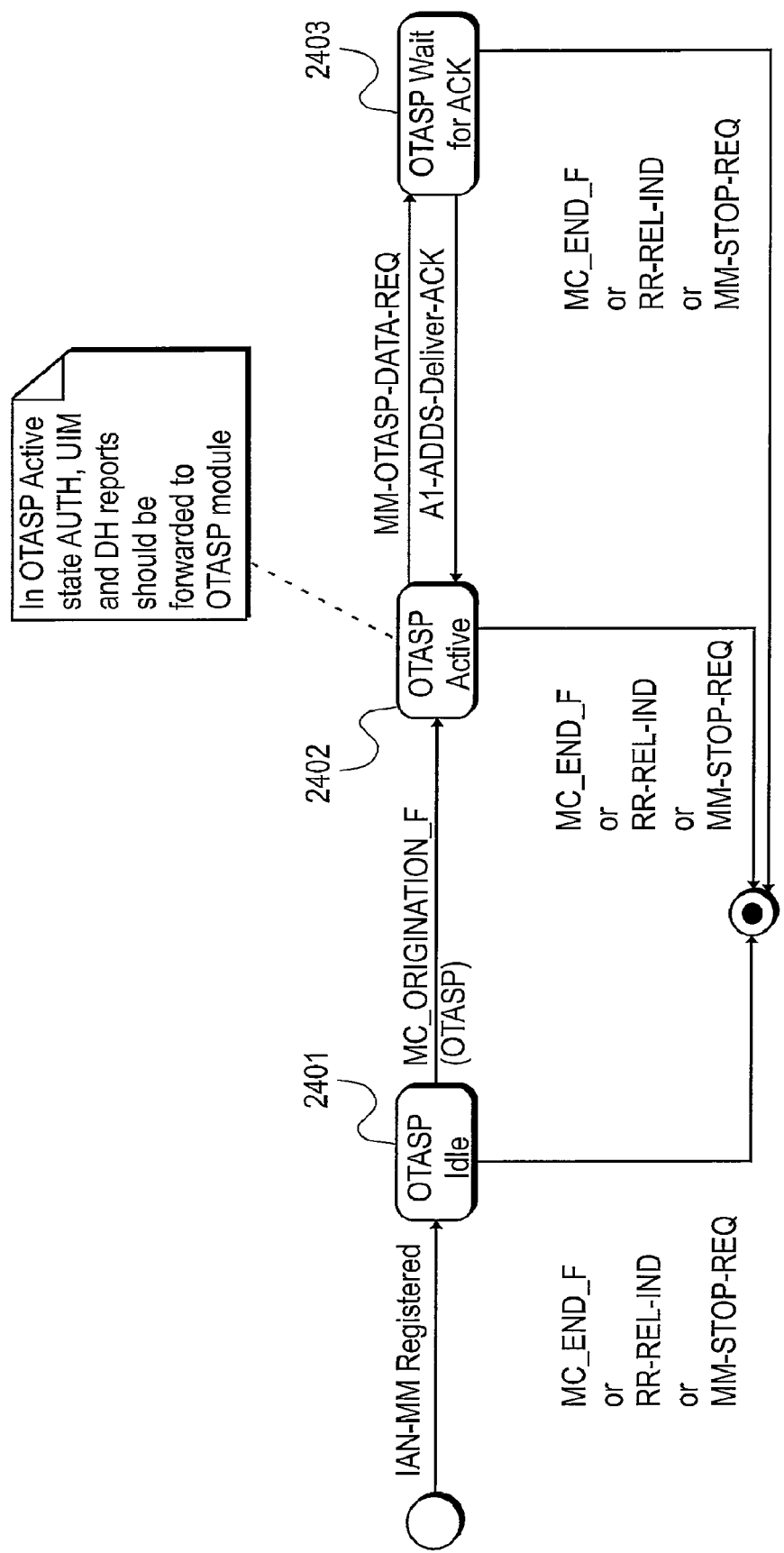
FIG. 24 illustrates one embodiment of the IAN-MM OTASP state machine.

FIG. 23 illustrates one embodiment of the authentication state machine. When IAN-MM 2002 service is activated, via an MM-ACT-REQ, the authentication state machine is placed into Authentication Idle state 2302. When IAN-MM 2002 service sends a command to the AUTH task 1906, IAN-MM enters Wait for AUTH Reply state 2303. While Wait for AUTH Reply in state 2303, IAN-MM 2002 waits for a reply from the AUTH task 1906 or the Auth-Timer expiration. During the SSD update procedure, IAN-MM 2002 transitions to Wait for BS Challenge Response state 2304 while awaiting a response from the Access Network in regards to the issued A1-BS-Challenge-Req. When an Origination request is received that indicates an OTASP call, IAN-MM 2002 shall place the Authentication state machine in OTASP mode represented by OTASP Authentication State 2301. In this mode, IAN-MM 2002 acts as an authentication relay, and all authentication exchanges are forwarded between the Access Network and the OTASP module within MCC task 1902. FIG. 24 illustrates one embodiment of the IAN-MM OTASP state machine. Referring to FIG. 24, when IAN-MM 2002 main state machine enters registered state 2204 it triggers the OTASP state machine to enter OTASP Idle state 2401. When an Origination request for an OTASP call is received by IAN-MM 2002 the OTASP state machine is placed into OTASP Active state 2402. In state 2402, IAN-MM 2002, acts as an ADDS relay of OTASP/OTAPA data between the Access Network and the OTASP module within the Main Control task. When the OTASP module issues an MM-OTASP-DATA-REQ, IAN-MM 2002 sends the A1-ADDS-Deliver message and places the OTASP state machine in OTASP Wait for Ack state 2402 wait for an acknowledgment.

Figure 25:
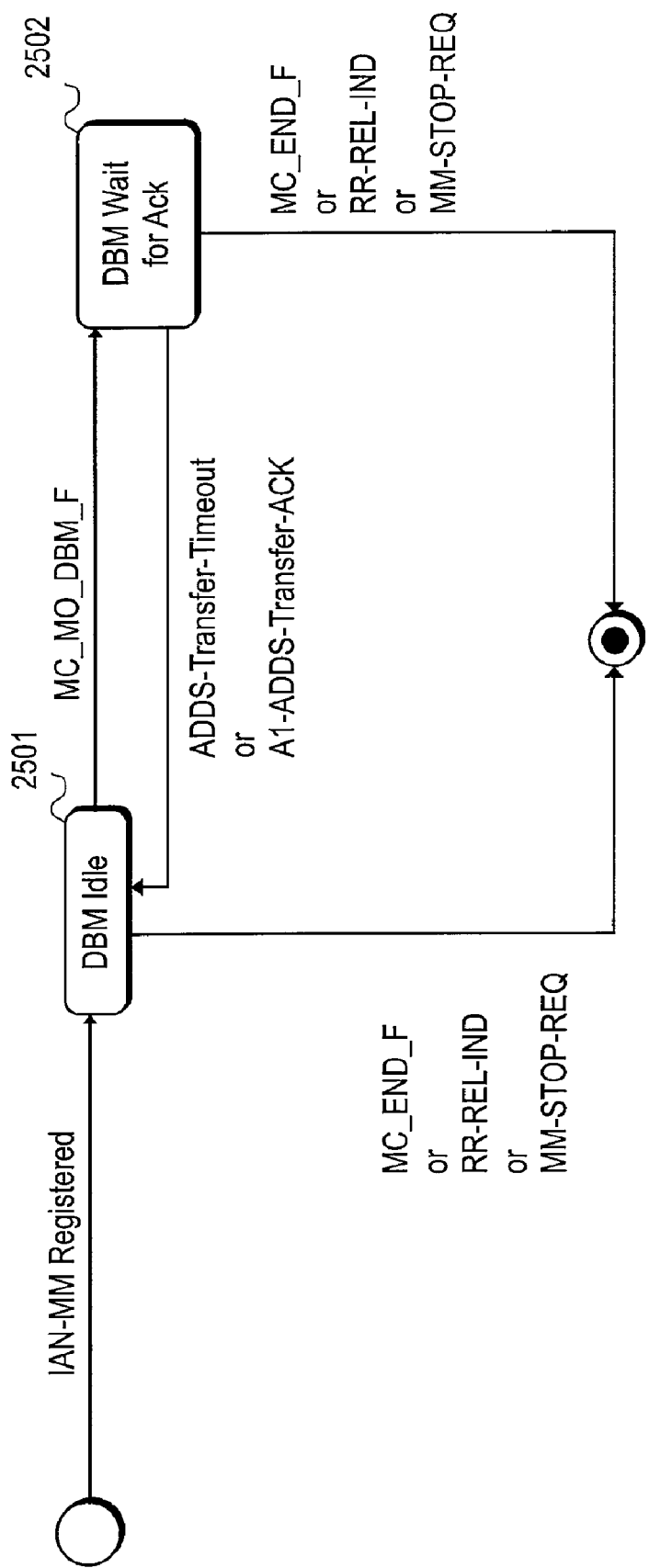
FIG. 25 illustrates one embodiment of a DBM state machine.

FIG. 25 illustrates one embodiment of a Data Burst Message (DBM) state machine. Referring to FIG. 25, when IAN-MM 2002 main state machine transitions to registered state 2204, the DBM state machine is placed into DBM Idle state 2501. While in state 2501, IAN-MM 2002 is capable of sending and receiving Data Burst Messages. When the Call Manager requests a Data Burst Message to be sent, IAN-MM 2002 transitions the DBM state machine to DBM Wait for ACK state 2502, starts the DBM Timer and awaits an acknowledgment from the Access Network.

IAN-CRR

IAN-CRR 2003 module handles the IBS specific layers of IAN communications. IAN-CRR 2003 provides an air interface abstraction layer to IAN-MM 2002 module. In one embodiment, IAN-CRR 2003 performs IAN registration, IAN link attachment, IAN link detachment, bearer resource setup, tear-down and transfer, and IAN air interface signal quality measurement.

Figure 26:
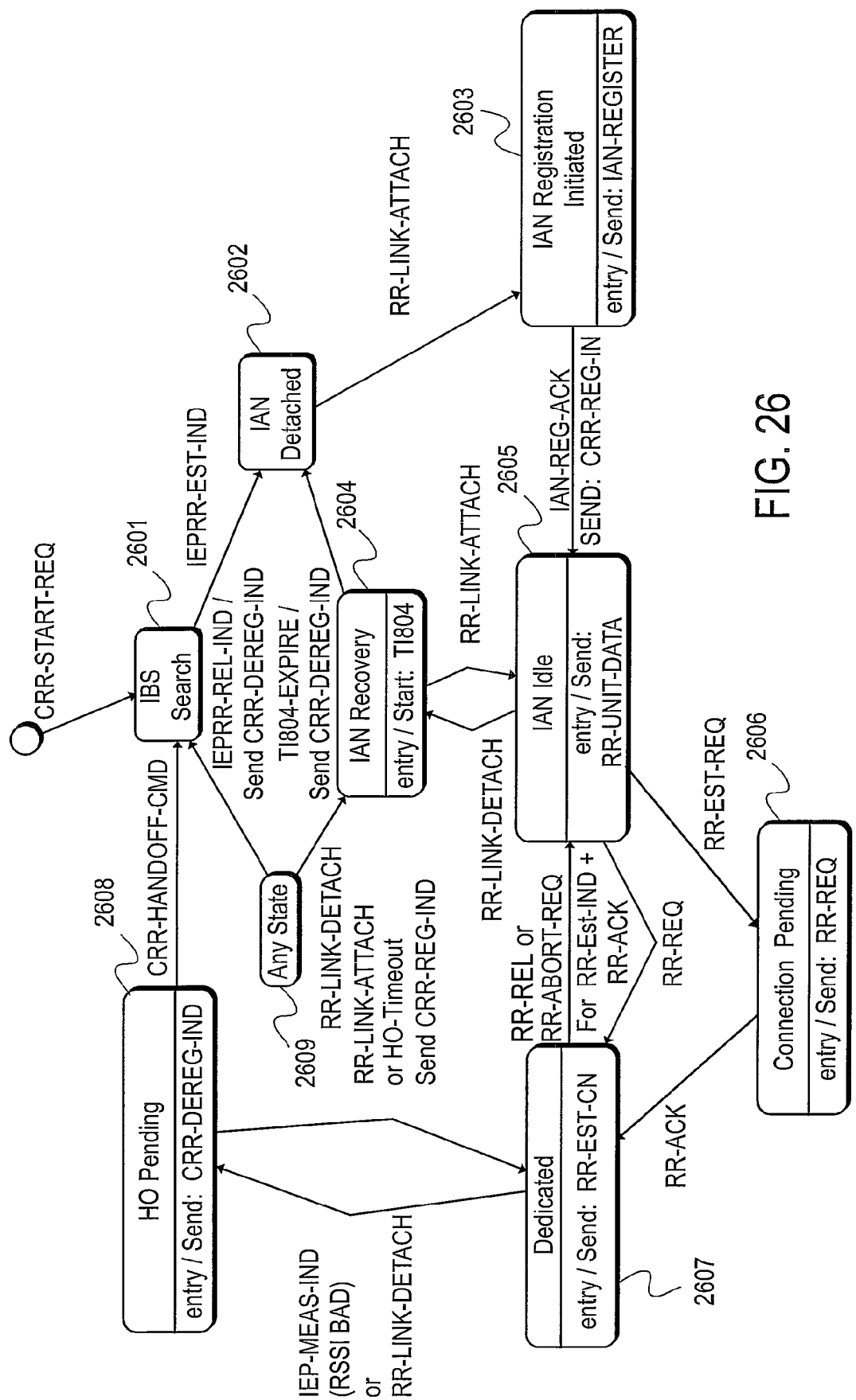
FIG. 26 illustrates a state diagram of an IAN-CRR state machine for one embodiment of a IAN-CRR.

FIG. 26 is a state diagram of a IAN-CRR state machine for one embodiment of IAN-CRR 2003. Referring to FIG. 26, when IAN-CRR 2003 is started, the service starts in IBS Search state 2601. In state 2601, IAN-CRR 2003 is awaiting an indication from IEP that an IAN system has been detected. After an IAN system has been detected by the IEP layer, IAN-CRR 2003 enters IAN detached state 2602 and awaits the RR-LINK-ATTACH command from the network. Once the IAN network has attached the RR link, IAN-CRR 2003 sends an IAN REGISTER message and enters registration initiated state 2603. Upon receiving an acknowledgment of the RR Registration, IAN-CRR 2003 transitions to Idle state 2605. In idle state 2605, IAN-CRR 2003 monitors the link attachment state and awaits commands to enter the bearer dedicated state of operation. When a RR-LINK-DETACH command is received from the IAN network, IAN-CRR 2003 transitions to recovery state 2604 and starts T1804. While in recovery state 2604, IAN-CRR 2003 awaits the expiration of the timer or an RR-LINK-ATTACH command from the network. Upon indication from the IEP layer that assignment to an air interface channel has occurred, IAN-CRR 2003 transitions to dedicated state 2607. In state 2607, bearer traffic is allowed to be passed through the IEP and air interface layers. While in dedicated state 2607, IAN-CRR 2003 monitors the IEP layer to determine the RSSI of the air interface and determine whether a handout of the active call to CDMA mode of operations is required. When a bad RSSI level is detected from the air interface level, IAN-CRR 2003 transitions to Hand-Out pending state 2608 and notifies the Main Control task of the need to transition to active CDMA mode of operations.

The IAN Encapsulation Protocol (IEP) module within IAN-CRR 2003 provides logical link services, Air Interface management and network security functions.

In one embodiment, the CDMA/AAN handset is air interface agnostic. In order to accomplish this goal, IAN-CRR 2003 has the ability to 'plug-in' to different Air Interface server components. An Air Interface Multiplexer 2005 provides a common interface to the main task of IAN-CRR 2003.

The Bluetooth stack only interfaces with pre-defined Bluetooth applications. In one embodiment, in order for Bluetooth events to be received by the IAN handset software, the air interface multiplexer is a Bluetooth application 2007. In an alternative embodiment, Air Interface Multiplexer 2005 can is an 802.11 client application 2006.

In one embodiment, IAN-CRR interfaces with Vocoder task 1913 to either Pass forward and reverse packetized, vocoded, voice traffic between the established IEP bearer and the codecs, or configure the Direct Memory Access (DMA) routes of the DSP hardware to route PCM samples to/from the established Air Interface connection.

In one embodiment, IAN-CRR 2003 interfaces with the data queues present in the Data Services module. Forward and reverse data traffic are enqueued and dequeued by IAN-CRR 2003.

Call Manager

Call Manager 1901 provides out of band call control and event notification services to its clients. Call Manager 1901 acts as an abstraction layer between the User Interface layers of the handset and the lower layer, air interface specific portions of the phone. The Call Manager provides the input stimulus to user triggered events such as, for example, Call Origination, System Determination, Mobile Originated SMS, OTASP, Mobile Initiated Hook Flash, and Mobile Initiated Call Release. Additionally, the Call Manager acts as the receiver of user destined information from the air interface protocols including Incoming Call Notification, Alert Notification, Reorder Notification, Intercept Notification, Network Commanded Display Information, Calling party Information, Called party Information, and Message Waiting Indications. This module is treated as an outside environmental component to the IAN handset system.

Bluetooth

Bluetooth module 2007 provides a full Bluetooth stack up-to the baseband layer. Bluetooth module 2007 also controls the Bluetooth RF Hardware unit and Base band DSP Firmware image. Bluetooth module 2007 provides an interface for client applications to register and deregister specific services. Bluetooth module 2007 provides the low layer communications for functional requirements that need to interface with the IAN. In one embodiment, if not all, functions off the Hybrid handset in IAN mode shall use Bluetooth module 2007.

Data Services

Data services module 2008 provides queues in both the forward and reverse directions for all data bearer communications. Data services module 2008 provides the routing of the data bearer path between the data client and the IAN system. The RLP mechanisms of the module shall not be used in IAN mode, instead the raw and PPP data queues shall be used directly.

Concurrent Behavior Decomposition

In one embodiment, the IAN/CDMA handset includes functionality to perform the traditional CDMA operations as well as the behavior set further in the following discussion. Each of these behaviors are involved with the providing handset functionality on the Indoor Access Network (IAN).

Figure 27:
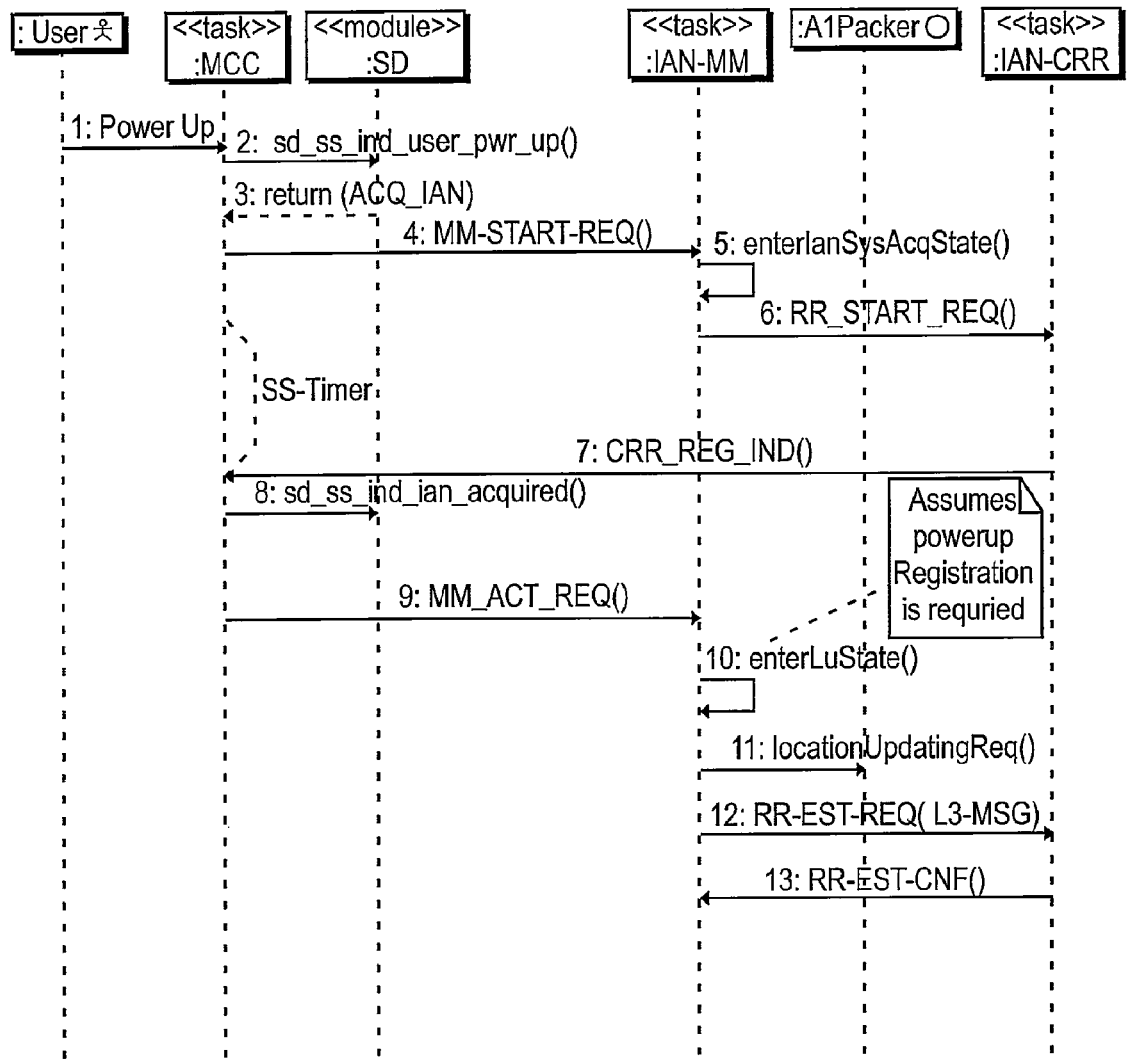
FIG. 27 illustrates an exemplary IAN system determination process at power up.

IAN system determination involves search for IAN networks and determine if the IAN network is usable by the mobile terminal. An exemplary IAN system determination process at power up is shown in FIG. 27. Referring to FIG. 27, at step 1, the mobile station is powered on. At step 2, MCC task 1902 informs the system determination subsystem that a power up has just occurred and SD 1907 determines the next action to take. At step 3, SD 1907 returns ACQ IAN as the next action for MCC task 1902 to perform, and MCC task 1902 attempts to acquire an IAN network. At step 4, MCC task 1902 requests IAN-MM 2005 to start. At step 5, IAN-MM 2005 enters the IAN system acquisition state and begins search for an IAN network. At step 6, IAN-MM 2005 request IAN-CRR 2003 to start. At step 7, IAN-CRR 2003 indicates to MCC task 1902 that an IAN system has been acquired. At step 8, MCC task 1902 informs the system determination subsystem that IAN system has been discovered. SD 1907 returns the next action to take. In this case, the next action is to use the new IAN system. At step 9, MCC task 1902 requests IAN-MM 2002 to use the new IAN system. At step 10, IAN-MM 2002 determines that a location update procedure is required and enters the location update state. At step 11, IAN-MM 2002 builds an A1 location updating request message. At step 12, IAN-MM 2002 request IAN-CRR 2003 to send the A1 message on the IAN air interface.

Figure 28:
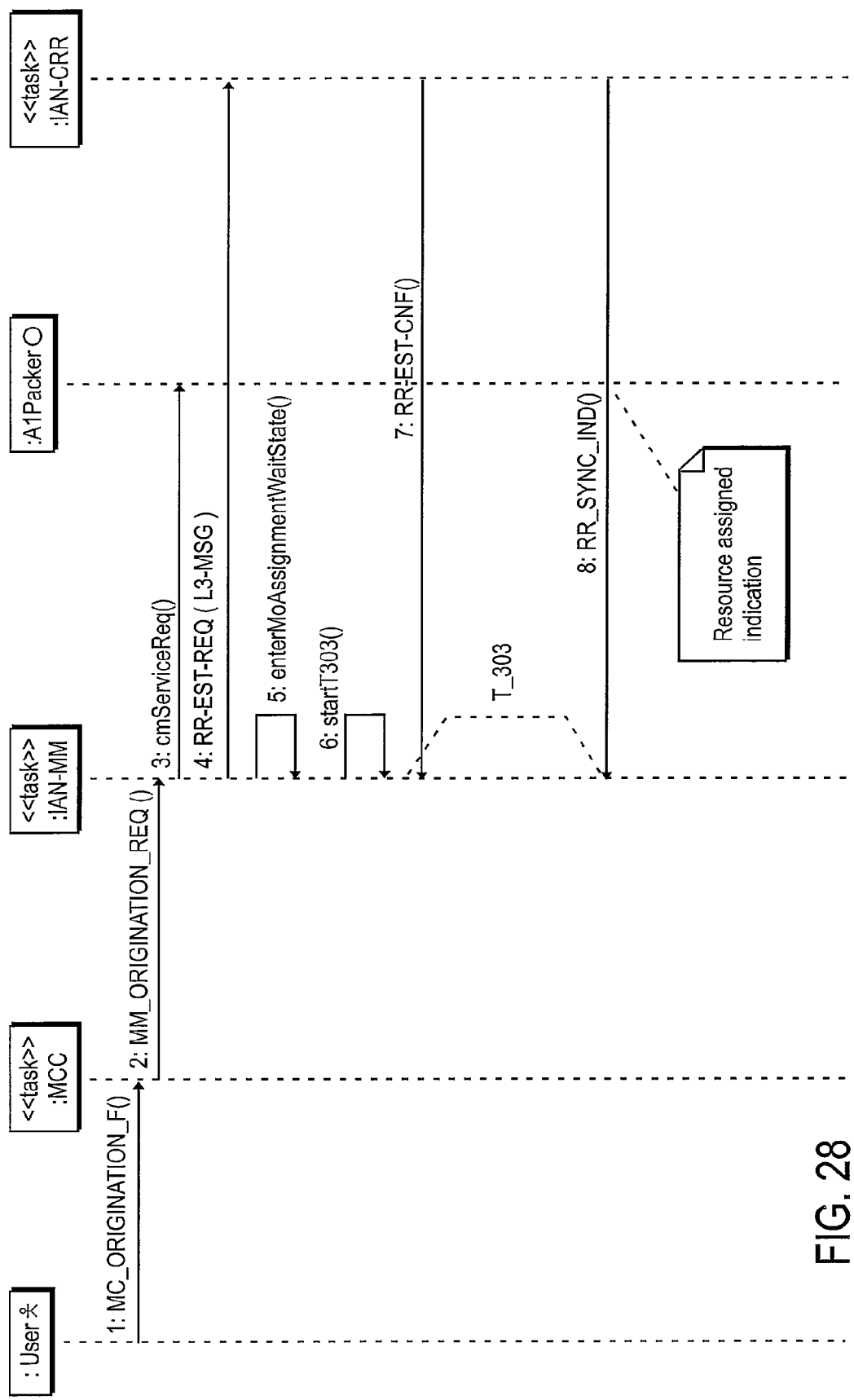
FIG. 28 illustrates an exemplary message flow involved in IAN mobile call origination.

FIG. 28 illustrates an exemplary message flow involved in IAN mobile call origination. This message flow allows the mobile terminal to originate calls while on the IAN network. Referring to FIG. 28, at step 1, the command is sent to MCC task 1902 to originate a call. At step 2, MCC task 1902 requests IAN-MM 2002 to originate a call. At step 3, IAN-MM 2002 builds an A1 CM service request message in order to originate a call. At step 4, IAN-MM 2002 requests IAN-CRR 2003 to send the A1 message to the IAN network. At step 5, IAN-MM 2002 enters the MO assignment wait state. At step 6, IAN-MM 2002 starts a T303 timer. T303 timer detects timeouts in call origination procedure. In one embodiment, expiration of this timer leads to a failure of the call origination. At step 7, RR_Sync_IND is an indication to IAN-MM 2002 that channel resource has been allocated between the mobile station IAN network.

Figure 29:
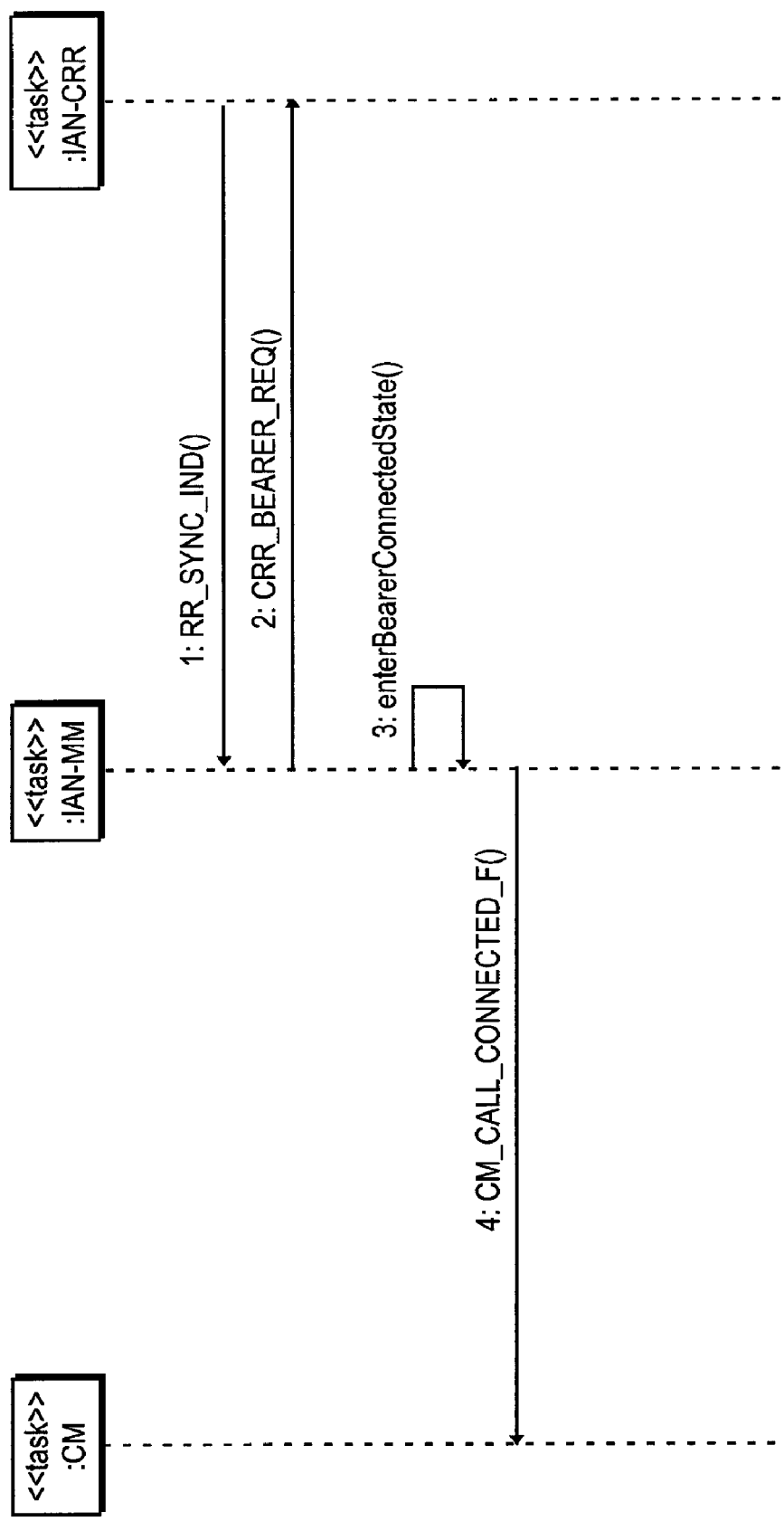
FIG. 29 is an exemplary message flow for IAN-CRR assignments.

FIG. 29 is an exemplary message flow for IAN-CRR assignments. Referring to FIG. 29, at step 1, RR SYNC IND is the indication to connect the bearer during an origination. At step 2, IAN-MM 2002 request IAN-CRR 2003 to connect the bearer channel. At step 3, IAN-MM 2002 enters the bearer connected state. At step 4, call manager 1901 is informed that the call is connected.

Figure 30:
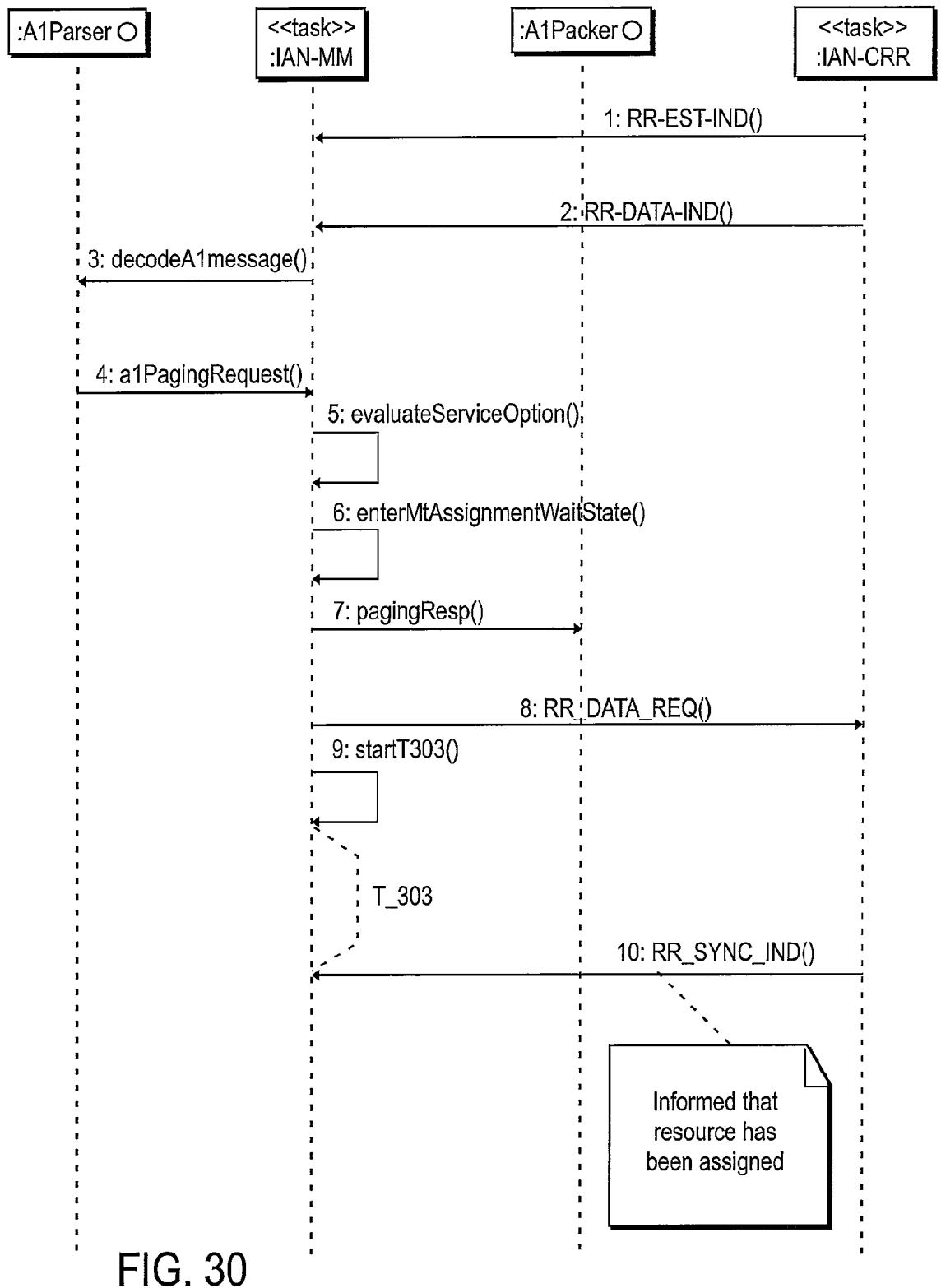
FIG. 30 illustrates an exemplary message flow involved in IAN mobile call termination to allow the mobile terminal to receive calls while on the IAN network.

FIG. 30 illustrates an exemplary message flow involved in IAN mobile call termination to allow the mobile terminal to receive calls while on the IAN network. Referring to FIG. 30, at step 1, IAN-CRR 2003 passes a received A1 message up to IAN-MM 502. At step 3, IAN-MM 2002 decodes the A1 message. At step 4, the A1 message an A1 paging request and is processed. At step 5, IAN-MM 2002 evaluates the service option and the correct type of service is setup. At step 6, IAN-MM 2002 enters the MT assignment wait state. At step 7, IAN-MM 2002 builds an A1 paging response message. At step 8, IAN-MM 2002 requests IAN-CRR 2003 send the A1 message to the IAN network. At step 9, IAN-MM 2002 starts the T303 timer. If this timer expires, then call setup has failed. At step 10, IAN-CRR 2003 indicates to IAN-MM 2002 that the IAN channel is connected.

Figure 31:
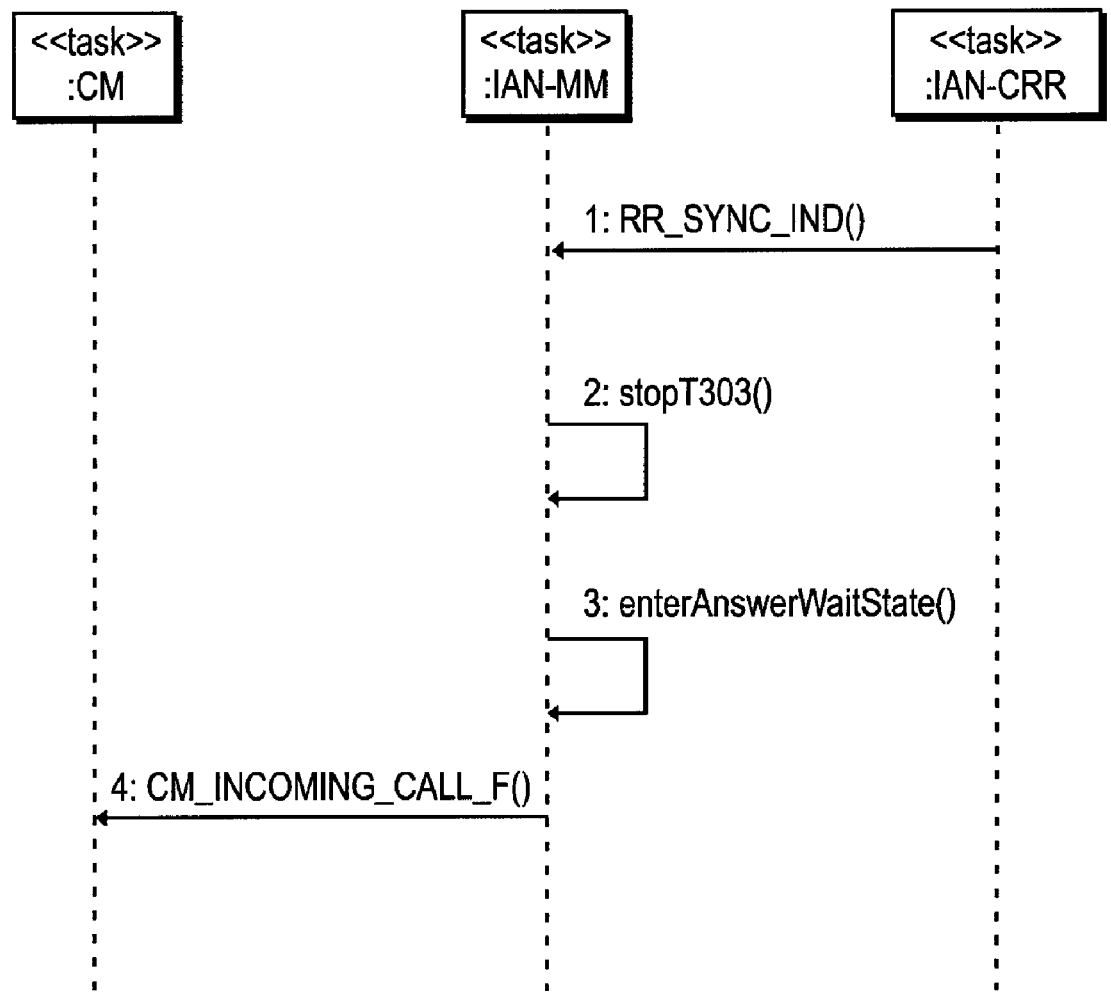
FIG. 31 illustrates exemplary memory flows for performing IAN-CRR assignment for an incoming call.

FIG. 31 illustrates exemplary memory flows for performing IAN-CRR assignment for an incoming call. Referring to FIG. 31, at step 1, IAN-CRR 2003 indicates to IAN-MM 2002 that the IAN channel is connected. At step 2, the T303 timer is stopped and the system determination subsystem is informed that the IAN channel is assigned. In one embodiment, the step is not performed. At step 3, SD 1907 instructs IAN-MM 2002 to continue with the call setup and IAN-MM 2002 enters the answer wait state. At step 4, call manager 1901 is informed of the incoming call to signal the user.

Figure 32:
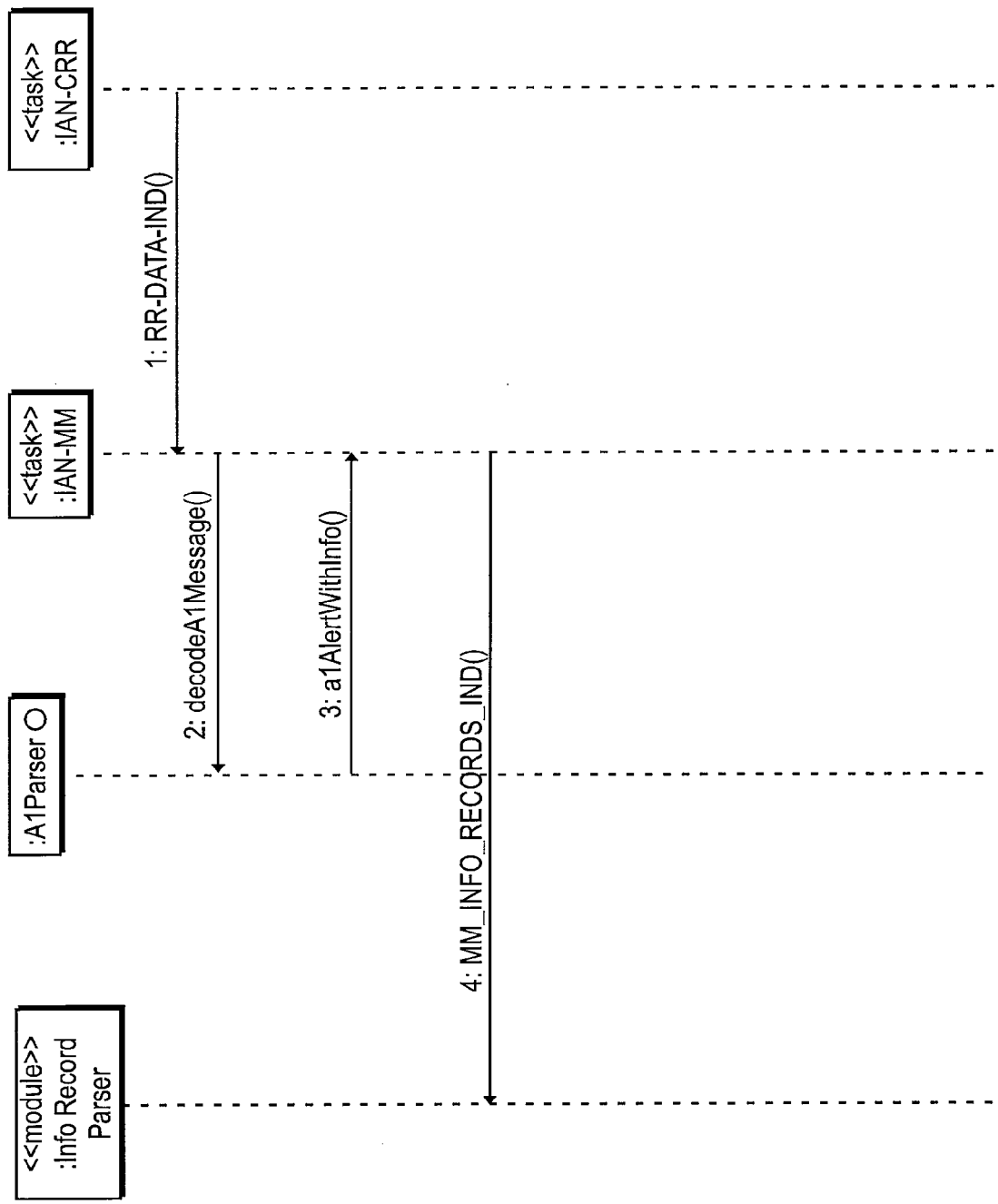
FIG. 32 is an exemplary message flow for handling alerts with no codes.

FIG. 32 is an exemplary message flow for handling alerts with no codes. Referring to FIG. 32, at step 1, IAN-CRR 2503 receives an A1 message and message is passed to IAN-MM 2002. At step 2, IAN-MM 2002 decodes the A1 message. At step 3, the A1 message is an alert with info message and is processed. At step 4, the info records are passed to the info record parser. At step 5, IAN-MM 2002 builds an A1 flash with information ack message. At step 6, IAN-MM 2002 requests IAN-CRR 2003 to send the A1 message to the IAN network.

Figure 33:
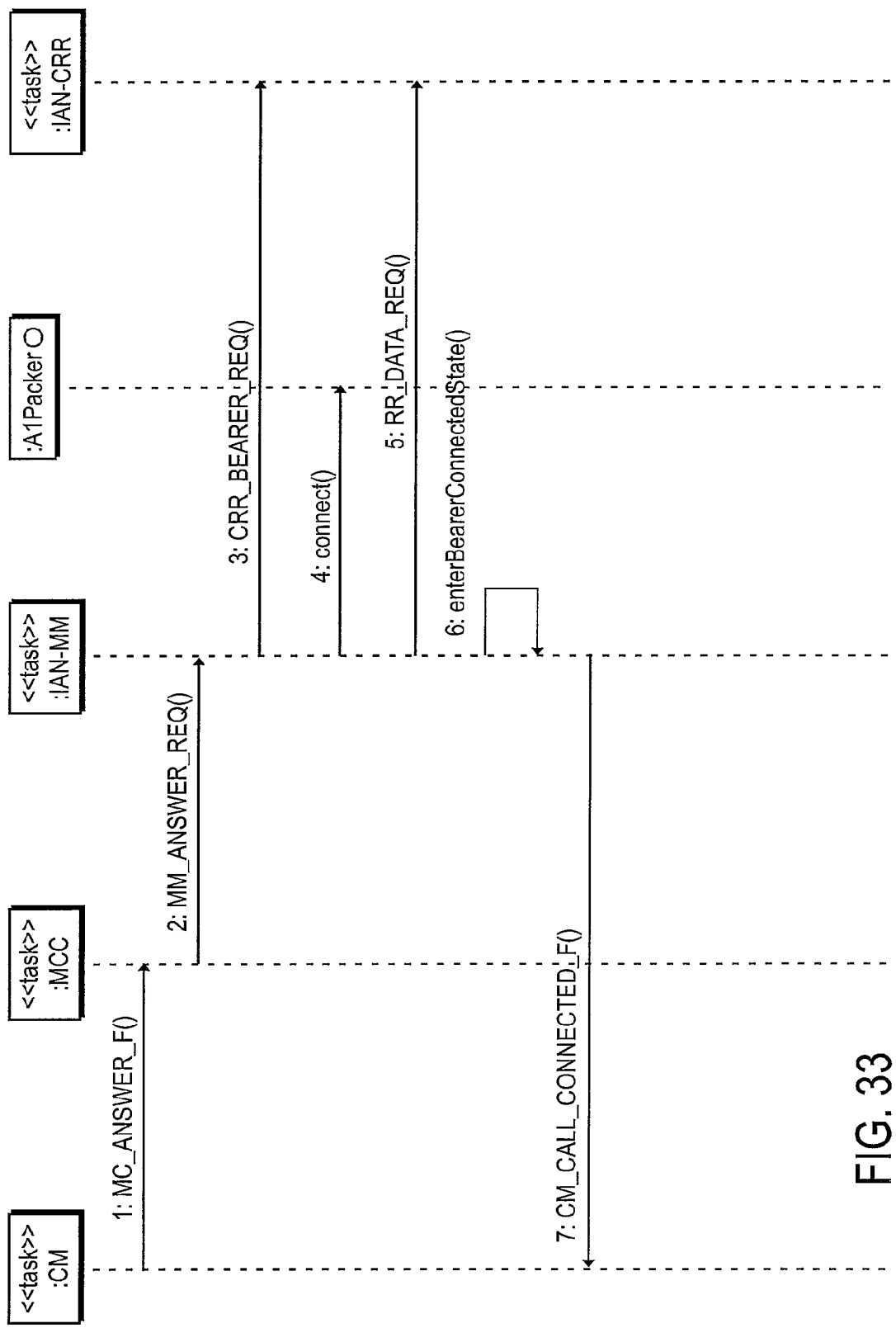
FIG. 33 is an exemplary message flow for performing an answer during mobile call termination.

FIG. 33 is an exemplary message flow for performing an answer during mobile call termination. Referring to FIG. 33, at step 1, call manager 1901 instructs MCC task 1902 to answer the incoming call. At step 2, MCC task 1902 instructs IAN-MM 2002 to answer the incoming IAN call. At step 3, IAN-MM 2002 requests IAN-CRR 2003 to connect the bearer traffic to the IAN channel. At step 4, IAN-MM 2002 builds an A1 connect message. At step 5, IAN-MM 2002 requests IAN-CRR 2003 to send the A1 message to the IAN net-work. At step 6, IAN-MM 2002 enters the bearer connected state. At step 7, IAN-MM 2002 informs the call manager that the incoming call is now connected.

Figure 34:
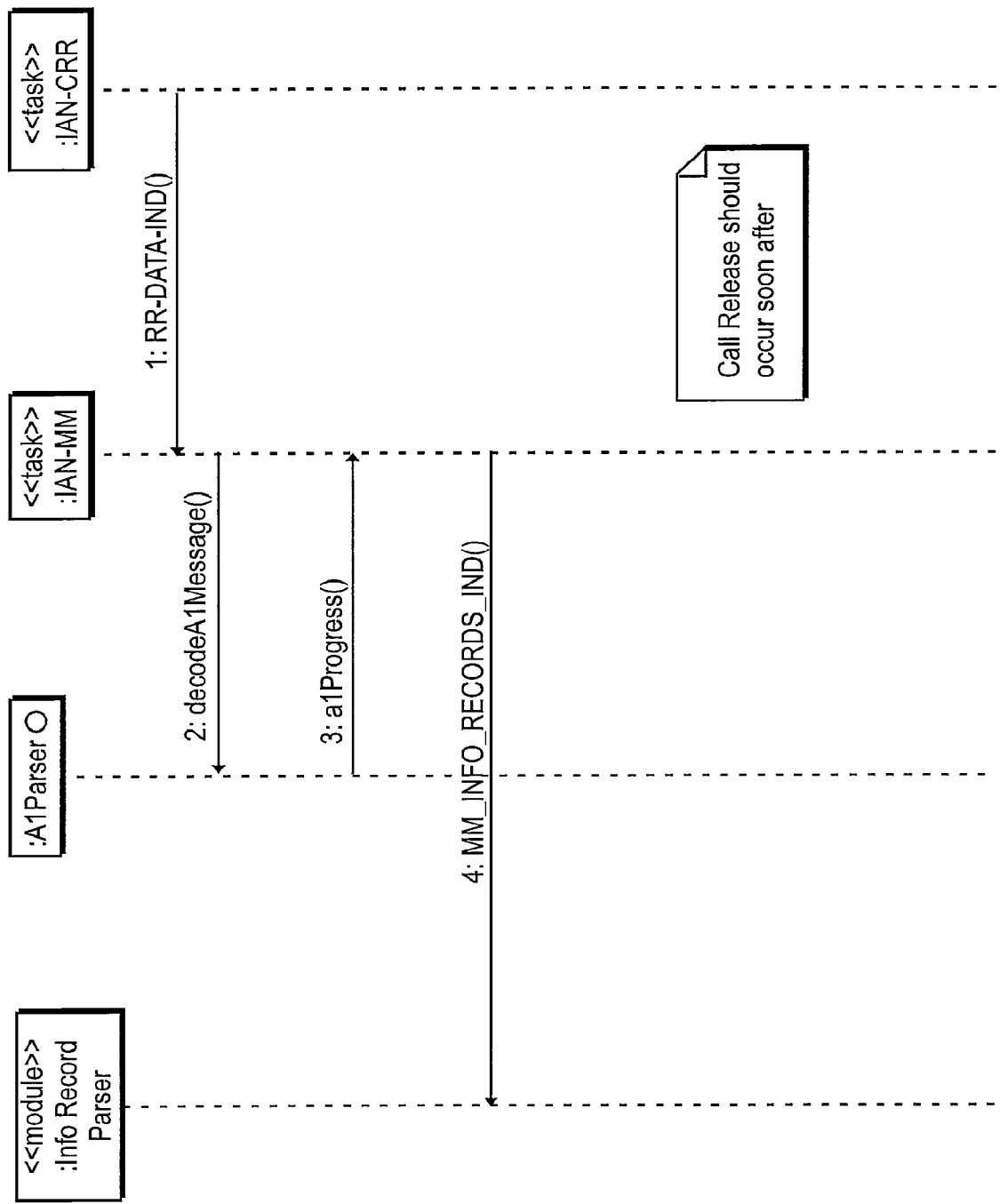
FIG. 34 illustrates an exemplary message flow to perform a call progress indication procedure to provide call progress indications to the mobile station while on the IAN network.

FIG. 34 illustrates an exemplary message flow to perform a call progress indication procedure to provide call progress indications to the mobile station while on the IAN network. Referring to FIG. 34, at step 1, IAN-CRR 2003 receives an A1 message and the message is passed to IAN-MM 2002. At step 2, IAN-MM 2002 decodes the A1 message. At step 3, the A1 message is a progress message and it is processed. At step 4, the information records are passed to the info record parser for processing.

Figure 35:
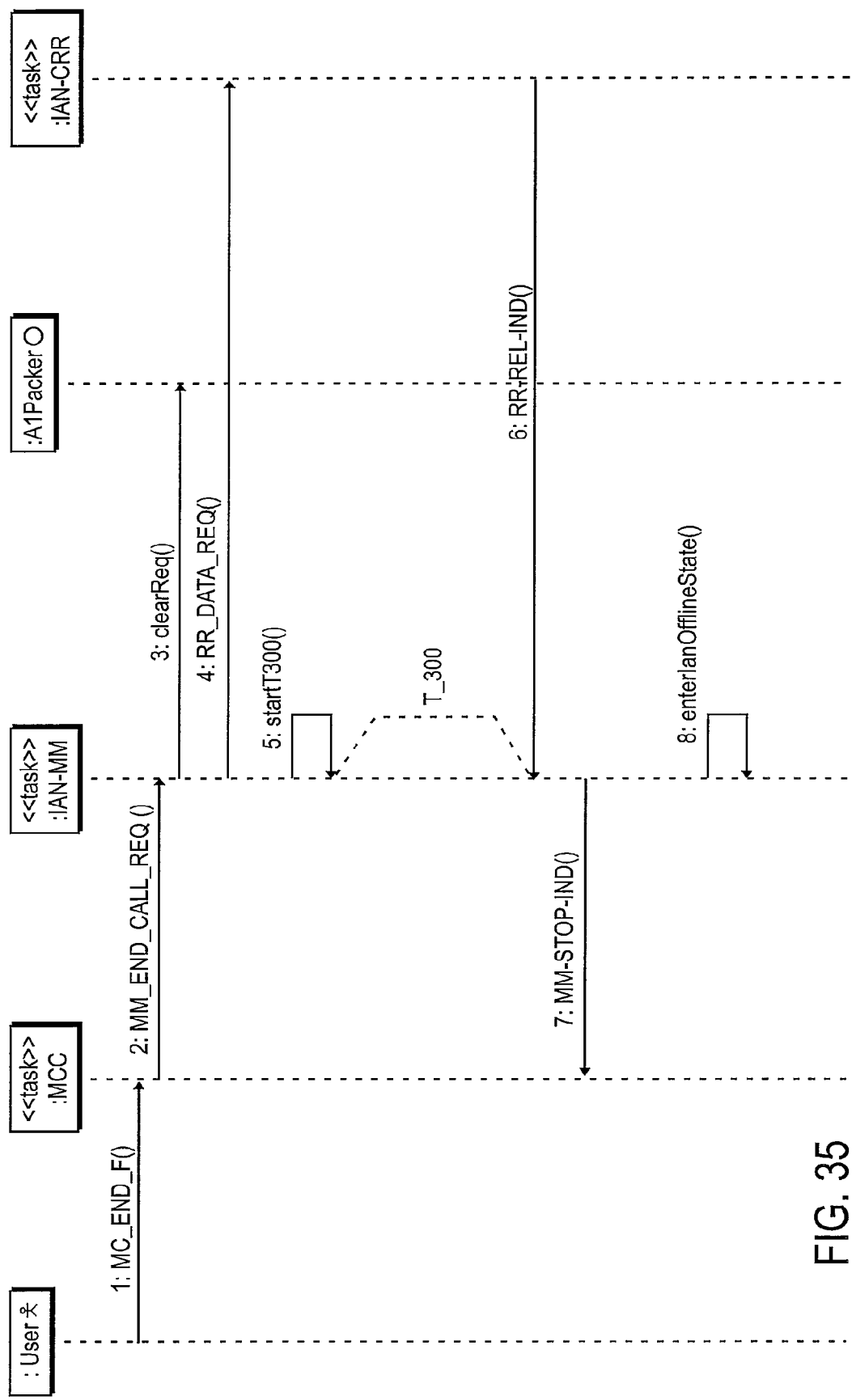
FIG. 35 illustrates an exemplary message flow to perform a mobile-initiated cell release to allow the mobile terminal to initiate the release of an active call on the IAN network.

FIG. 35 illustrates an exemplary message flow to perform a mobile-initiated cell release to allow the mobile terminal to initiate the release of an active call on the IAN network. Referring to FIG. 35, at step 1, a command is sent to MCC task 1902 requesting the call to be ended. At step 2, MCC task 1902 requests IAN-MM 2002 to end the IAN call. At step 3, IAN-MM 2002 builds an A1 clear request message. At step 4, IAN-MM 2002 requests IAN-CRR 2003 to send the A1 message to the IAN net-work. At step 5, IAN-MM 2002 starts the T300 timer, the expiration of which triggers a dropping of the call. At step 6, IAN-CRR 2003 indicates to IAN-MM 2002 that the IAN channel has been deactivated. At step 7, IAN-MM 2002 indicates to MCC task 1902 that the IAN call has been released. At step 8, IAN-MM 2002 enters the IAN offline state.

Figure 36:
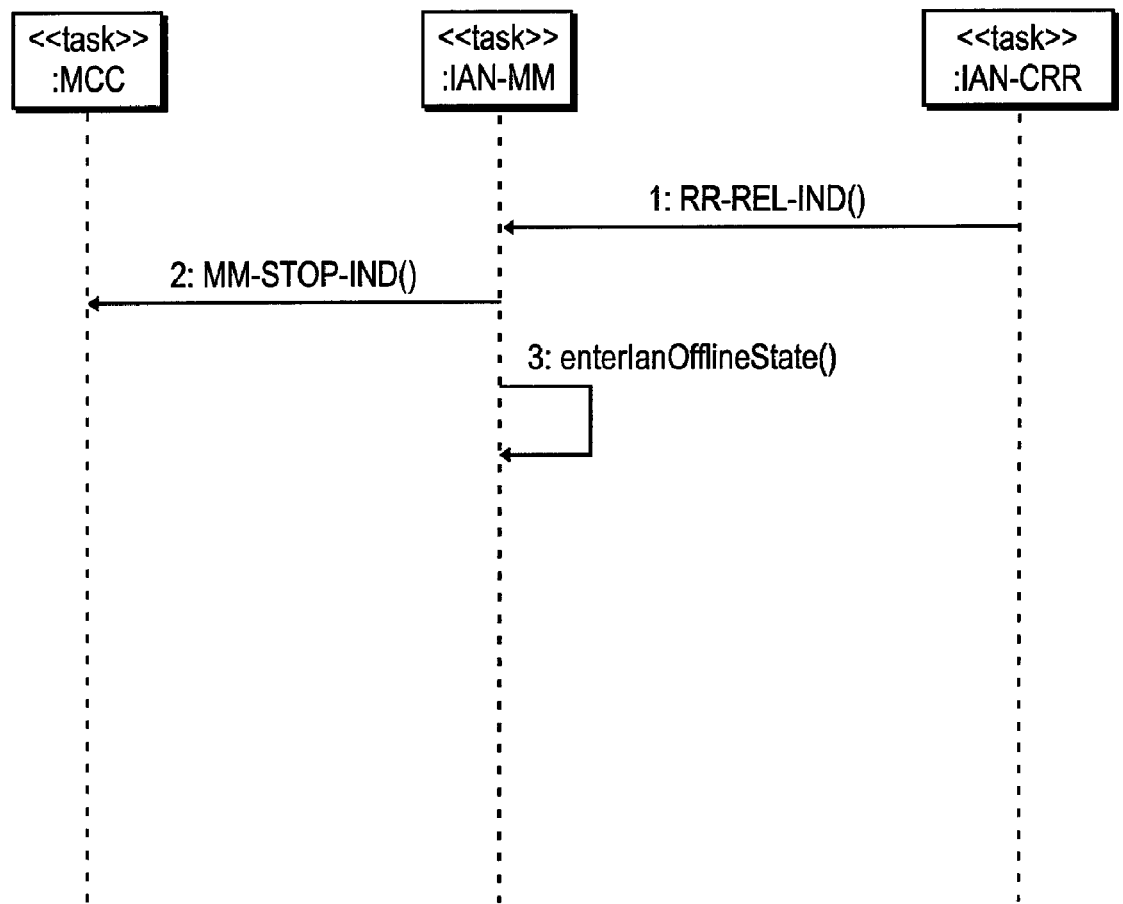
FIG. 36 illustrates an exemplary message flow to perform a network initiated cell release procedure to allow the IAN network to initiate the release of an active call on the IAN network.

FIG. 36 illustrates an exemplary message flow to perform a network initiated call release procedure to allow the IAN network to initiate the release of an active call on the IAN network. Referring to FIG. 36, at step 1, IAN-CRR 2003 indicates to IAN-MM 2002 that the IAN channel has been deactivated. At step 2, IAN-MM 2002 indicates to MCC task 1902 that the IAN call has been released. At step 3, IAN-MM 2002 enters the IAN offline state.

Figure 37:
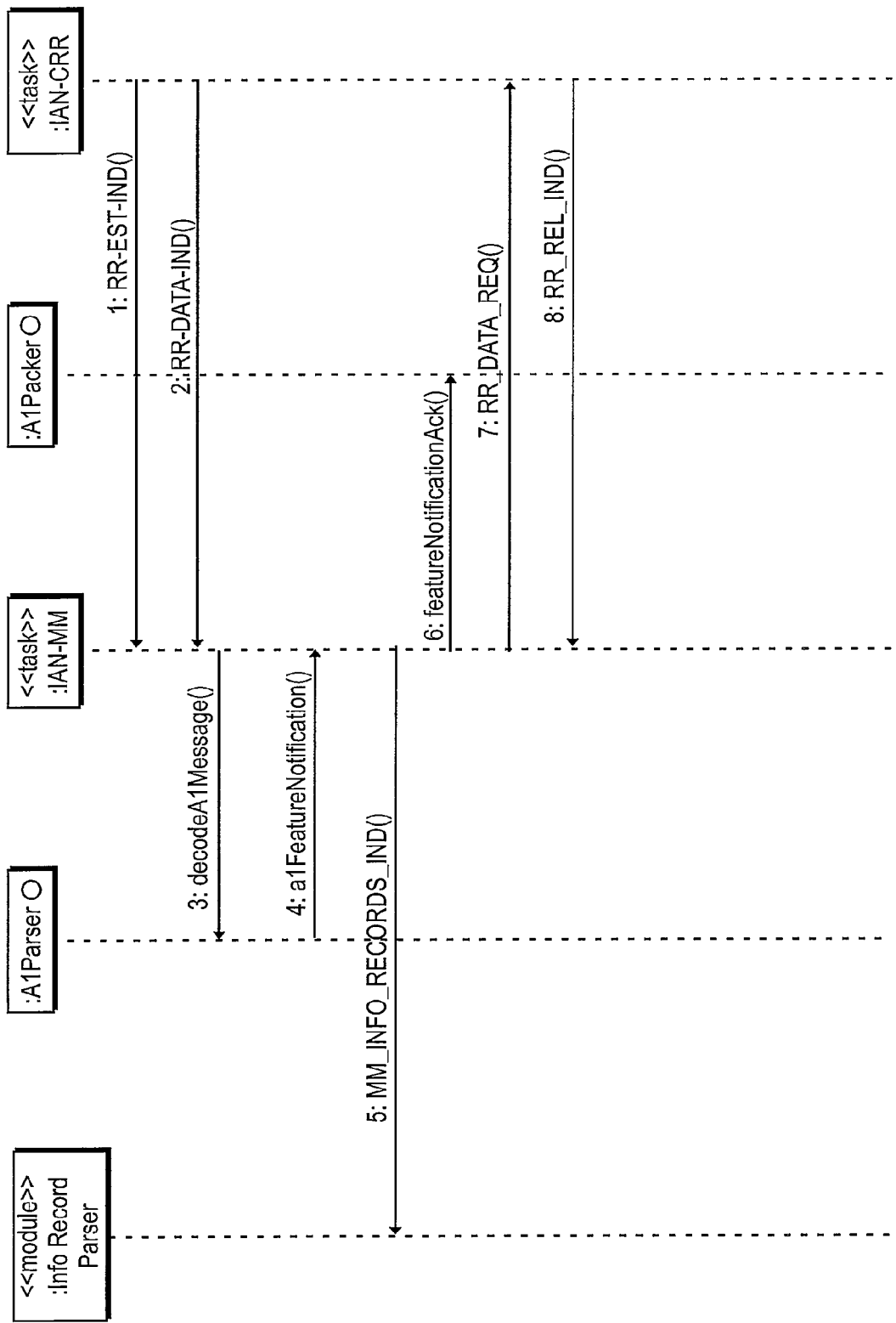
FIG. 37 illustrates an exemplary message flow to perform a network for the IAN network.

FIG. 37 illustrates an exemplary message flow to perform feature notification for the IAN. Referring to FIG. 37, at steps 1 and 2, IAN-CRR 2003 receives an A1 message and the message is passed to IAN-MM 2002. At step 3, IAN-MM 2002 decodes the A1 message. At step 4, the A1 message is an A1 feature notification message and is processed. At step 3, the information records are passed to the information record parser. At step 6, IAN-MM 2002 builds an A1 feature notification ack message. At step 7, IAN-MM 2002 requests IAN-CRR 2003 to send the A1 message to the IAN network. At step 8, IAN-CRR 2003 sends the A1 memory to the IAN network.

Figure 38:
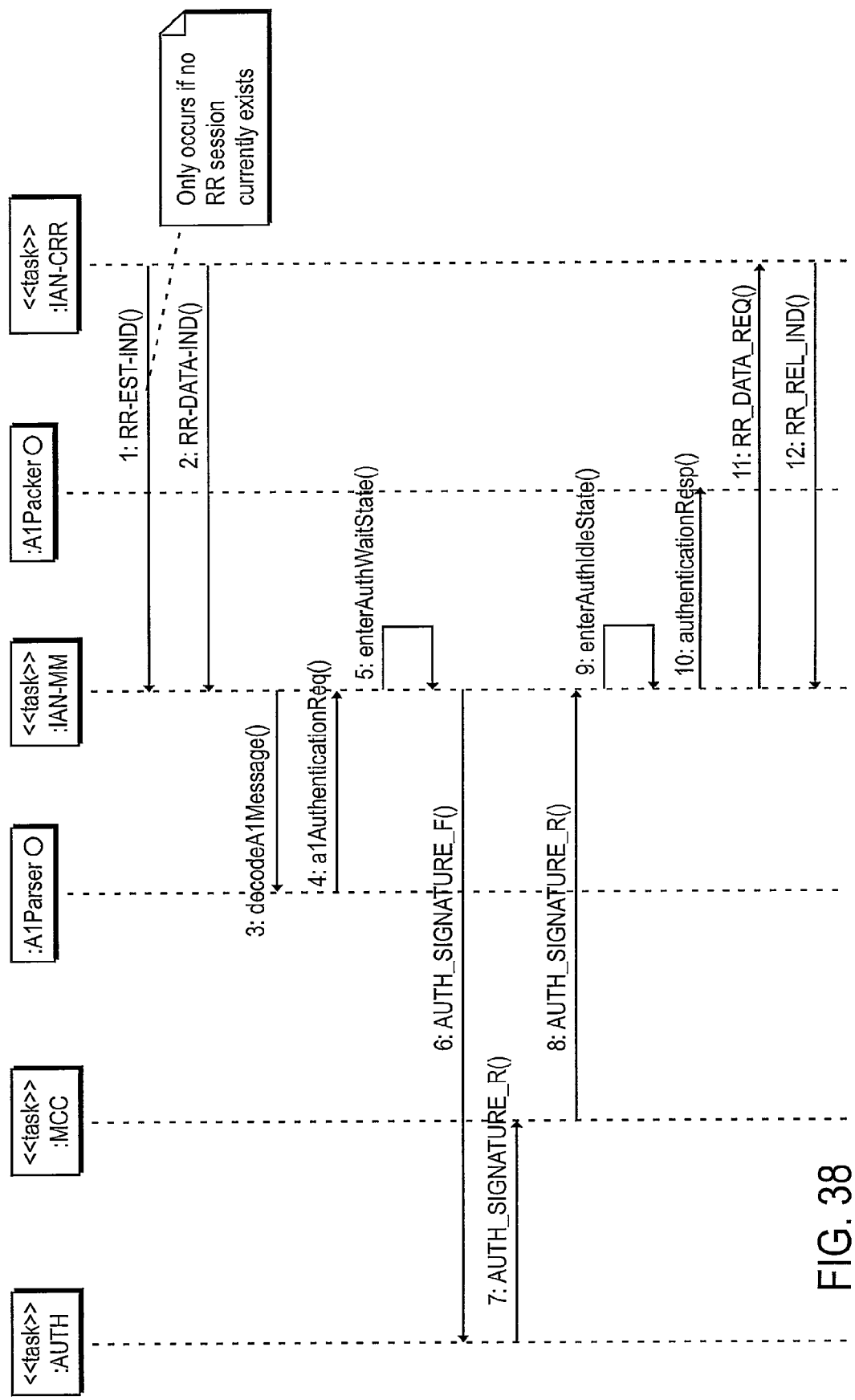
FIG. 38 is an exemplary message flow to provide authentication of the mobile terminal while the terminal is on the IAN network.

FIG. 38 is an exemplary message flow to provide authentication of the mobile terminal while the terminal is on the IAN network. Referring to FIG. 38, at steps 1 and 2, IAN-CRR 2003 receives an A1 message and the message is passed to IAN-MM 2002. At step 3, IAN-MM 2003 decodes the A1 message. At step 4, the A1 message is an A1 authentication request message and is processed. At step 5, IAN-MM 2002 enters the auth(entication) wait state. At step 6, IAN-MM 2002 sends the authentication information to AUTH task 1904 to be processed. At step 7, AUTH task 1904 processes the authentication information and sends the results to MCC task 1902. At step 8, MCC task 1902 pass the authentication results to IAN-MM 2002 while MCC task 1902 is in IAN mode. At step 9, IAN-MM enters the auth idle state. At step 10, IAN-MM 2002 builds an A1 authentication response message. At step 11, IAN-MM 2002 requests IAN-CRR 2003 to send the A1 message to the IAN network. At step 12, IAN-CRR 2003 sends the A1 message to the IAN network.

Figure 39:
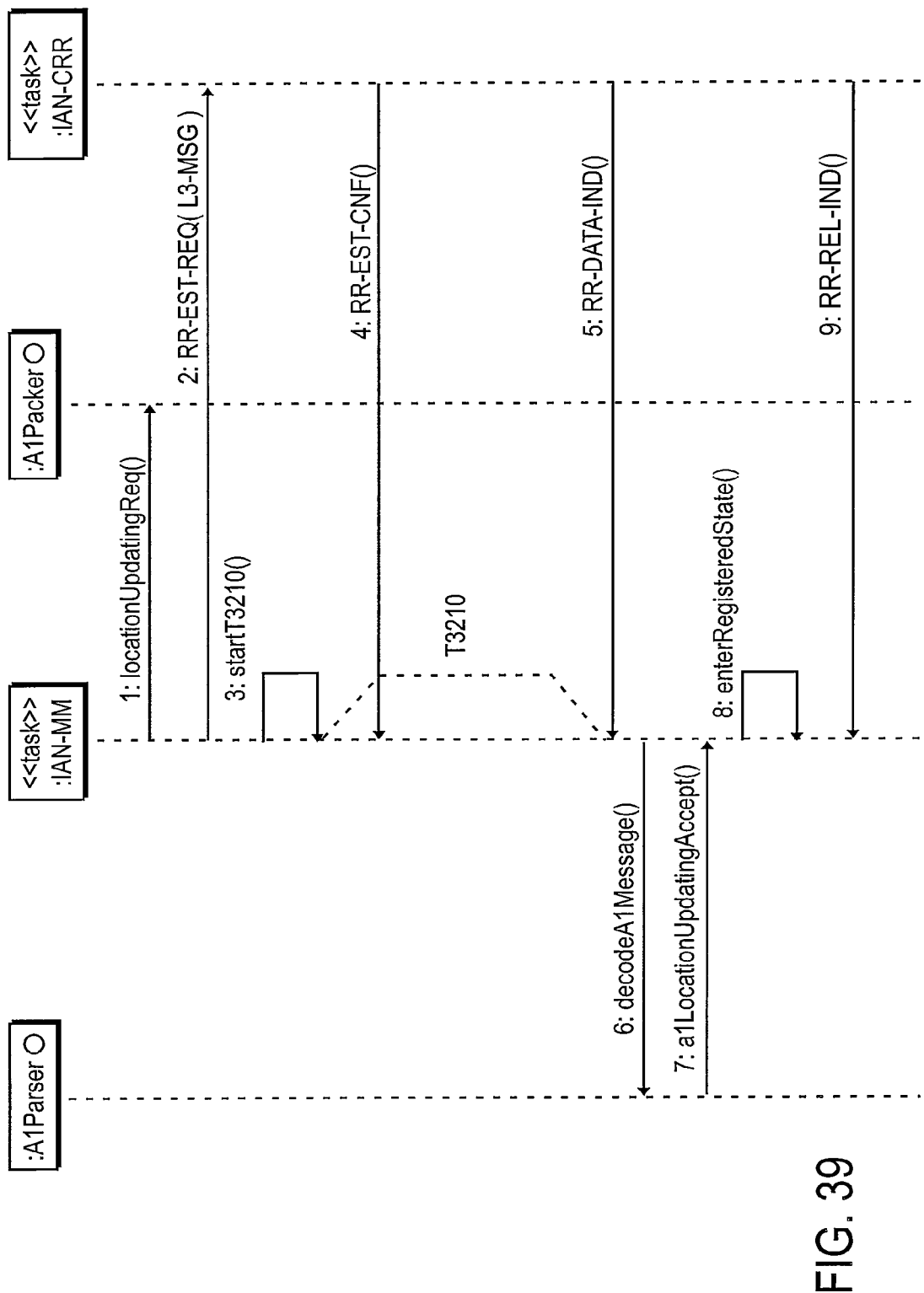
FIG. 39 illustrates an exemplary message flow for providing location updating to the mobile terminal while the terminal is on the IAN network.

FIG. 39 illustrates an exemplary message flow for providing location updating to the mobile terminal while the terminal is on the IAN network. Referring to FIG. 39, at step 1, IAN-MM 2002 builds an A1 location updating request message. At step 2, IAN-MM 2002 requests IAN-CRR 2003 to send the A1 message to the IAN network. At step 3, IAN-MM 2002 starts the T3210 timer. At steps 4 and 5, IAN-CRR 2003 receives an A1 message and the message is passed to IAN-MM 2002. At step 6, IAN-MM 2002 decodes the A1 message. At step 7, the A1 message is an A1 location updating accept message and is processed. At step 8, IAN-MM enters the registered state. At step 9, IAN-CRR 2003 sends the message to IAN-MM 2002.

Figure 40:
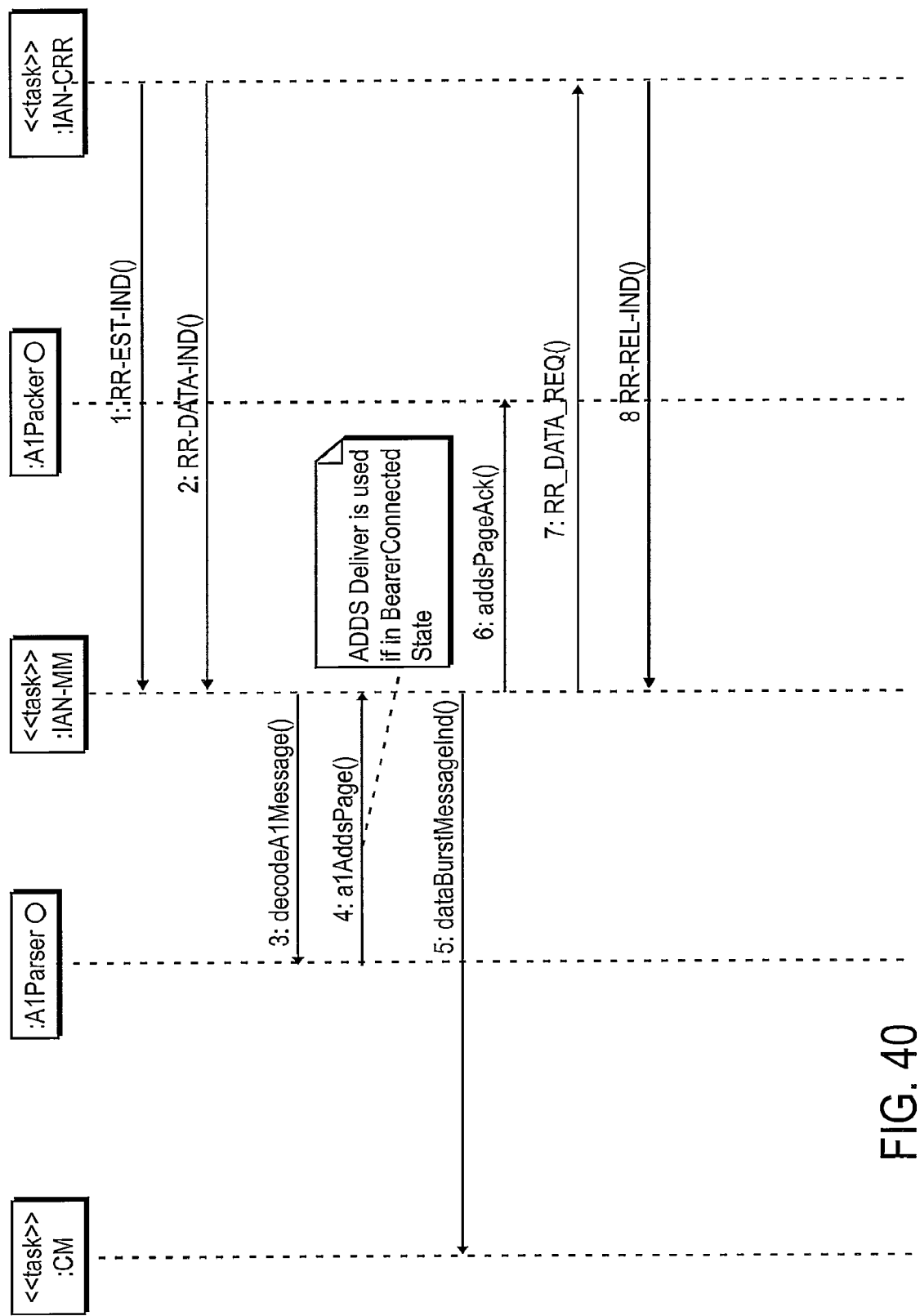
FIG. 40 illustrates an exemplary message flow to provide SMS support to the mobile terminal for an SMS short data burst on a deactivate IAN connection while the terminal is on the IAN network.

FIG. 40 illustrates an exemplary message flow to provide SMS support to the mobile terminal for an SMS short data burst on an idle IAN connection while the terminal is on the IAN network. The SMS service is supported over the ADDS service. Referring to FIG. 40, at steps 1 and 2, IAN-CRR 2003 receives an A1 message and the message is passed to IAN-MM 2002. At step 3, IAN-MM 2002 decodes the A1 message. At step 4, the A1 message is an A1 ADDS page message and is processed. At step 5, the payload of the ADDS message is passed to the call manager. At step 6, IAN-MM 2002 builds and A1 ADDS page ack message. At step 7, IAN-MM 2002 requests IAN-CRR 2003 to send the A1 message to the IAN network. At step 8, IAN-CRR 2003 sends the message to IAN-MM 2002.

Figure 41:
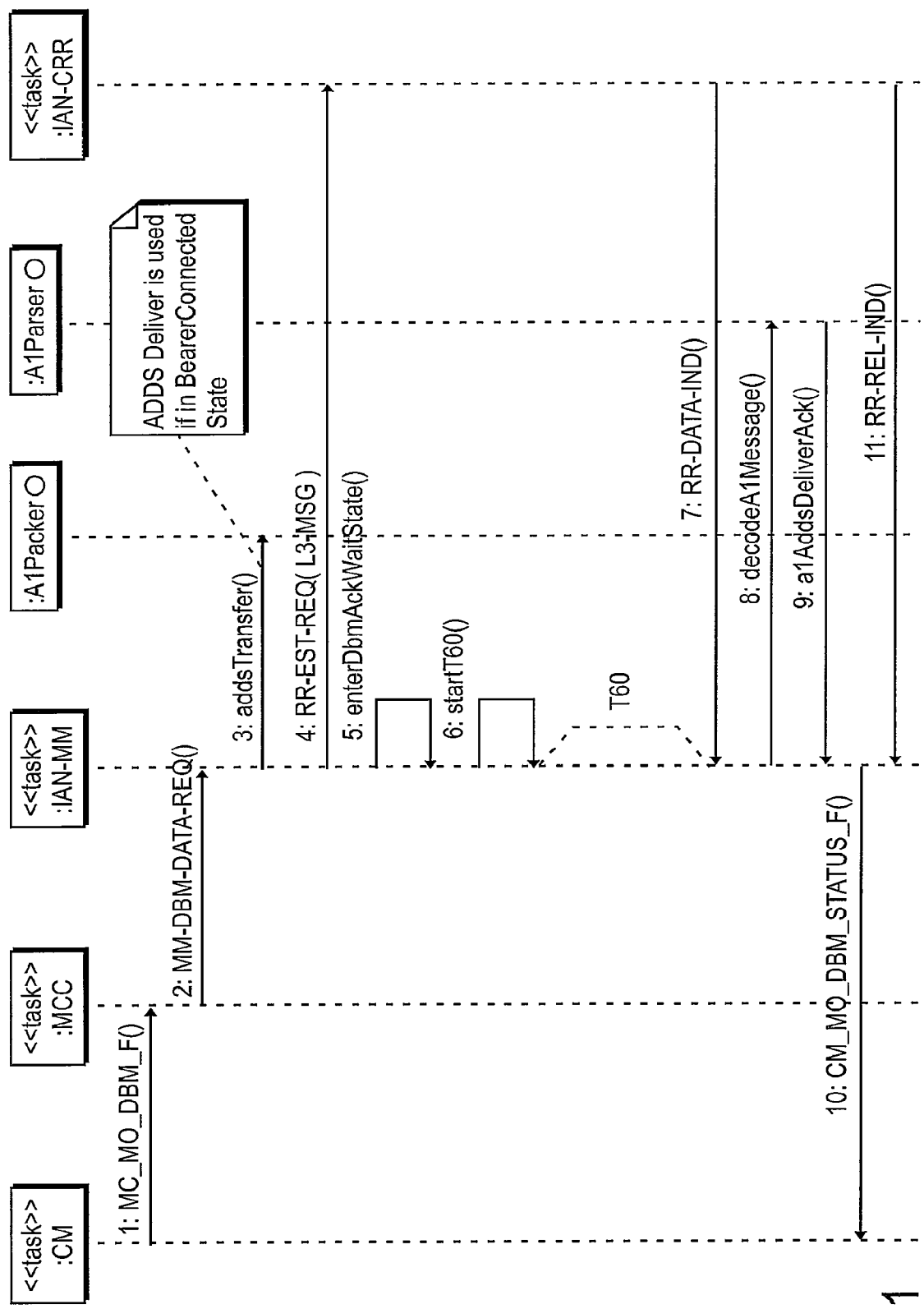
FIG. 41 is an exemplary message flow to provide SMS support to the mobile terminal for an SMS short data burst transfer on an active IAN connection while the terminal is on the IAN network.

FIG. 41 is an exemplary message flow to provide SMS support to the mobile terminal for an SMS short data burst transfer on an active IAN connection while the terminal is on the IAN network. Referring to FIG. 41, at step 1, call manager 1901 requests a data burst message be sent. At step 2, MCC task 1902 pass the request to IAN-MM 2002 while in IAN mode. At step 3, IAN-MM 2002 builds an A1 ADDS transfer message, which holds the SMS message. At step 4, IAN-MM 2002 requests IAN-CRR 2003 to send the A1 message to the IAN network. At step 5, IAN-MM 2002 enters the DBM ack wait state. At step 6, IAN-MM 2002 starts the T60 timer. At step 7, IAN-CRR 2003 receives an A1 message and the message is passed to IAN-MM 2002. At step 8, IAN-MM 2002 decodes the A1 message. At step 9, the A1 message is an A1 ADDS deliver ack message and is processed. At step 10, the status of the delivery of the data burst message is passed to the call manager 1901. At step 11, IAN-CRR 2003 sends the message to IAN-MM 2002.

Figure 42:
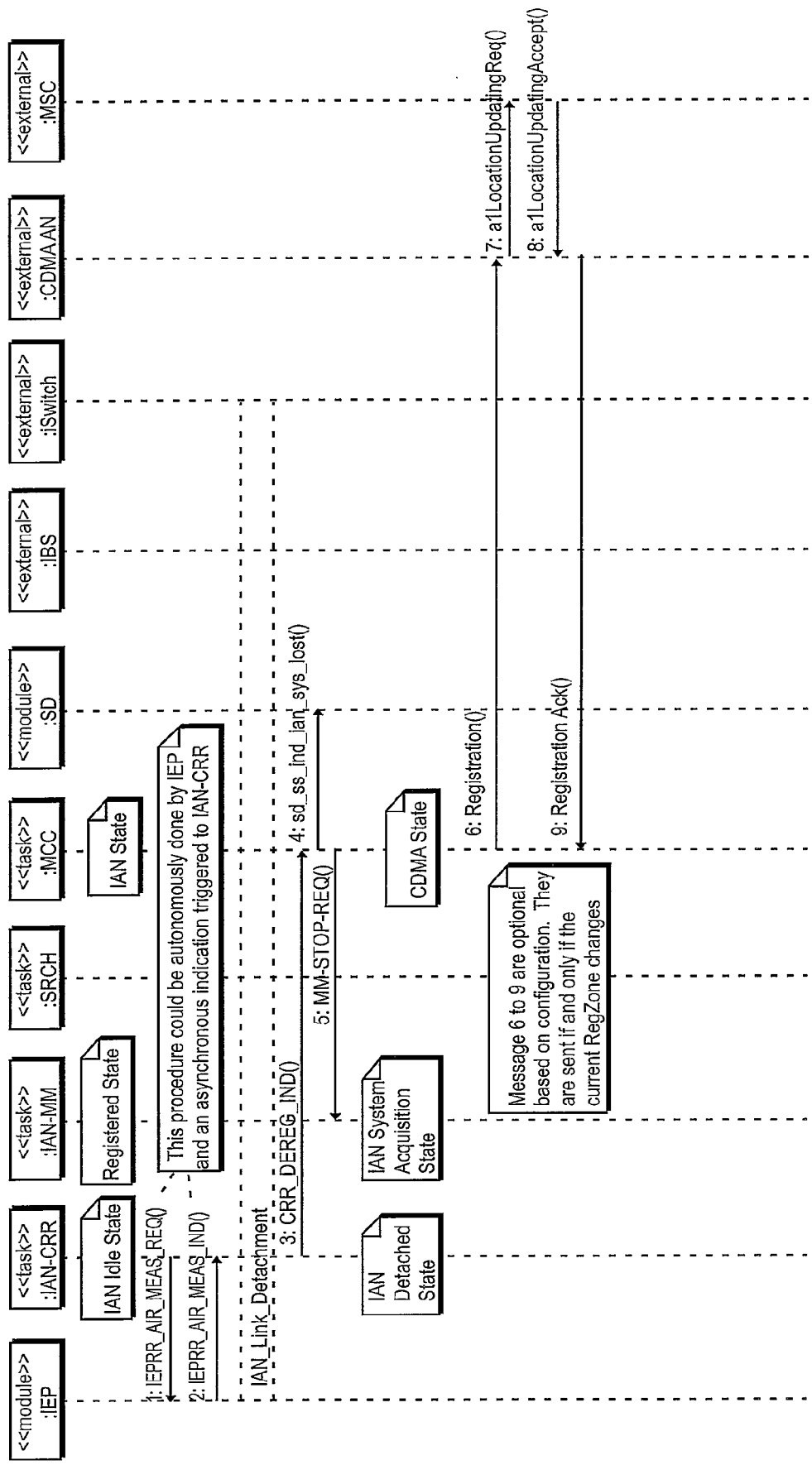
FIG. 42 is an exemplary message flow for performing an IAN-to-CDMA handoff procedure to transfer the mobile station from the IAN network to the CDMA network while the mobile station is not using any dedicated channels.

FIG. 42 is an exemplary message flow for performing an IAN-to-CDMA handoff procedure to transfer the mobile station from the IAN network to the CDMA network while the mobile station is not using any dedicated channels. Referring to FIG. 42, at step 1, IAN-CRR 2003 periodically requests the IEP to measure the signal strength on the IAN air interface. To that end, the IEP performs an IAN air interface strength measurement. At step 2, the IEP completes the IAN air interface strength measurement and reports the results to IAN-CRR 2003. At step 3, the IAN link detachment procedure is performed. At step 4, IAN-CRR 2003 notifies MCC task 1902 that the IAN subsystem is no longer registered with the IAN network. At step 5, MCC task 1902 queries the system determination subsystem indicating that the IAN network is lost. The system determination subsystem indicates the next action to take. In this case, acquire CDMA. At step 5, MCC task 1902 informs IAN-MM 2002 that the IAN system is no longer the active system. At step 6, MCC 1902 determines if the IAN network and CDMA network are in different registration zones. If the networks are in different zones, then MCC 1902 sends a registration message to the CDMA network. At step 7, the location of the mobile station is reported to the MSC. At step 8, the MSC informs the CDMA network that the mobile station has been accepted. At step 9, the CDMA network informs the mobile station that it has successfully registered with the system.

Figure 43:
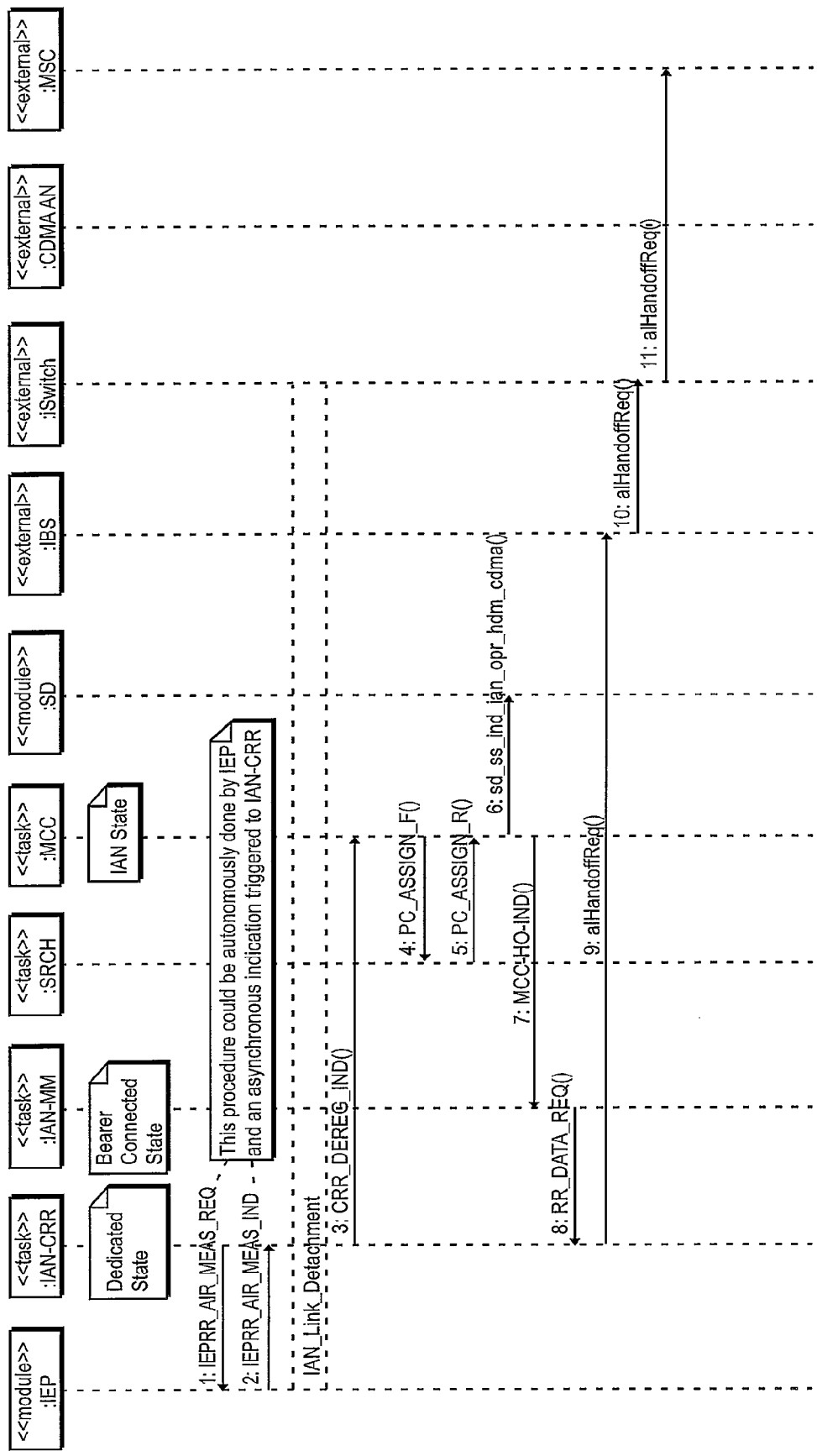
FIG. 43 illustrates an exemplary message flow to perform an IAN to CDMA active handoff to transfer the mobile station from the IAN network to the CDMA network while the mobile station is using dedicated channels without an interruption of service.

FIG. 43 illustrates an exemplary message flow to perform an IAN to CDMA active handoff to transfer the mobile station from the IAN network to the CDMA network while the mobile station is using dedicated channels without an interruption of service. Referring to FIG. 43, at step 1, IAN-CRR 2003 periodically requests the IEP to measure the signal strength on the IAN air interface. To that end, the IEP performs an IAN air interface strength measurement. At step 2, the IEP completes the IAN air interface strength measurement and reports the results to IAN-CRR 2003. At step 3, the IAN link detachment procedure is performed. At step 4, IAN-CRR 2003 notifies MCC task 1902 that the IAN subsystem is no longer registered with the IAN network. At step 5, MCC task 1902 commands SRCH task 1911 to find and measure CDMA pilots on the current CDMA channel. At step 6, SRCH task 1911 reports any CDMA pilots and their strengths to MCC task 1902 that where found. At step 7, MCC task 1902 informs the system determination subsystem that the IAN system is no longer the best system. SD task 1907 returns the next action to perform. In this case, hand-off to CDMA. At step 8, MCC task 1902 provides CDMA pilot information to IAN-MM 2002 and commands it to request a hand-off to the CDMA system. At step 9, IAN-MM 2002 builds an A1 Hand-off Request message and requests the IAN CRR 2003 to send the message. At step 10, IAN-CRR 2003 sends the A1 Hand-off Request to the IAN network. At step 11, the IBS forwards the message to the iSwitch. At step 12, the iSwitch forwards the message to the MSC.

Figure 44:
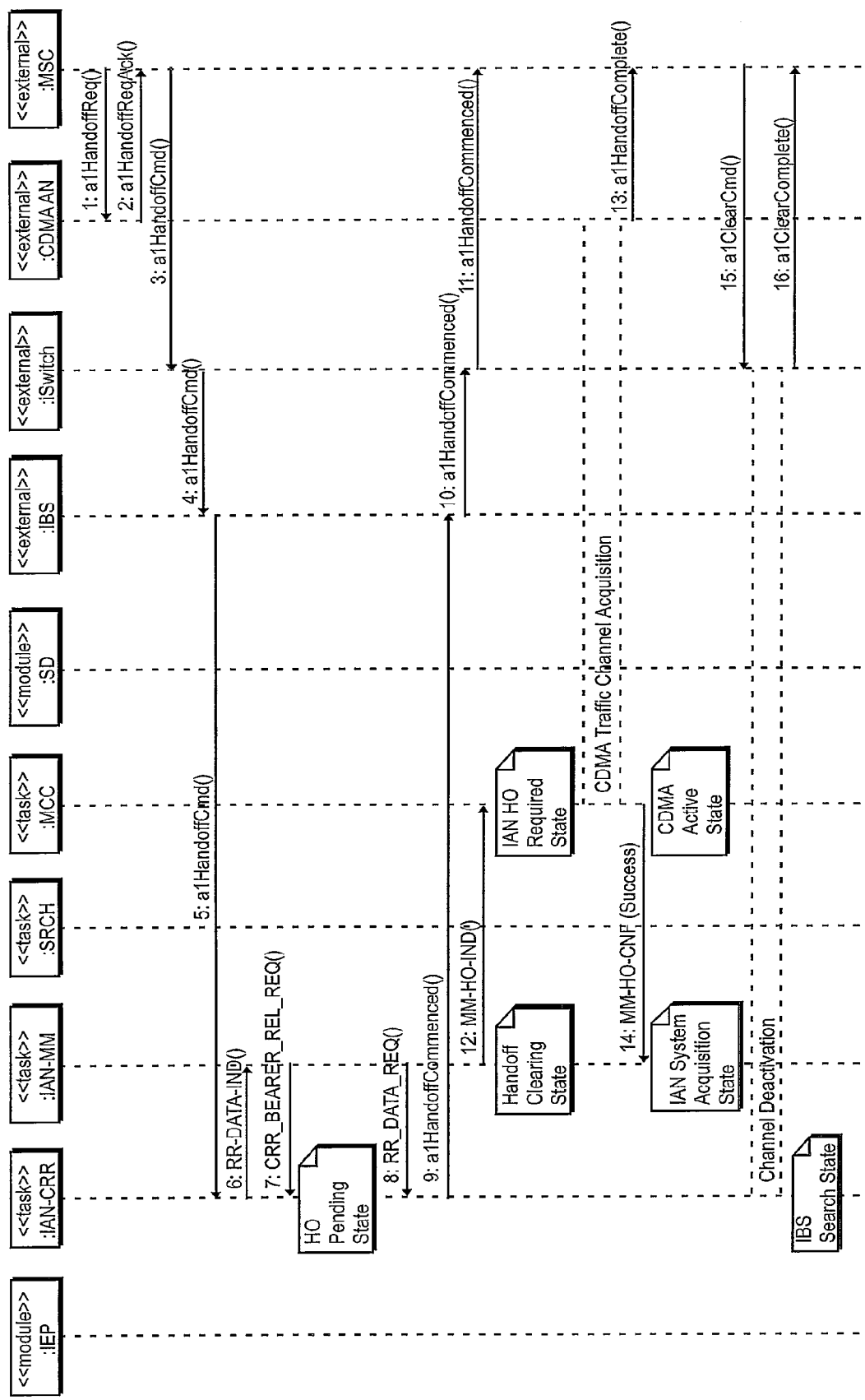
FIG. 44 illustrates an exemplary message flow to perform the second part of the IAN-to-CDMA active hand-off.

FIG. 44 illustrates an exemplary message flow to perform the second part of the Ian to CDMA active hand-off. Referring to FIG. 44, at step 1, the MSC request the CDMA system to accept a hand-off. At step 2, the CDMA access network allocates air link resources and informs the MSC that it is ready to receive the hand-off. At step 3, the MSC commands the IAN network to hand-off the mobile station to the CDMA access network. At step 4, the IAN iSwitch forwards the hand-off command to the IBS. At step 5, the IBS forwards the hand-off command to the mobile station. At step 6, IAN-CRR 2003 passes the data message to IAN-MM 2002 to be decoded. IAN-MM 2002 decodes the A1 Hand-off Command. At step 7, IAN-MM 2002 request IAN-CRR 2003 to disconnect the data path from the IAN channel. At step 8, IAN-MM 2002 creates an A1 hand-off commenced message and requests IAN-CRR 2003 to send the message. At step 9, IAN-CRR 2003 sends the A1 message across the IAN air interface to the IBS. At step 10, the IBS forwards the A1 message to the iSwitch. At step 11, the iSwitch forwards the A1 message to the MSC. At step 12, IAN-MM 2002 informs MCC task 1902 that it needs to perform a hand-off to the CDMA system. In one embodiment, MCC task 1902 performs the CDMA traffic channel acquisition procedure with the CDMA access network. At step 13, when the CDMA access network detects the mobile terminal is on the CDMA traffic channel an A1 hand-off complete message is sent to the MSC. At step 14, MCC task 1902 informs IAN-MM 2002 that the CDMA system has been acquired successfully. At step 15, when the MSC determines that the bearer channel on the source system is no longer needed it sends the clear command to free the resources. The mobile station and IAN network perform the IAN channel deactivation procedure in response to the A1 clear command. At step 16, the iSwitch informs the MSC that the bearer resources have been freed with the A1 clear complete message.

Figure 45:
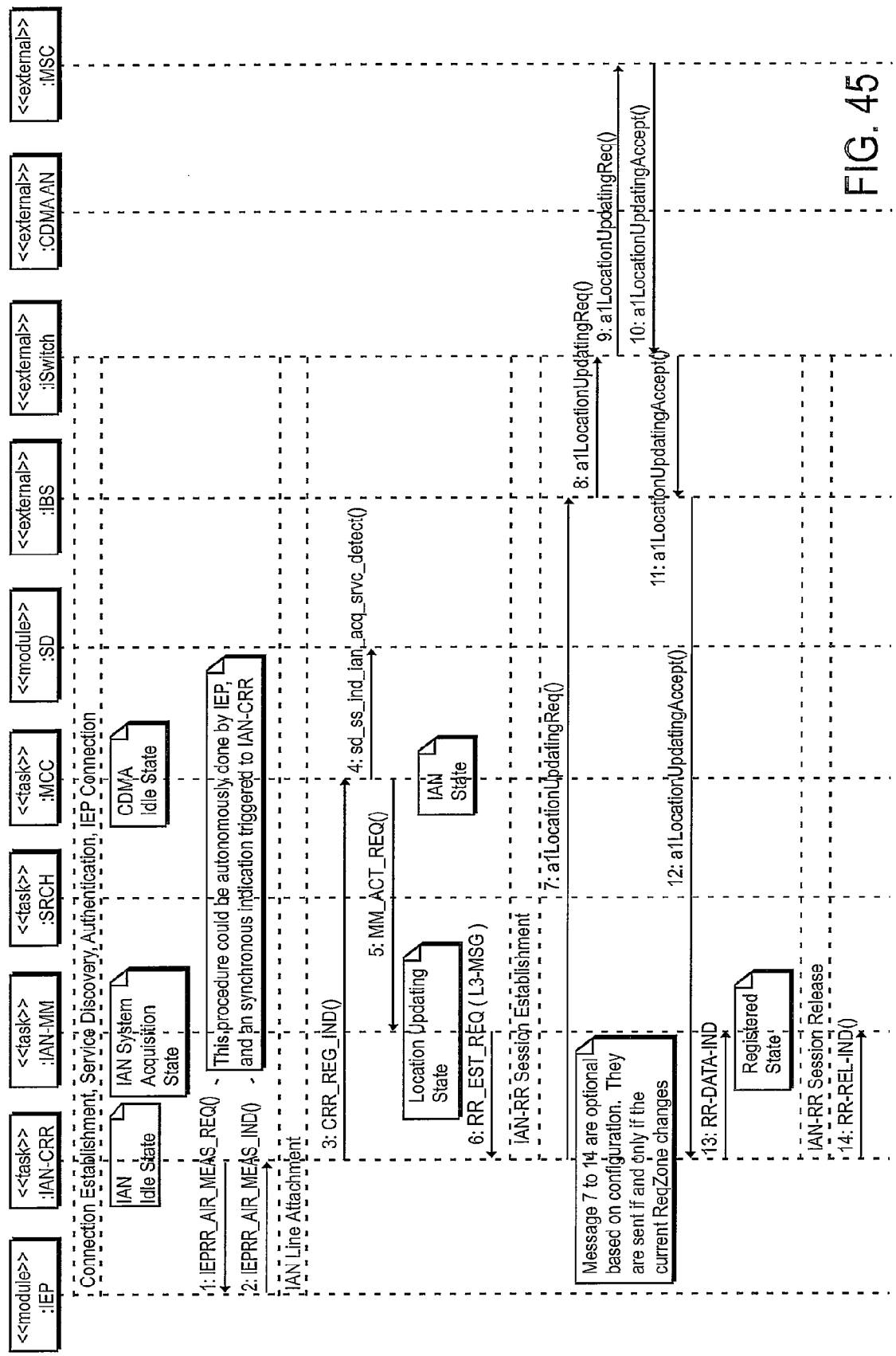
FIG. 45 illustrates an exemplary message flow to perform a CDMA-to-IAN idle handoff procedure to transfer the mobile station from the CDMA network to the IAN network while the mobile station is not using and dedicated channels.

FIG. 45 illustrates an exemplary message flow to perform a CDMA to IAN idle handoff procedure to transfer the mobile station from the CDMA network to the IAN network while the mobile station is not using and dedicated channels. In one embodiment, before the CDMA to IAN idle hand-off can happen, there must be an IEP connection. The mobile station performs connection establishment, service discovery, authentication, and IEP connection procedures at some point before the hand-off starts. Referring to FIG. 45, at step 1, IAN-CRR 2003 periodically requests the IEP to measure the signal strength on the IAN air interface. The IEP performs an IAN air interface strength measurement. At step 2, the IEP completes the IAN air interface strength measurement and reports the results to IAN-CRR 2003. The IAN link attachment procedure is performed. At step 3, IAN-CRR 2003 notifies MCC task 1902 that the IAN subsystem is registered with the IAN network. At step 4, MCC task 1902 informs the system determination subsystem that an IAN network has been detected. SD task 1907 returns the next action to perform, and, in this case, to acquire the IAN network. At step 5, MCC task 1902 requests IAN-MM 2002 to activate. MCC task 1902 then enters the IAN state. IAN-MM 2002 determines if the IAN network and the CDMA network are in different registration zones. In this case, they are in different zones and the location updating procedure is performed. At step 6, IAN-MM 2002 builds an A1 location updating request and requests IAN-CRR 2003 to send the A1 message to the IAN network. At step 7, IAN-CRR 2003 send the A1 message to the IAN network. At step 8, the IBS forwards the A1 message to the iSwitch. At step 9, the iSwitch forwards the A1 message to the MSC. At step 10, the MSC processes the location updating request and sends an A1 location updating accept to the iSwitch. At step 11, the iSwitch forwards the A1 message to the IBS. At step 12, the IIBS send the A1 message to the mobile station over the IAN air interface. At step 13, IAN-CRR 2003 passes the A1 message to IAN-MM 2002. IAN-MM 2002 decodes the A1 location updating accept message. IAN-MM 2002 has now successfully registered. At step 14, IAN-CRR 2003 sends a message to IAN-MM 2002.

Figure 46:
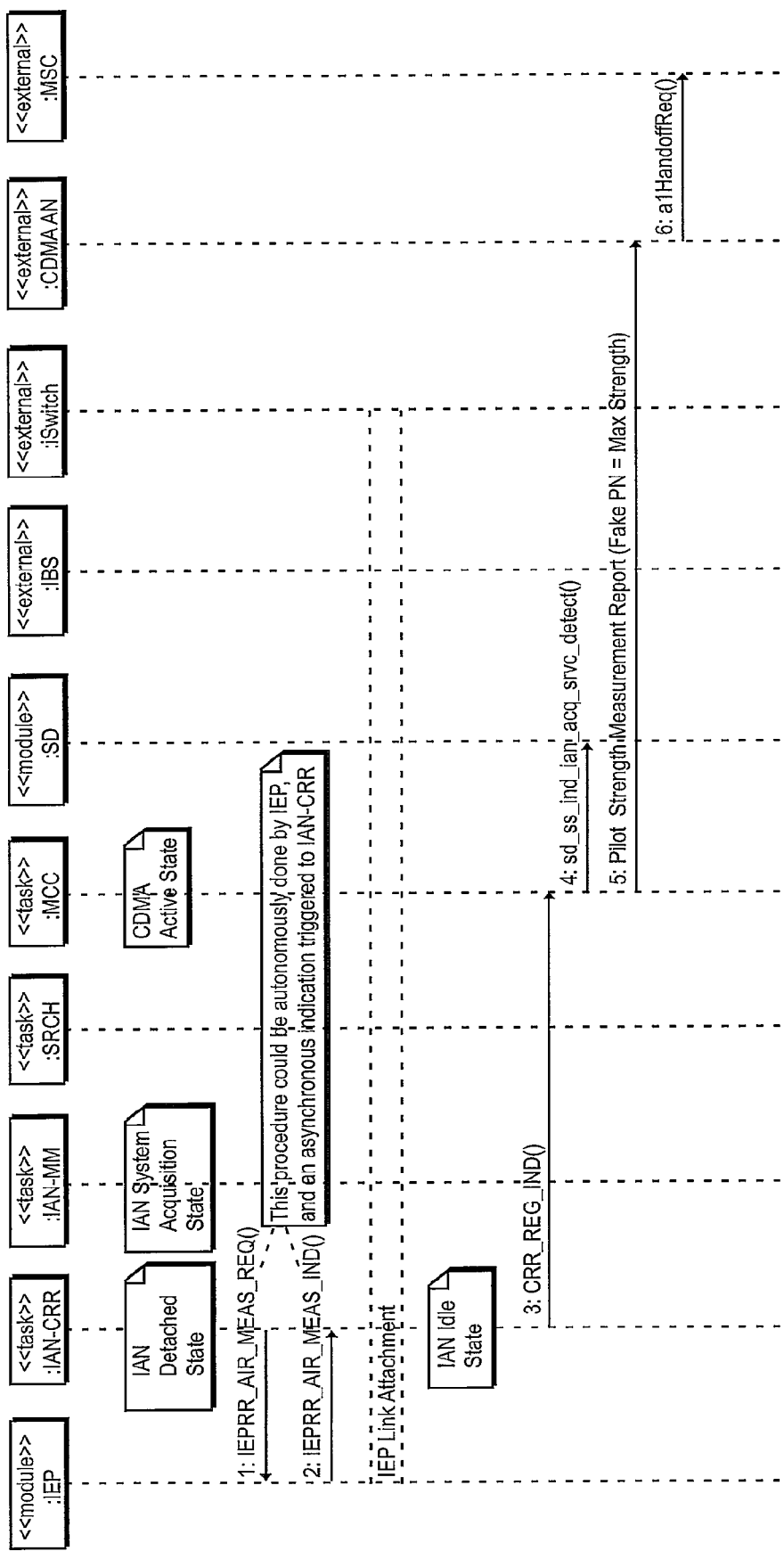
FIG. 46 is an exemplary message flow to perform a CDMA-to-IAN active handoff procedure to transfer the mobile station from the CDMA network to the IAN network while the mobile station is using dedicated channels without an interruption of service.

FIG. 46 is an exemplary message flow to perform a CDMA to IAN active handoff procedure to transfer the mobile station from the CDMA network to the IAN network while the mobile station is using dedicated channels without an interruption of service. Referring to FIG. 46, at step 1, IAN-CRR 2003 periodically requests the IEP to measure the signal strength on the IAN air interface. The IEP performs an IAN air interface strength measurement. At step 2, the IEP completes the IAN air interface strength measurement and reports the results to IAN-CRR 2003. The IAN link attachment procedure is performed. At step 3, IAN-CRR 2003 notifies MCC 1902 that the IAN subsystem is registered with the IAN network. At step 4, MCC task 1902 informs the system determination subsystem that an IAN network has been detected. SD task 1907 returns the next action to perform and, in this case, to acquire the IAN network. At step 5, MCC task 1902 sends a pilot strength measurement report to the CDMA access network. The report contains only the pilot designated as the IAN system and it is set to maximum strength. At step 6, the CDMA access network processes the pilot strength measurement report and it triggers a hand-off request to the MSC.

Figure 47:
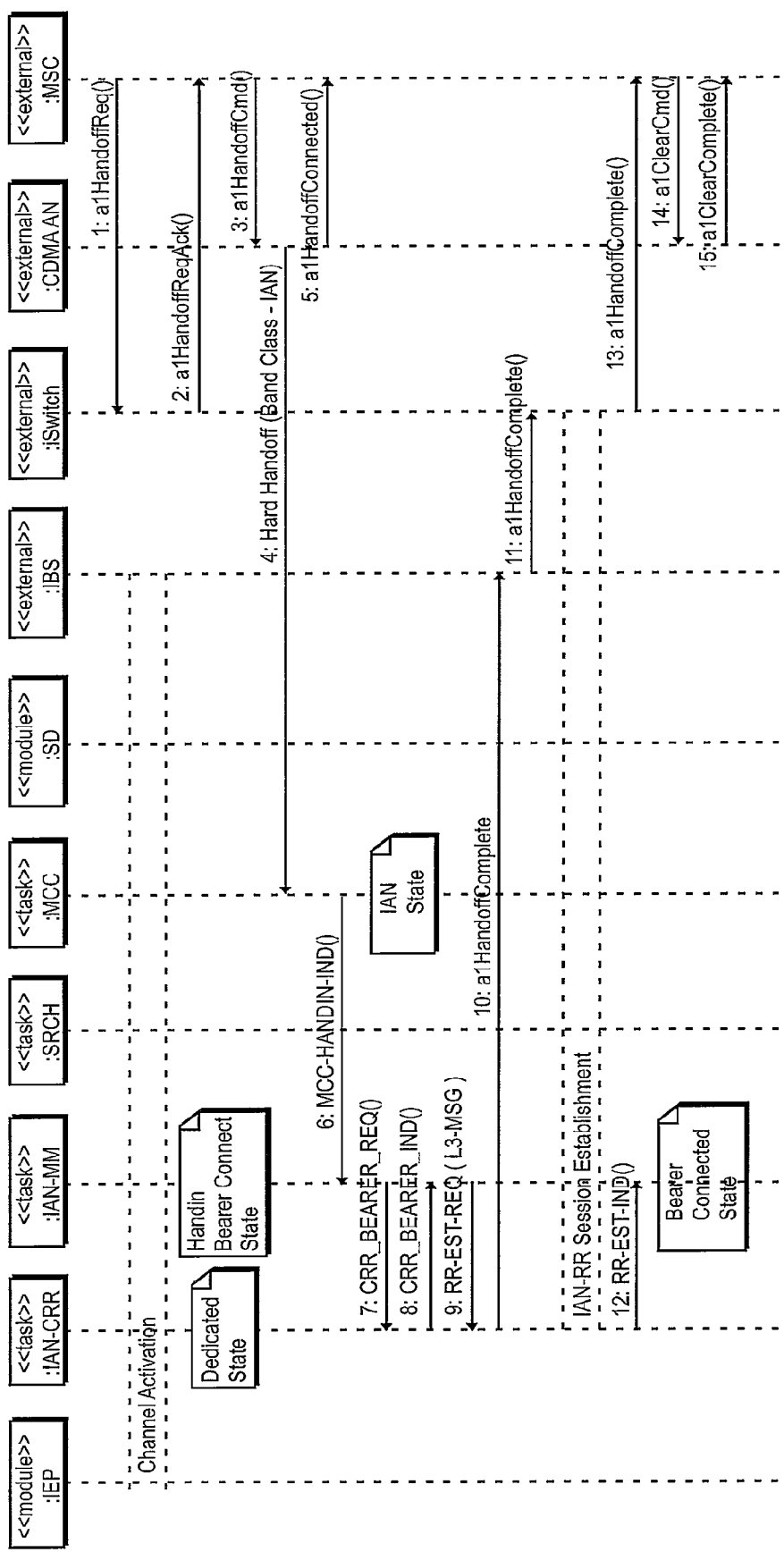
FIG. 47 is an exemplary message flow of part two of the CDMA-to-IAN active handoff procedure.

FIG. 47 is an exemplary message flow of part two of the CDMA-to-IAN active handoff procedure. Referring to FIG. 47, at step 1, the MSC sends an A1 hand-off request to the iSwitch to request resource on the IAN network be allocated to receive a hand-off. The iSwitch triggers the IAN channel activation procedure. At step 2, the iSwitch informs the MSC that the IAN network is ready to receive a hand-in. At step 3, the MSC send an A1 hand-off command to the CDMA access network. At step 4, the CDMA access network send a message to the mobile station commanding it to hand-off to the IAN network. The target system band class is set to a value, which indicates the IAN network. At step 5, the CDMA access network sends an A1 hand-off commenced message to the MSC when it has determined that the mobile station has received the hand-off command. At step 6, MCC task 1902 informs IAN-MM 2002 that a hand in to IAN has been commanded. MCC task 1902 enters the IAN state. At step 7, IAN-MM 2002 request IAN-CRR 2003 to move the bearer traffic from CDMA on to the IAN channel. At step 8, IAN-CRR 2003 informs IAN-MM 2002 that bearer traffic is now being transferred on the IAN channel. At step 9, IAN-MM 2002 builds an A1 hand-off complete message and requests the IAN-CRR 2003 to transfer the message. At step 10, IAN-CRR 2003 send the A1 message to the IAN network. At step 11, the IBS forwards the A1 message to the iSwitch. At step 12, the iSwitch forwards the A1 message to the MSC. The MSC determines the hand-off has been completed successfully. At step 13, the MSC sends an A1 clear command to the CDMA access network to free all resource still in use on the CDMA network. At step 14, the CDMA access network frees the remaining resources and sends an A1 clear complete message to the MSC.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

Appendix I: Table Of Acronyms

| | |
|---|---|
| ADDS | Application Data Delivery Service |
| ARFCN | Absolute RF Channel Number |
| ARQ | Automatic Repeat Request |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System (e.g., Redback Networks SMS) |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CLIR | Calling Line Identification Restriction |
| CM | Call Manager. Connection Management |
| CPE | Customer Premises Equipment |
| CS | Circuit Switched |
| CVSD | Continuous Variable Slope Delta modulation |
| DBM | Data Burst Message |
| DMA | Direct Memory Access |
| DSL | Digital Subscriber Line |
| DSLAM | DSL Access Multiplexer |
| DTAP | Direct Transfer Application Part |
| ESN | Electronic Serial Number |
| ETSI | European Telecommunications Standards Institute |
| FCAPS | Fault-management, Configuration, Accounting, Performance, and Security |
| FCC | US Federal Communications Commission |
| GGSN | Gateway GPRS Support Node |
| GHDM | General Handoff Direction Message |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HCI | Host Controller Interface |
| HLR | Home Location Register |
| IAN | Indoor Access Network |
| IAN-CRR | IAN-CDMA Radio Resource |
| IAN-RR | Indoor Access Network Radio Resource Management |

-continued

| | |
|---|---|
| IBS | Indoor Base Station. The indoor base station is the fixed part of the customer premise solution. The indoor base station provides indoor unlicensed wireless coverage, and connects to the access network to enable indoor service delivery. An IBS can be a single access point, or a set of access points with a centralized controller |
| IBSAP | IBS Application Protocol |
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller (also referred to as the "iSwitch" in this document). The indoor network controller is the component of the IAN network equipment that manages the indoor access network, and provides the physical layer interface(s) to the access network. |
| IP | Internet Protocol |
| ISDN | Integrated Services Digital Network |
| ISP | Internet Service Provider |
| ISP IP | Internet Service Provider's IP Network (i.e., typically provided by broadband service provider) |
| IST | IAN Secure Tunnel |
| ISUP | ISDN User Part |
| ITP | IAN Transfer Protocol |
| K1 | Interface between mobile station and indoor base station |
| K2 | Interface between indoor base station and indoor network controller |
| LA | Location Area |
| LAI | Location Area Identification |
| LLC | Logical Link Control |
| MAC | Medium Access Control |
| MAP | Mobile Application Part |
| MC | Main Control task |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAM | Number Assignment Module |
| NAPT | Network Address and Port Translation |
| NAT | Network Address Translation |
| NS | Network Service |
| NSS | National Supplementary Services |
| NVRAM | Non-Volatile Random Access Memory |
| OTAPA | Over-The-Air Parameter Administration |
| OTASP | Over-The-Air Service Provisioning |
| PCM | Pulse Code Modulation |
| PCS | Personal Communication Services |
| PCS | Personal Communications Services |
| PDSN | Packet Data Serving Node |
| PLMN | Public Land Mobile Network |
| POTS | Plain Old Telephone Service |
| PPP | Point-to-Point Protocol |
| PPPoE | PPP over Ethernet protocol |
| PRL | Priority Roaming List |
| PSMM | Pilot Strength Measurement Message |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RF | Radio Frequency |
| RFC | Request for Comment (IETF Standard) |
| RLC | Radio Link Control |
| RLP | Radio Link Protocol |
| RR | Radio Resource Management |
| RSSI | Received Signal Strength Indication |
| RTCP | Real Time Control Protocol |

-continued

| | |
|---|---|
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SDL | Specification and Description Language |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |
| UI | User Interface |
| UIM | User Identity Module |
| UMTS | Universal Mobile Telecommunication System |
| VLR | Visited Location Register |
| VMSC | Visited MSC |
| VoIP | Voice Over IP |
| WSP IP | Wireless Service Provider's IP Network (i.e., provider of IAN service) |

What is claimed is:

1. A system comprising:

a mobile station operable to communicate with a telecommunications network using a licensed wireless communication channel serviced by the telecommunications network in a first mode and an unlicensed wireless communication channel serviced by an unlicensed communication system in a second mode;

an unlicensed base station communicably coupled to the mobile station via the unlicensed wireless communication channel, wherein said unlicensed base station is not communicably coupled to the mobile station via the licensed wireless communication channel;

and an unlicensed network controller of the unlicensed wireless communication system communicably coupled to the unlicensed base station and adapted to communicate with the telecommunications network, wherein the mobile station includes call control to control a communication session with the telecommunications network through the unlicensed network controller using the unlicensed wireless communication system by exchanging call control information with the unlicensed network controller via one or more messages having an A1 protocol message format, wherein the unlicensed network controller exchanges messages in the A1 format with a mobile switching center of the telecommunications network, wherein the unlicensed network controller and unlicensed base station operate to convert a level 1, a level 2, and a level 3 protocol layer of the unlicensed wireless communication channel into a standard base station controller interface protocol recognized by the telecommunications network.

2. The system defined in claim 1, wherein a protocol for the licensed wireless communication channel comprises CDMA-based level 1, level 2 and level 3 protocol layers.

3. The system defined in claim 2, wherein a protocol for the unlicensed wireless communication channel comprises Bluetooth-based level 1, level 2 and level 3 protocol layers.

4. The system defined in claim 2, wherein a protocol for the unlicensed wireless communication channel comprises 802.11-based level 1, level 2 and level 3 protocol layers.

5. The system defined in claim 1, wherein the unlicensed wireless communication channel is activated when the mobile station is within an unlicensed wireless service area.

6. The system defined in claim 1, wherein the mobile station, unlicensed base station and unlicensed network controller are operable to initiate a handover between use of the licensed wireless communication channel and the unlicensed wireless communication channel.

7. The system defined in claim 6, wherein the mobile station, unlicensed base station and unlicensed network controller initiate the handover using the A1 messages.

8. The system defined in claim 7, wherein the handover comprises a handover from use of the unlicensed wireless communication channel to use of a CDMA channel or vice versa.

9. The system defined in claim 1, wherein control of the communication session includes one or more selected from a group consisting of establishing a mobile call, terminating a mobile call, providing the mobile station with call progress indications, having the mobile station initiate release of an active call, having the unlicensed network controller initiate release of an active call, having the unlicensed network controller perform feature notification, enabling authentication of the mobile station, providing the mobile station with location updating, providing the mobile station with parameter updating, and providing the mobile station with short message service support.

10. A method comprising:
communicating with a telecommunications network using a licensed wireless communication channel in a first mode;
communicating with the telecommunications network via an unlicensed network controller of an unlicensed wireless communication system adapted to communicate with the telecommunications network;
communicating with the unlicensed wireless communication system using an unlicensed wireless communication channel in a second mode;
exchanging call control information with the unlicensed network controller via an unlicensed base station communicably coupled to a mobile station via the unlicensed wireless communication channel, wherein said unlicensed base station is not communicably coupled to the mobile station via the licensed wireless communication channel;
wherein said mobile station uses one or more messages having an A1 protocol message format to control a communication session with the telecommunications network through the unlicensed network controller using the unlicensed wireless communication channel, wherein the unlicensed network controller exchanges messages in the A1 format with a mobile switching center of the telecommunications network; and
converting a level 1, level 2 and level 3 protocol layer of the unlicensed wireless communication channel into a standard base station controller interface protocol recognized by the telecommunications network.

11. The method defined in claim 10, wherein a protocol for the licensed wireless communication channel comprises CDMA-based level 1, level 2 and level 3 protocol layers.

12. The method defined in claim 11, wherein a protocol for the unlicensed wireless communication channel comprises Bluetooth-based level 1, level 2 and level 3 protocol layers.

13. The method defined in claim 11, wherein a protocol for the unlicensed wireless communication channel comprises 802.11-based level 1, level 2 and level 3 protocol layers.

14. The method defined in claim 10, further comprising activating the unlicensed wireless communication channel when the mobile station is within an unlicensed wireless service area in which the unlicensed wireless communication channel is used.

15. The method defined in claim 10, further comprising initiating a handover between use of the licensed wireless communication channel and the unlicensed wireless communication channel.

16. The method defined in claim 15, wherein initiating the handover is performed using the A1 messages.

17. The method defined in claim 16, wherein initiating the handover comprises initiating a handover from use of the unlicensed wireless communication channel to use of a CDMA channel or vice versa.

18. The method defined in claim 10 further comprising controlling a communication session that uses the unlicensed wireless communication channel using the A1 messages.

19. The method defined in claim 17, wherein controlling a communication session includes one or more selected from a group consisting of establishing a mobile call, terminating a mobile call, providing the mobile station with call progress indications, having the mobile station initiate release of an active call, having the unlicensed network controller initiate release of an active call, having the unlicensed network controller perform feature notification, enabling authentication of the mobile station, providing the mobile station with location updating, providing the mobile station with parameter updating, and providing the mobile station with short message service support.

20. The system of claim 1, wherein a set of service access points (SAPs) are used for intercommunications between a set of call controller entities of the mobile station.

* * * * *